(12) United States Patent
D'Zmura

(10) Patent No.: US 7,083,415 B2
(45) Date of Patent: Aug. 1, 2006

(54) STARS IN ECLIPTIC COORDINATES

(76) Inventor: David Andrew D'Zmura, P.O. Box 621, Indio, CA (US) 92201-0621

( * ) Notice: Subject to any disclaimer, the term of this patent is extended or adjusted under 35 U.S.C. 154(b) by 0 days.

(21) Appl. No.: 11/013,275

(22) Filed: Dec. 15, 2004

(65) Prior Publication Data

US 2005/0130105 A1 Jun. 16, 2005

Related U.S. Application Data

(60) Division of application No. 10/671,415, filed on Sep. 25, 2003, now Pat. No. 6,974,325, which is a division of application No. 09/849,582, which is a continuation of application No. PCT/US00/28838, filed on Oct. 18, 2000, now Pat. No. 6,776,618, and a continuation of application No. 09/421,192, which is a continuation of application No. PCT/US98/13383, filed on Jun. 26, 1998, now abandoned, and a continuation of application No. 08/883,753, filed on Jun. 27, 1997, now abandoned.

(60) Provisional application No. 60/212,694, filed on Jun. 19, 2000, provisional application No. 60/208,580, filed on Jun. 2, 2000, provisional application No. 60/207,450, filed on May 30, 2000, provisional application No. 60/207,415, filed on May 30, 2000, provisional application No. 60/207,310, filed on May 30, 2000, provisional application No. 60/206,603, filed on May 25, 2000, provisional application No. 60/206,536, filed on May 21, 2000, provisional application No. 60/205,290, filed on May 19, 2000, provisional application No. 60/202,038, filed on May 5, 2000, provisional application No. 60/189,332, filed on Mar. 14, 2000, provisional application No. 60/181,502, filed on Feb. 10, 2000, provisional application No. 60/172,651, filed on Dec. 20, 1999, provisional application No. 60/158,065, filed on Oct. 7, 1999, provisional application No. 60/144,056, filed on Jul. 16, 1999, provisional application No. 60/040,442, filed on Mar. 12, 1997.

(51) Int. Cl.
*G09B 19/00* (2006.01)
(52) U.S. Cl. ...................................... 434/106
(58) Field of Classification Search ............... 434/106, 434/284, 288
See application file for complete search history.

(56) References Cited

U.S. PATENT DOCUMENTS 3,751,830 A * 8/1973 Brynjegard ............... 434/106
4,251,930 A * 2/1981 Laver ....................... 434/106
4,304,554 A * 12/1981 Slayden .................... 434/106

OTHER PUBLICATIONS

"Astronomical Utility Tools", Oct. 24, 2002 [retrieved online Oct. 13, 2005].*
"Positional Astronomy: Ecliptic coordinates", May 6, 1999 [retrieved online Oct. 13, 2005].*
John Pratt, "Coordinates for the Constellations", Apr. 25, 2001 [retrieved online Oct. 13, 2005].*

* cited by examiner

*Primary Examiner*—Kurt Fernstrom

(57) ABSTRACT

The invention provides a process converting the positions of the stars and stellar objects from equatorial coordinates of right ascension and declination to ecliptic coordinates of celestial longitude and celestial latitude. The invention provides a map of the heavenly array of stars and planets in ecliptic coordinates. The invention provides a catalogue of stars and stellar objects of the constellations, comprising a database or data array, in ecliptic coordinates by degree, and by zodiac sign and symbol.

10 Claims, 84 Drawing Sheets

Figure 1

| Zodiac Sign | Begins | Ends |
|---|---|---|
| Pisces | 0° | 30° |
| Aries | 30° | 60° |
| Taurus | 60° | 90° |
| Gemini | 90° | 120° |
| Cancer | 120° | 150° |
| Leo | 150° | 180° |
| Virgo | 180° | 210° |
| Libra | 210° | 240° |
| Scorpio | 240° | 270° |
| Sagittarius | 270° | 300° |
| Capricorn | 300° | 330° |
| Aquarius | 330° | 360° (0°) |

| Zodiac Constellation | Begins | Ends |
|---|---|---|
| Pisces | 351° | 29° |
| Aries | 33° | 48° |
| Taurus | 51° | 85° |
| Gemini | 95° | 114° |
| Cancer | 124° | 134° |
| Leo | 140° | 172° |
| Virgo | 177° | 220° |
| Libra | 225° | 240° |
| Scorpio | 243° | 267° |
| Sagittarius | 267° | 296° |
| Capricorn | 304° | 323° |
| Aquarius | 312° | 347° |

Figure 2A

| Constellation/Star | Vernal Equinox LONGITUDE | Origin LATITUDE | each Sign as 30° of 360° Longitude in Zodiac Sign (rounded) |
|---|---|---|---|
| Aquarius (♒) | | | |
| ε | 311.6° | 8.1° | ♑ 12° |
| μ | 312.9 | 8.3 | 13 |
| β | 323.3 | 8.6 | 23 |
| ι | 328.6 | -2.1 | 29 |
| α | 333.4 | 10.6 | ♒ 3° |
| θ | 333.3 | 2.7 | 3 |
| γ | 335.0 | 4.4 | 5 |
| τ | 338.5 | -5.6 | 8 |
| ζ | 338.7 | 8.9 | 9 |
| δ | 338.7 | -8.1 | 9 |
| 88 | 339.9 | -14.5 | 10 |
| η | 340.3 | 8.2 | 10 |
| λ | 341.4 | -0.3 | 11 |
| φ | 347.0 | -1.0 | 17 |
| | | | |
| Pisces (♓) | | | |
| γ | 351.4° | 7.3° | ♒ 21° |
| ι | 357.4 | 7.2 | 28 |
| ω | 357.5 | 6.4 | 28 |
| δ | 14.0 | 2.2 | ♓ 14° |
| μ | 23.1 | -3.0 | 23 |
| φ | 26.3 | 15.6 | 26 |
| η | 26.7 | 5.4 | 27 |
| τ | 28.2 | 20.8 | 28 |
| α | 29.4 | -9.1 | 29 |
| | | | |
| Aries (♈) | | | |
| γ | 33.2° | 7.2° | ♈ 3° |
| β | 33.8 | 8.5 | 4 |
| α | 37.6 | 10.0 | 8 |
| 41 | 48.0 | 10.5 | 18 |

Figure 2B

| Constellation/Star | Vernal Equinox LONGITUDE | Origin LATITUDE | | each Sign as 30° of 360° Longitude in Zodiac Sign (rounded) |
|---|---|---|---|---|
| Taurus (♉) | | | | |
| ο | 51.0° | -9.3° | | ♈ 21° |
| ξ | 51.9 | -8.8 | | 22 |
| λ | 60.5 | -7.9 | | ♉ 1° |
| γ | 65.6 | -5.7 | | 6 |
| δ | 66.6 | -3.9 | | 7 |
| ε | 68.4 | -2.3 | | 8 |
| α | 69.6 | -5.4 | | 10 |
| τ | 72.1 | 0.8 | | 12 |
| β | 82.5 | 5.4 | | 22 |
| ζ | 84.6 | -2.1 | | 25 |
| | | | | |
| Gemini (♊) | | | | |
| μ | 95.1° | -0.8° | | ♊ 5° |
| ν | 96.6 | -3.0 | | 7 |
| γ | 98.9 | -6.6 | | 9 |
| ε | 99.7 | 2.1 | | 10 |
| ξ | 101.1 | -10.1 | | 11 |
| ζ | 104.9 | -2.0 | | 15 |
| δ | 108.5 | -0.2 | | 19 |
| α | 110.1 | 10.1 | | 20 |
| β | 113.1 | 6.7 | | 23 |
| κ | 113.6 | 3.1 | | 24 |
| | | | | |
| Cancer (♋) | | | | |
| β | 124.1° | -10.3 | | ♋ 4° |
| ι | 126.2 | 10.4 | | 6 |
| γ | 127.5 | 3.2 | | 8 |
| δ | 128.6 | 0.1 | | 9 |
| α | 133.5 | -5.1 | | 13 |

Figure 2C

| Constellation/Star | Vernal Equinox LONGITUDE | Origin LATITUDE | | each Sign as 30° of 360° Longitude in Zodiac Sign (rounded) |
|---|---|---|---|---|
| Leo (♌) | | | | |
| ε | 140.5° | 9.7° | | ♋ 21° |
| μ | 141.3 | 12.3 | | 21 |
| ζ | 147.4 | 11.8 | | 27 |
| η | 147.8 | 4.8 | | 28 |
| α | 149.7 | 0.5 | | 30 |
| γ | 149.6 | 8.8 | | 30 |
| δ | 161.3 | 14.3 | | ♌ 11° |
| θ | 163.4 | 9.7 | | 13 |
| β | 171.6 | 12.7 | | 21 |
| | | | | |
| Virgo (♍) | | | | |
| β | 177.0° | 0.6° | | ♌ 27° |
| γ | 190.0 | 2.7 | | ♍ 10° |
| ε | 190.0 | 16.2 | | 10 |
| δ | 191.4 | 8.5 | | 11 |
| θ | 198.0 | 1.6 | | 18 |
| ζ | 201.9 | 8.5 | | 22 |
| α | 203.8 | -2.1 | | 24 |
| τ | 207.6 | 12.9 | | 28 |
| κ | 214.3 | 2.8 | | ♎ 4° |
| ι | 213.8 | 7.1 | | 4 |
| 109 | 218.5 | 17.0 | | 9 |
| μ | 219.9 | 9.6 | | 10 |
| | | | | |
| Libra (♎) | | | | |
| α | 224.9° | 0.3° | | ♎ 15° |
| β | 229.3 | 8.8 | | 19 |
| σ | 230.7 | -7.7 | | 21 |
| γ | 235.0 | 4.3 | | 25 |
| υ | 238.6 | -8.5 | | 29 |
| θ | 239.7 | 3.4 | | 30 |

Figure 2D

| Constellation/Star | | Vernal Equinox LONGITUDE | Origin LATITUDE | | each Sign as 30° of 360° Longitude in Zodiac Sign (rounded) |
|---|---|---|---|---|---|
| Scorpio (♏) | | | | | |
| π | | 243.0° | -5.5° | | ♏ 3° |
| δ | | 242.5 | -2.0 | | 3 |
| β | | 243.1 | 0.9 | | 3 |
| α | | 249.7 | -4.6 | | 10 |
| ε | | 255.3 | -11.8 | | 15 |
| ζ | | 257.1 | -19.7 | | 17 |
| λ | | 264.5 | -13.8 | | 25 |
| θ | | 265.5 | -19.7 | | 26 |
| ι' | | 267.4 | -16.8 | | 27 |
| | | | | | |
| Sagittarius (♐) | | | | | |
| χ | | 267.1° | -4.4° | | ♏ 27° |
| γ | | 271.1 | -6.2 | | ♐ 1° |
| μ | | 273.0 | 2.3 | | 3 |
| δ | | 274.4 | -6.5 | | 4 |
| λ | | 276.1 | -2.1 | | 6 |
| η | | 273.5 | -13.4 | | 4 |
| ε | | 275.0 | -11.1 | | 5 |
| φ | | 280.0 | -3.9 | | 10 |
| σ | | 282.3 | -3.5 | | 12 |
| ζ | | 283.5 | -7.3 | | 14 |
| τ | | 284.6 | -5.1 | | 15 |
| π | | 286.1 | 1.4 | | 16 |
| β | | 285.7 | -22.2 | | 16 |
| α | | 286.5 | -18.4 | | 17 |
| ι | | 292.5 | -20.7 | | 23 |
| θ' | | 294.7 | -14.4 | | 25 |
| ω | | 295.7 | -5.4 | | 26 |
| | | | | | |
| Capricorn (♑) | | | | | |
| α | | 303.9° | 6.9° | | ♑ 4° |
| β | | 304.0 | 4.6 | | 4 |
| ω | | 307.8 | -8.9 | | 8 |
| θ | | 313.6 | -0.5 | | 14 |
| ζ | | 316.8 | -6.9 | | 17 |
| δ | | 323.5 | -2.6 | | 24 |

Figure 2E

| Constellation/Star | LONG. | LAT. | | 30/360° Zodiac Sign (rounded) | Corresponding Part of the Zodiac Symbol |
|---|---|---|---|---|---|
| Aquarius (♒) | | | | | the Waterman |
| ε | 311.6° | 8.1° | | ♑ 12° | Back Hand of the Waterman |
| μ | 312.9 | 8.3 | | 13 | Back Wrist of the Waterman |
| β | 323.3 | 8.6 | | 23 | Back Arm of the Waterman |
| ι | 328.6 | -2.1 | | 29 | Back Hip of the Waterman |
| α | 333.4 | 10.6 | | ♒ 3° | Shoulder of the Waterman |
| θ | 333.3 | 2.7 | | 3 | Stomach of the Waterman |
| γ | 335.0 | 4.4 | | 5 | Heart of the Waterman |
| τ | 338.5 | -5.6 | | 8 | Front Thigh of the Waterman |
| ζ | 338.7 | 8.9 | | 9 | Bottom of Water Vessel |
| δ | 338.7 | -8.1 | | 9 | Front Knee of the Waterman |
| 88 | 339.9 | -14.5 | | 10 | Pouring Water from Vessel |
| η | 340.3 | 8.2 | | 10 | Front Arm Holding Vessel |
| λ | 341.4 | -0.3 | | 11 | Top of Water Vessel |
| φ | 347.0 | -1.0 | | 17 | Spout of the Water Vessel |
| | | | | | |
| Pisces (♓) | | | | | the Fishes |
| γ | 351.4° | 7.3° | | ♒ 21° | Back Tip of Downward Fish |
| ι | 357.4 | 7.2 | | 28 | Back Fin of Downward Fish |
| ω | 357.5 | 6.4 | | 28 | Back Fin of Downward Fish |
| δ | 14.0 | 2.2 | | ♓ 14° | Backbone of Downward Fish |
| μ | 23.1 | -3.0 | | 23 | Head of Downward Fish |
| φ | 26.3 | 15.6 | | 26 | Head of Upward Fish |
| η | 26.7 | 5.4 | | 27 | Backbone of Upward Fish |
| τ | 28.2 | 20.8 | | 28 | Top Tip of Upward Fish |
| α | 29.4 | -9.1 | | 29 | Meeting Point of the Fishes |
| | | | | | |
| Aries (♈) | | | | | the Ram |
| γ | 33.2° | 7.2° | | ♈ 3° | Horn of the Ram |
| β | 33.8 | 8.5 | | 4 | Forehead of the Ram |
| α | 37.6 | 10.0 | | 8 | Jaw of the Ram |
| 41 | 48.0 | 10.5 | | 18 | Backbone of the Ram |

Figure 2F

| Constellation/Star | LONG. | LAT. | | 30/360° Zodiac Sign (rounded) | Corresponding Part of the Zodiac Symbol |
|---|---|---|---|---|---|
| Taurus (♉) | | | | | the Bull |
| o | 51.0° | -9.3° | | ♈ 21° | Mouth of the Bull |
| ξ | 51.9 | -8.8 | | 22 | Nostril of the Bull |
| λ | 60.5 | -7.9 | | ♉ 1° | Nose of the Bull |
| γ | 65.6 | -5.7 | | 6 | Arch of the Bull's Brow |
| δ | 66.6 | -3.9 | | 7 | Eye of the Bull |
| ε | 68.4 | -2.3 | | 8 | Ear of the Bull |
| α | 69.6 | -5.4 | | 10 | Base of the Southern Horn |
| τ | 72.1 | 0.8 | | 12 | Base of the Northern Horn |
| β | 82.5 | 5.4 | | 22 | Tip of the Northern Horn |
| ζ | 84.6 | -2.1 | | 25 | Tip of the Southern Horn |
| | | | | | |
| Gemini (♊) | | | | | the Twins |
| μ | 95.1° | -0.8° | | ♊ 5° | Inner Foot of the Twins |
| ν | 96.6 | -3.0 | | 7 | Inner Foot of the Twins |
| γ | 98.9 | -6.6 | | 9 | Outer Foot of the Twins |
| ε | 99.7 | 2.1 | | 10 | Outer Foot of the Twins |
| ξ | 101.1 | -10.1 | | 11 | Land Underfoot of Twins |
| ζ | 104.9 | -2.0 | | 15 | Hip of the Twins |
| δ | 108.5 | -0.2 | | 19 | Heart of the Twins |
| α | 110.1 | 10.1 | | 20 | Shoulder of the Twins |
| β | 113.1 | 6.7 | | 23 | Throat of the Twins |
| κ | 113.6 | 3.1 | | 24 | Shoulder of the Twins |
| | | | | | |
| Cancer (♋) | | | | | the Crab |
| β | 124.1° | -10.3 | | ♋ 4° | Pincer Claw of the Crab |
| ι | 126.2 | 10.4 | | 6 | Front Face of the Crab |
| γ | 127.5 | 3.2 | | 8 | Front Face of the Crab |
| δ | 128.6 | 0.1 | | 9 | Base of Claw of the Crab |
| α | 133.5 | -5.1 | | 13 | Front Shell of the Crab |

Figure 2G

| Constellation/Star | | LONG. | LAT. | | 30/360° Zodiac Sign (rounded) | Corresponding Part of the Zodiac Symbol |
|---|---|---|---|---|---|---|
| Leo (♌) | | | | | | the Lion |
| ε | | 140.5° | 9.7° | | ♋ 21° | Mouth of the Lion |
| μ | | 141.3 | 12.3 | | 21 | Nostril of the Lion |
| ζ | | 147.4 | 11.8 | | 27 | Mane of the Lion |
| η | | 147.8 | 4.8 | | 28 | Throat of the Lion |
| α | | 149.7 | 0.5 | | 30 | Chest of the Lion |
| γ | | 149.6 | 8.8 | | 30 | Neck of the Lion |
| δ | | 161.3 | 14.3 | | ♌ 11° | Backbone of the Lion |
| θ | | 163.4 | 9.7 | | 13 | Guts of the Lion |
| β | | 171.6 | 12.7 | | 21 | Rear Haunch of the Lion |
| | | | | | | |
| Virgo (♍) | | | | | | the Virgin |
| β | | 177.0° | 0.6° | | ♌ 27° | Face of the Virgin |
| γ | | 190.0 | 2.7 | | ♍ 10° | Heart of the Virgin |
| ε | | 190.0 | 16.2 | | 10 | Outstretched Hand of Virgin |
| δ | | 191.4 | 8.5 | | 11 | Breast of the Virgin |
| θ | | 198.0 | 1.6 | | 18 | Waist of the Virgin |
| ζ | | 201.9 | 8.5 | | 22 | Belt Sash of the Virgin |
| α | | 203.8 | -2.1 | | 24 | Hip of the Virgin |
| τ | | 207.6 | 12.9 | | 28 | Knee of the Virgin |
| κ | | 214.3 | 2.8 | | ♎ 4° | Palm Leaf of the Virgin |
| ι | | 213.8 | 7.1 | | 4 | Knee of the Virgin |
| 109 | | 218.5 | 17.0 | | 9 | Foot of the Virgin |
| μ | | 219.9 | 9.6 | | 10 | Foot of the Virgin |
| | | | | | | |
| Libra (♎) | | | | | | the Balance |
| α | | 224.9° | 0.3° | | ♎ 15° | Handle of the Balance |
| β | | 229.3 | 8.8 | | 19 | Northern Arm of the Balance |
| σ | | 230.7 | -7.7 | | 21 | Southern Arm of the Balance |
| γ | | 235.0 | 4.3 | | 25 | Chain Holding the Scales |
| υ | | 238.6 | -8.5 | | 29 | Southern Scale of the Balance |
| θ | | 239.7 | 3.4 | | 30 | Northern Scale of the Balance |

Figure 2H

| Constellation/Star | LONG. | LAT. | | 30/360° Zodiac Sign (rounded) | Corresponding Part of the Zodiac Symbol |
|---|---|---|---|---|---|
| Scorpio (♏) | | | | | the Scorpion |
| π | 243.0° | -5.5° | | ♏ 3° | Southern Claw of Scorpion |
| δ | 242.5 | -2.0 | | 3 | Mouth of the Scorpion |
| β | 243.1 | 0.9 | | 3 | Northern Claw of Scorpion |
| α | 249.7 | -4.6 | | 10 | Thorax of the Scorpion |
| ε | 255.3 | -11.8 | | 15 | Abdomen of the Scorpion |
| ζ | 257.1 | -19.7 | | 17 | Base of Tail of the Scorpion |
| λ | 264.5 | -13.8 | | 25 | Stinger on Tail of Scorpion |
| θ | 265.5 | -19.7 | | 26 | Segment of Tail of Scorpion |
| ι' | 267.4 | -16.8 | | 27 | End of Tail of Scorpion |
| | | | | | |
| Sagittarius (♐) | | | | | the Archer |
| χ | 267.1° | -4.4° | | ♏ 27° | Tip of Arrow in Archer's Bow |
| γ | 271.1 | -6.2 | | ♐ 1° | Archer's Forearm Holding Bow |
| μ | 273.0 | 2.3 | | 3 | Top of Archer's Bow |
| δ | 274.4 | -6.5 | | 4 | Arrow Drawn Back of Bow |
| λ | 276.1 | -2.1 | | 6 | Archer's Top Drawstring |
| η | 273.5 | -13.4 | | 4 | Bottom of Archer's Bow |
| ε | 275.0 | -11.1 | | 5 | Archer's Bottom Drawstring |
| φ | 280.0 | -3.9 | | 10 | Archer's Shoulder |
| σ | 282.3 | -3.5 | | 12 | Archer's Throat |
| ζ | 283.5 | -7.3 | | 14 | Archer's Heart |
| τ | 284.6 | -5.1 | | 15 | Archer's Hand Pulling Bow |
| π | 286.1 | 1.4 | | 16 | Head of the Archer |
| β | 285.7 | -22.2 | | 16 | Front Leg of the Archer |
| α | 286.5 | -18.4 | | 17 | Front Leg of the Archer |
| ι | 292.5 | -20.7 | | 23 | Front Girdle of the Archer |
| θ' | 294.7 | -14.4 | | 25 | Haunch of the Archer |
| ω | 295.7 | -5.4 | | 26 | Tail of the Archer |
| | | | | | |
| Capricorn (♑) | | | | | the Sea Goat |
| α | 303.9° | 6.9° | | ♑ 4° | Head of the Sea Goat |
| β | 304.0 | 4.6 | | 4 | Snout of the Sea Goat |
| ω | 307.8 | -8.9 | | 8 | Front Girdle of the Sea Goat |
| θ | 313.6 | -0.5 | | 14 | Back of the Sea Goat |
| ζ | 316.8 | -6.9 | | 17 | Belly of the Sea Goat |
| δ | 323.5 | -2.6 | | 24 | Fishlike Tail of the Sea Goat |

Figure 3

|  | Dates under Invention's Methods |  |  |
|---|---|---|---|
| Sun ("Birth") Sign |  | Lunar ("Animal") Sign |  |
|  |  |  |  |
| Pisces | March 21 - April 19 | Dragon |  |
| Aries | April 20 - May 20 | Snake |  |
| Taurus | May 21 - June 21 | Horse |  |
| Gemini | June 22 - July 22 | Sheep |  |
| Cancer | July 23 - August 22 | Monkey |  |
| Leo | August 23 - Sept. 22 | Rooster |  |
| Virgo | September 23 - Oct. 23 | Dog |  |
| Libra | October 24 - Nov. 21 | Pig |  |
| Scorpio | November 22 - Dec. 21 | Rat |  |
| Sagittarius | December 22 - Jan. 19 | Ox |  |
| Capricorn | January 20 - Feb. 18 | Tiger |  |
| Aquarius | February 19 - March 20 | Rabbit |  |
|  |  |  |  |

|  | Invention's Zodiac Sun Sign | Invention's Lunar Animal Sign |  |
|---|---|---|---|
| Equinox/Solstice: |  |  |  |
| Vernal (March 21) | Pisces, 0 degrees | Dragon |  |
| Solstice (June 22) | Gemini, 0 degrees | Sheep |  |
| Autumnal (Sept. 23) | Virgo, 0 degrees | Dog |  |
| Solstice (Dec. 22) | Sagittarius, 0 degrees | Ox |  |

| Lunar Animal Sign | Ascendant for Hours | Invention's Solar Sign | Western Solar Sign |
|---|---|---|---|
|  |  |  |  |
| Rat | 11 P.M. to 1 A.M. | Scorpio | Sagittarius |
| Ox | 1 A.M. to 3 A.M. | Sagittarius | Capricorn |
| Tiger | 3 A.M. to 5 A.M. | Capricorn | Aquarius |
| Rabbit | 5 A.M. to 7 A.M. | Aquarius | Pisces |
| Dragon | 7 A.M. to 9 A.M. | Pisces | Aries |
| Snake | 9 A.M. to 11 A.M. | Aries | Taurus |
| Horse | 11 A.M. to 1 P.M. | Taurus | Gemini |
| Sheep | 1 P.M. to 3 P.M. | Gemini | Cancer |
| Monkey | 3 P.M. to 5 P.M. | Cancer | Leo |
| Rooster | 5 P.M. to 7 P.M. | Leo | Virgo |
| Dog | 7 P.M. to 9 P.M. | Virgo | Libra |
| Pig | 9 P.M. to 11 P.M. | Libra | Scorpio |

Figure 3A

| Vernal Equinox (March 21) | Aquarius 30° |
|---|---|
| Solstice (June 22) | Taurus 30° |
| Autumnal Equinox (Sept. 22) | Leo 30° |
| Solstice (Dec. 22) | Scorpio 30° |

| Lunar Animal Sign | Dates of Sign | Zodiac Sun Sign |
|---|---|---|
| Rat | November 23 - Dec. 22 | Scorpio |
| Ox | December 23 - Jan. 20 | Sagittarius |
| Tiger | January 21 - Feb. 19 | Capricorn |
| Rabbit | February 20 - March 21 | Aquarius |
| Dragon | March 22 - April 20 | Pisces |
| Snake | April 21 - May 21 | Aries |
| Horse | May 22 - June 22 | Taurus |
| Sheep | June 23 - July 23 | Gemini |
| Monkey | July 24 - August 23 | Cancer |
| Rooster | August 24 - Sept. 22 | Leo |
| Dog | September 23 - Oct. 23 | Virgo |
| Pig | October 24 - Nov. 22 | Libra |

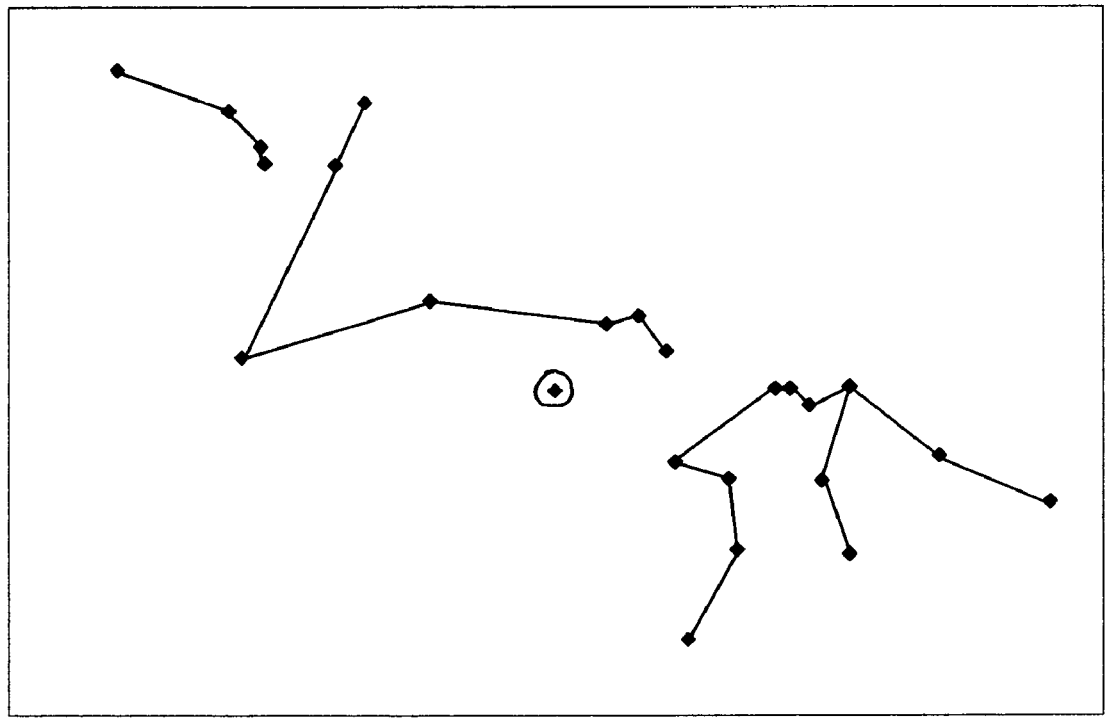

Figure 3B

|  | Invention's Methods | Western Tropical | Eastern Vedic Sidereal |
|---|---|---|---|
| Sun ("Birth") Sign |  |  |  |
| Pisces | March 21 - April 19 | February 19 - March 20 | March 15 - |
| Aries | April 20 - May 20 | March 21 - April 19 | April 14 - |
| Taurus | May 21 - June 21 | April 20 - May 20 | May 15 - |
| Gemini | June 22 - July 22 | May 21 - June 21 | June 16 - |
| Cancer | July 23 - August 22 | June 22 - July 22 | July 17 - |
| Leo | August 23 - Sept. 22 | July 23 - August 22 | August 17 - |
| Virgo | September 23 - Oct. 23 | August 23 - Sept. 22 | September 17 - |
| Libra | October 24 - Nov. 21 | September 23 - Oct. 23 | October 18 - |
| Scorpio | November 22 - Dec. 21 | October 24 - Nov. 21 | November 16- |
| Sagittarius | December 22 - Jan. 19 | November 22 - Dec. 21 | December 16 - |
| Capricorn | January 20 - Feb. 18 | December 22 - Jan. 19 | January 14 - |
| Aquarius | February 19 - March 20 | January 20 - Feb. 18 | February 13 - |

|  | Invention's Methods | Western Tropical | Eastern Vedic Sidereal |
|---|---|---|---|
| Equinox/Solstice: |  |  |  |
| Vernal (March 21) | Pisces, 0 degrees | Aries, 0 degrees | Pisces, about 6 degrees |
| Solstice (June 22) | Gemini, 0 degrees | Cancer, 0 degrees | Gemini, about 6 degrees |
| Autumnal (Sept. 23) | Virgo, 0 degrees | Libra, 0 degrees | Virgo, about 6 degrees |
| Solstice (Dec. 22) | Sagittarius, 0 degrees | Capricorn, 0 degrees | Sagittarius, about 6 deg. |

Figure 4

| Day | Sun | Moon | Mercury | Venus | Mars | Jupiter | Saturn | Uranus | Neptune | Pluto |
|---|---|---|---|---|---|---|---|---|---|---|
| 1 | 12°♑ | 3°♓ | 28°♐ | 19°r♐ | 5°♒ | 29°♑ | 15°♓ | 9°♑ | 0°♑ | 8°♏ |
| 2 | 13 | 17 | 29 | 19 | 6 | | | | | |
| 3 | 14 | 2°♈ | 1°♑ | 19 | 7 | | | | | |
| 4 | 15 | 16 | 2 | 19 | 8 | | | | | |
| 5 | 16 | 29 | 4 | 19 | 8 | | | | | |
| 6 | 17 | 13°♉ | 5 | 19°d | 9 | 0°♒ | 16 | | | |
| 7 | 18 | 26 | 7 | 19 | 10 | | | | | |
| 8 | 19 | 9°♊ | 9 | 19 | 11 | | | 9 | 0 | 8 |
| 9 | 20 | 22 | 10 | 19 | 12 | | | | | |
| 10 | 21 | 5°♋ | 12 | 19 | 12 | | | | | |
| 11 | 22 | 17 | 14 | 19 | 13 | | | | | |
| 12 | 23 | 29 | 15 | 19 | 14 | 2 | 16 | | | |
| 13 | 24 | 12°♌ | 17 | 20 | 15 | | | | | |
| 14 | 25 | 23 | 19 | 20 | 15 | | | | | |
| 15 | 26 | 5°♍ | 20 | 20 | 16 | | | 10 | 1 | 8 |
| 16 | 27 | 17 | 22 | 20 | 17 | | | | | |
| 17 | 28 | 29 | 24 | 21 | 18 | | | | | |
| 18 | 29 | 11°♎ | 26 | 21 | 19 | 3 | 17 | | | |
| 19 | 0°♈ | 23 | 27 | 22 | 19 | | | | | |
| 20 | 1 | 5°♏ | 29 | 22 | 20 | | | | | |
| 21 | 2 | 18 | 1°♒ | 23 | 21 | | | | | |
| 22 | 3 | 1°♐ | 3 | 23 | 22 | | | 10 | 1 | 8 |
| 23 | 4 | 14 | 5 | 24 | 23 | | | | | |
| 24 | 5 | 28 | 7 | 24 | 23 | 5 | 18 | | | |
| 25 | 6 | 12°♑ | 8 | 25 | 24 | | | | | |
| 26 | 7 | 27 | 10 | 25 | 25 | | | | | |
| 27 | 8 | 12°♒ | 12 | 26 | 26 | | | | | |
| 28 | 9 | 27 | 14 | 27 | 26 | | | | | |

| Jan. | Feb. | Mar. | Apr. | May | June | July | Aug. | Sept. | Oct. | Nov. | Dec. |
|---|---|---|---|---|---|---|---|---|---|---|---|
| 20♑12 | 18♒21 | 20♓20 | 20♈07 | 21♉06 | 21♊14 | 23♋01 | 23♌08 | 23♍05 | 23♎15 | 22♏13 | 22♐02 |

| Jan. | Feb. | Mar. | Apr. | May | June | July | Aug. | Sept. | Oct. | Nov. | Dec. |
|---|---|---|---|---|---|---|---|---|---|---|---|
| 20♑18 | 19♒08 | 20♓07 | 19♈18 | 20♉18 | 21♊02 | 22♋13 | 22♌20 | 22♍17 | 23♎03 | 22♏00 | 21♐13 |

Figure 4A

| Jan. | Feb. | Mar. | April | May | June | July | Aug. | Sept. | Oct. | Nov. | Dec. |
|---|---|---|---|---|---|---|---|---|---|---|---|
| 1♑6 | 21♑4 | 9♑3 | 16♑1 | 5♑0 | 12♐28 | 1♐27 | 7♐25 | 14♐23 | 3♐22 | 10♐20 | 18♐18 |
|  |  |  |  | 6♐29 |  | 19 26 |  |  |  |  |  |
| 31 5 |  | 29 2 |  |  |  |  | 26 24 |  | 22 21 | 29 19 |  |

| Lat: |  | 2° | 4° | 7° | 11° | 14° | 18° | 22° | ...→ | 60° |
|---|---|---|---|---|---|---|---|---|---|---|
| LST | MC | ASC | ASC | ASC | ASC | ASC | ASC | ASC | ASC | ASC |
| 0 0 | 0°♓ | 0°♊ | 1°♊ | 3°♊ | 4°♊ | 6°♊ | 7°♊ | 9°♊ |  | 4°♋ |
| 0 4 | 1°♓ | 1°♊ | 2°♊ | 4°♊ | 5°♊ | 7°♊ | 8°♊ | 10°♊ |  | 5°♋ |
| 0 8 | 2°♓ | 2°♊ | 3°♊ | 5°♊ | 6°♊ | 8°♊ | 9°♊ | 11°♊ |  | 6°♋ |
| 0 12 | 3°♓ | 3°♊ | 4°♊ | 5°♊ | 7°♊ | 8°♊ | 10°♊ | 12°♊ |  | 6°♋ |
| 0 16 | 4°♓ | 4°♊ | 5°♊ | 6°♊ | 8°♊ | 9°♊ | 11°♊ | 13°♊ |  | 7°♋ |
| ...↓ |  |  |  |  |  |  |  |  |  |  |
| 24 0 | 30°♒ | 0°♊ | 1°♊ | 3°♊ | 4°♊ | 6°♊ | 7°♊ | 9°♊ |  | 4°♋ |

| 2000 | Jan. | Feb. | Mar. | April | May | June | July | Aug. | Sept. | Oct. | Nov. | Dec. |
|---|---|---|---|---|---|---|---|---|---|---|---|---|
| Planet |  |  |  |  |  |  |  |  |  |  |  |  |
| Mars | 29°♑ | 23°♒ | 14°♓ | 7°♈ | 29° | 20°♉ | 10°♊ | 1°♋ | 21° | 9°♌ | 29° | 17°♍ |
| Juptr | 26°♓ | 29° | 3°♈ | 10° | 17° | 24° | 0°♉ | 6° | 10° | 12° | 10° | 6° |
| Satrn | 9°♈ | 10° | 11° | 15° | 19° | 23° | 26° | 29° | 1°♉ | 0° | 28°♈ | 25° |
| Urans | 2°♑ | 3° | 4° | 4° | 5° | 5° | 4° | 3° | 3° | 2° | 2° | 3° |
| Pluto | 11°♏ | 12° | 12° | 12° | 12° | 11° | 10° | 10° | 10° | 10° | 11° | 12° |

Figure 5

| 11/60 | Sun | Moon | Mercury | Venus | Mars | Jupiter | Saturn | Uranus | Neptune | Pluto |
|---|---|---|---|---|---|---|---|---|---|---|
| Day | | L | O | N | G | I | T | U | D | E |
| 19 | ♎27° | ♏4° | ♎8° | ♐5° | ♊18° | ♐4° | ♐15° | ♋25° | ♎9° | ♌8° |
| 20 | 28° | 19° | 9° | 6° | | | | | | |
| 21 | 29° | ♐4° | 10° | 7° | 18°r | 5° | 15° | 25° | 10° | 8° |
| 22 | ♏0° | 18° | 10° | 8° | | | | | | |
| 23 | 1° | ♑3° | 11° | 10° | 18° | 5° | 15° | 25° | 10° | 8° |
| Day | | L | A | T | I | T | U | D | E | |
| 19 | 0 | 4°50' | 2°23 | -2°00 | 1°55 | -0°01 | 0°10 | 0°43 | 1°43 | 12°33 |
| 21 | 0 | 4°31 | 2°25 | -2°04 | 2°03 | -0°02 | 0°10 | 0°43 | 1°43 | 12°35 |
| 25 | 0 | 1°31 | 2°21 | -2°08 | 2°12 | -0°02 | 0°10 | 0°43 | 1°43 | 12°36 |

| November 1960 | Sidereal Time |
|---|---|
| 19 | 15h 54m |
| 20 | 15h 58m |
| 21 | 16h 02m |
| 22 | 16h 06m |
| 23 | 16h 10m |
| 24 | 16h 14m |
| 25 | 16h 18m |

| November 1960 | North Lunar Node |
|---|---|
| 1 | Leo 13° |
| 3 | Leo 12° |
| 21 | Leo 11° |

| | | | Houses | | | |
|---|---|---|---|---|---|---|
| | ASC | MC | 11th | 12th | 2nd | 3rd |
| LST 9h12m | | | | | | |
| Lat. 38° | ♎ 9° | ♋ 15° | ♌ 18° | ♍ 16° | ♏ 8° | ♐ 10° |
| Lat. 39° | ♎ 8° | ♋ 15° | ♌ 18° | ♍ 16° | ♏ 7° | ♐ 10° |
| Lat. 40° | ♎ 8° | ♋ 15° | ♌ 18° | ♍ 16° | ♏ 7° | ♐ 10° |
| Lat. 41° | ♎ 8° | ♋ 15° | ♌ 18° | ♍ 16° | ♏ 6° | ♐ 10° |
| LST 9h 14m | | | | | | |
| Lat. 38° | ♎ 9° | ♋ 16° | ♌ 19° | ♍ 17° | ♏ 8° | ♐ 11° |
| Lat. 39° | ♎ 9° | ♋ 16° | ♌ 19° | ♍ 16° | ♏ 8° | ♐ 11° |
| Lat. 40° | ♎ 8° | ♋ 15° | ♌ 18° | ♍ 16° | ♏ 7° | ♐ 10° |
| Lat. 41° | ♎ 8° | ♋ 15° | ♌ 18° | ♍ 16° | ♏ 6° | ♐ 10° |
| LST 9h 16m | | | | | | |
| Lat. 38° | ♎ 9° | ♋ 16° | ♌ 19° | ♍ 17° | ♏ 8° | ♐ 11° |
| Lat. 39° | ♎ 9° | ♋ 16° | ♌ 19° | ♍ 17° | ♏ 8° | ♐ 11° |
| Lat. 40° | ♎ 9° | ♋ 16° | ♌ 19° | ♍ 16° | ♏ 8° | ♐ 11° |
| Lat. 41° | ♎ 9° | ♋ 16° | ♌ 19° | ♍ 16° | ♏ 7° | ♐ 11° |

| Planetary Component Data | | | |
|---|---|---|---|
| Sun: | ♎ 29° Lat. 0° | Saturn: | ♐ 15° Lat. 0° |
| Moon: | ♐ 3° Lat. 4° | Uranus: | ♋ 25° Lat. 1° |
| Mercury: | ♎ 10° Lat. 2° | Neptune: | ♎ 10° Lat. 2° |
| Venus: | ♐ 7° Lat.-2° | Pluto: | ♌ 8° Lat. 12° |
| Mars: | ♊ 18° Lat. 2° | N Node: | ♌ 11° Lat. 0° |
| Jupiter: | ♐ 5° Lat. -0° | S Node: | ♍ 11° Lat. 0° |

| Axial Component Data | |
|---|---|
| Ascendant ♎ 9° | Midheaven ♋ 16° |
| Descendant ♈ 9° | Imum Coeli ♑ 16° |
| 2nd House: ♏ 8° | 11th House: ♌ 19° |
| 3rd House: ♐ 11° | 12th House: ♍ 16° |
| 8th House: ♉ 8° | 5th House: ♒ 19° |
| 9th House: ♊ 11° | 6th House: ♓ 16° |

Figure 5A

| 30/360 Planetary Positions: | | |
|---|---|---|
| Sun: | in Libra (29°) | : 1st House |
| Moon: | in Sagittarius (3°) | : 2nd House |
| Mercury: | in Libra (10°) | : 1st House/ASC |
| Venus: | in Sagittarius (7°) | : 2nd House |
| Mars: | in Gemini (19°) | : 9th House |
| Jupiter: | in Sagittarius (5°) | : 2nd House |
| Saturn: | in Sagittarius (15°) | : 3rd House |
| Uranus: | in Cancer (26°) | : 10th House |
| Neptune: | in Libra (10°) | : 1st House/ASC |
| Pluto: | in Leo (8°) | : 10th House |
| plus Lunar Nodes: | | |
| North: | in Leo (11°) | : 10th House |
| South: | in Aquarius (11°) | : 5th House |

| Western Planetary Positions: | | |
|---|---|---|
| Sun: | in Scorpio (29°) | : 1st House |
| Moon: | in Capricorn (3°) | : 2nd House |
| Mercury: | in Scorpio (10°) | : 1st House/ASC |
| Venus: | in Capricorn (7°) | : 2nd House |
| Mars: | in Cancer (19°) | : 9th House |
| Jupiter: | in Capricorn (5°) | : 2nd House |
| Saturn: | in Capricorn (15°) | : 3rd House |
| Uranus: | in Leo (26°) | : 10th House |
| Neptune: | in Scorpio (10°) | : 1st House/ASC |
| Pluto: | in Virgo (8°) | : 10th House |
| plus Lunar Nodes: | | |
| North: | in Virgo (11°) | : 10th House |
| South: | in Pisces (11°) | : 5th House |

| 12 Constellation Stars Planetary Positions: | |
|---|---|
| Sun: | in Libra |
| Moon: | in Sagittarius |
| Mercury: | in Virgo |
| Venus: | in Sagittarius |
| Mars: | in Gemini |
| Jupiter: | in Sagittarius |
| Saturn: | in Sagittarius |
| Uranus: | in Leo |
| Neptune: | in Libra |
| Pluto: | in Leo |
| plus Lunar Nodes: | |
| North: | in Leo |
| South: | in Aquarius |

Angular Regents:
Ascendant: ASC of Libra (9°)
Midheaven: MC of Cancer (16°)
Descendant: DSC of Aries (9°)
ImumCoeli: IC of Capricorn (16°)
Houses w/Zodiacal Regents Angular Regents:
Ascendant: ASC of Scorpio (9°)
Midheaven: MC of Leo (16°)
Descendant: DSC of Taurus (9°)
ImumCoeli: IC of Aquarius (16°)
Houses w/Zodiacal Regents Angular Regents:
Ascendant: ASC of Libra
Midheaven: MC of Cancer
Descendant: DSC of Aries
ImumCoeli: IC of Capricorn
Houses w/Zodiacal Regents Astrological Disposition:
Planets by Element
 Fire: 5  Water: 1
 Air: 4  Earth: 0
Planets by Quality
 Cardinal: 4
 Fixed: 1
 Mutable: 5
Planets by Polarity (M/F)
 Positive: 9  Negative: 1
Planets in Regency
 Jupiter in Sagittarius
Planets in Exaltation
 Pluto in Leo
Planets in Detriment N/A
Planets in Fall
 Sun in Libra
End Depositor Planet
 Jupiter in Sagittarius
Mutual Reception N/A Astrological Disposition:
Planets by Element
 Fire: 1  Water: 4
 Air: 0  Earth: 5
Planets by Quality
 Cardinal: 5
 Fixed: 4
 Mutable: 1
Planets by Polarity (M/F)
 Positive: 1  Negative: 9
Planets in Regency
 Saturn in Capricorn
Planets in Exaltation N/A
Planets in Detriment
 Uranus in Leo
Planets in Fall
 Mars in Cancer
 Jupiter in Capricorn
End Depositor Planet N/A
Mutual Reception
 Mercury,Scorpio/Pluto,Virgo Astrological Disposition:
Planets by Element
 Fire: 6  Water: 0
 Air: 3  Earth: 1
Planets by Quality
 Cardinal: 2
 Fixed: 2
 Mutable: 6
Planets by Polarity (M/F)
 Positive: 9  Negative: 1
Planets in Regency
 Mercury in Virgo
 Jupiter in Sagittarius
Planets in Exaltation
 Pluto in Leo
Planets in Detriment
 Uranus in Leo
Planets in Fall
 Sun in Libra
End Depositor Planet N/A
Mutual Reception N/A

Figure 6B

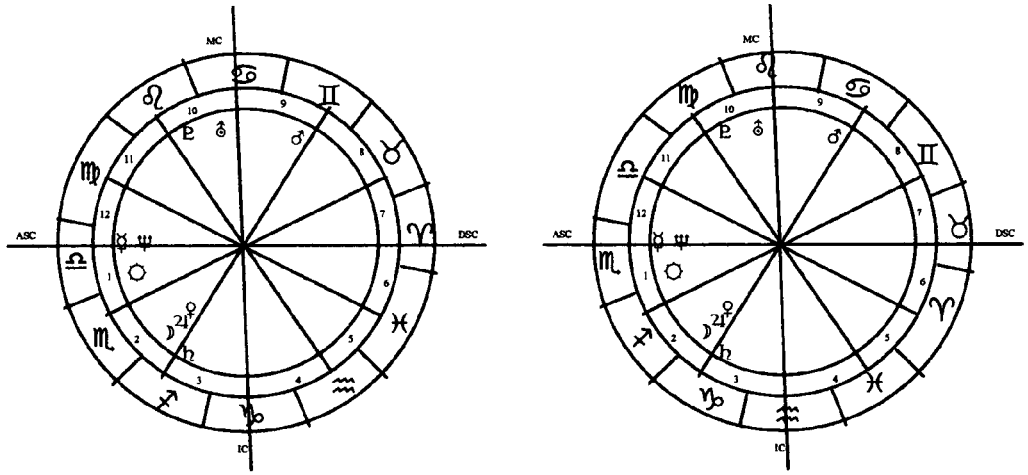

| Planetary Positions: | Astrological Disposition: | Planetary Positions: | Astrological Disposition: |
|---|---|---|---|
| Sun: in Libra 29° | Planets by Element | Sun: in Scorpio 29° | Planets by Element |
| Moon: in Sagittarius 3° | Fire: 5  Water: 1 | Moon: in Capricorn 3° | Fire: 1  Water: 4 |
| Mercury: in Libra 10° | Air: 4  Earth: 0 | Mercury: in Scorpio 10° | Air: 0  Earth: 5 |
| Venus: in Sagittarius 7° | Planets by Quality | Venus: in Capricorn 7° | Planets by Quality |
| Mars: in Gemini 19° | Cardinal: 4 | Mars: in Cancer 19° | Cardinal: 5 |
| Jupiter: in Sagittarius 5° | Fixed: 1 | Jupiter: in Capricorn 5° | Fixed: 4 |
| Saturn: in Sagittarius 15° | Mutable: 5 | Saturn: in Capricorn 15° | Mutable: 1 |
| Uranus: in Cancer 26° | Planets by Polarity (M/F) | Uranus: in Leo 26° | Planets by Polarity (M/F) |
| Neptune: in Libra 10° | Positive: 9  Negative: 1 | Neptune: in Scorpio 10° | Positive: 1  Negative: 9 |
| Pluto: in Leo 8° | Planets in Regency | Pluto: in Virgo 8° | Planets in Regency |
| plus Lunar Nodes: | Jupiter in Sagittarius | plus Lunar Nodes: | Saturn in Capricorn |
| North: in Leo 11° | Planets in Exaltation | North: in Virgo 11° | Planets in Exaltation N/A |
| South: in Aquarius 11° | Pluto in Leo | South: in Pisces 11° | Planets in Detriment |
|  | Planets in Detriment N/A |  | Uranus in Leo |
| Angular Regents: | Planets in Fall | Angular Regents: | Planets in Fall |
| Ascendant: ASC Libra 9° | Sun in Libra | Ascendant: ASC Scorpio 9° | Mars in Cancer |
| Midheaven: MC Cancer 16° | End Depositor Planet | Midheaven: MC Leo 16° | Jupiter in Capricorn |
| Descendant: DSC Aries 9° | Jupiter in Sagittarius | Descendant: DSC Taurus 9° | End Depositor Planet N/A |
| ImumCoeli: IC Capricorn 16° | Mutual Reception N/A | ImumCoeli: IC Aquarius 16° | Mutual Reception |
| Houses w/Zodiacal Regents |  | Houses w/Zodiacal Regents | Mercury,Scorpio/Pluto,Virgo |

Figure 6C

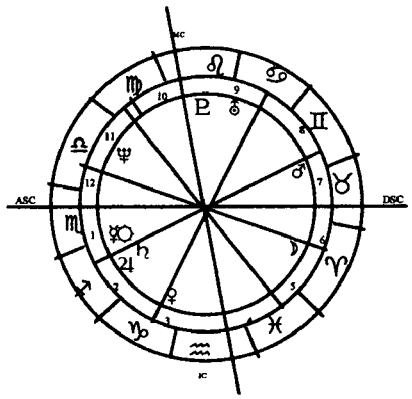

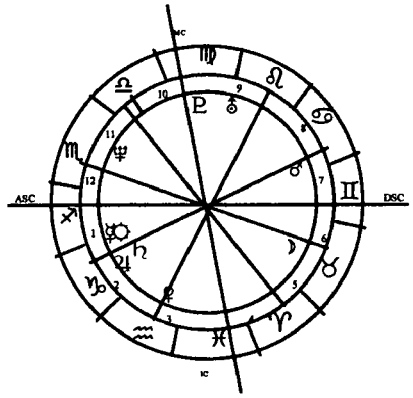

Planetary Positions:
Sun: in Sagittarius 7°
Moon: in Aries 16°
Mercury: in Sagittarius 2°
Venus: in Capricorn 21°
Mars: in Gemini 9° (R)
Jupiter: in Sagittarius 13°
Saturn: in Sagittarius 19°
Uranus: in Cancer 25°
Neptune: in Libra 11°
Pluto: in Leo 8°
plus Lunar Nodes:
  North: in Leo 10°
  South: in Aquarius 10°

Angular Regents:
Ascendant: ASC Scorpio 8°
Midheaven: MC Leo 25°
Descendant: DSC Taurus 8°
ImumCoeli: IC Aquarius 25°
Houses w/Zodiacal Regents Astrological Disposition:
Planets by Element
  Fire: 6  Water: 1
  Air: 2  Earth: 1
Planets by Quality
  Cardinal: 4
  Fixed: 1
  Mutable: 5
Planets by Polarity (M/F)
  Positive: 8  Negative: 2
Planets in Regency
  Jupiter in Sagittarius
Planets in Exaltation
  Pluto in Leo
Planets in Detriment
  Mercury in Sagittarius
Planets in Fall N/A
End Depositor Planet
  Jupiter in Sagittarius
Mutual Reception N/A Planetary Positions:
Sun: in Capricorn 7°
Moon: in Taurus 16°
Mercury: in Capricorn 2°
Venus: in Aquarius 21°
Mars: in Cancer 9° (R)
Jupiter: in Capricorn 13°
Saturn: in Capricorn 19°
Uranus: in Leo 25°
Neptune: in Scorpio 11°
Pluto: in Virgo 8°
plus Lunar Nodes:
  North: in Virgo 10°
  South: in Pisces 10°

Angular Regents:
Ascendant: ASC Sagittarius 8°
Midheaven: MC Virgo 25°
Descendant: DSC Gemini 8°
ImumCoeli: IC Pisces 25°
Houses w/Zodiacal Regents Astrological Disposition:
Planets by Element
  Fire: 1  Water: 2
  Air: 1  Earth: 6
Planets by Quality
  Cardinal: 5
  Fixed: 4
  Mutable: 1
Planets by Polarity (M/F)
  Positive: 2  Negative: 8
Planets in Regency
  Saturn in Capricorn
Planets in Exaltation
  Moon in Taurus
Planets in Detriment
  Uranus in Leo
Planets in Fall
  Mars in Cancer
  Jupiter in Capricorn
End Depositor Planet
  Saturn in Capricorn
Mutual Reception N/A

Figure 6D

| Invention Transit Component Positions 6/26/98 | | |
|---|---|---|
| Sun: Gemini 5 | Moon: Cancer 8 | Mercury: Gemini 23 |
| Venus: Taurus 2 | Mars: Taurus 23 | Jupiter: Aquarius 27 |
| Saturn: Aries P | Uranus: Capricorn 12 | Neptune: Capricorn P |
| Pluto: Scorpio 6 | ASC: Libra 10 | MC: Cancer 18 |

| Western Prior Art Transit Component Positions | | |
|---|---|---|
| Sun: Cancer 5 | Moon: Leo 8 | Mercury: Cancer 23 |
| Venus: Gemini 2 | Mars: Gemini 23 | Jupiter: Pisces 27 |
| Saturn: Taurus P | Uranus: Aquarius 12 | Neptune: Aquarius 1 |
| Pluto: Sagittarius 6 | ASC: Scorpio 10 | MC: Leo 18 |

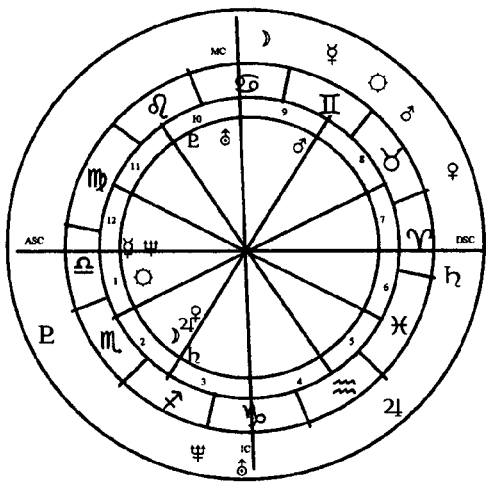
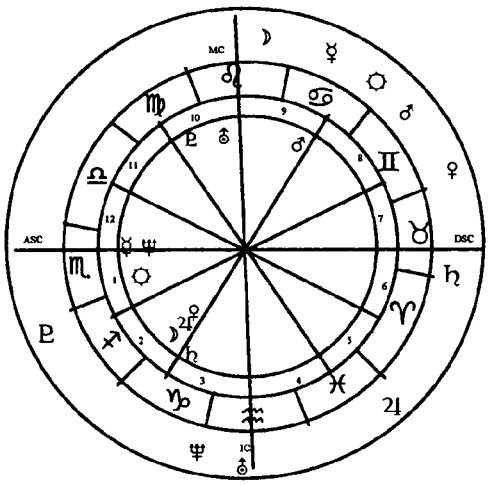
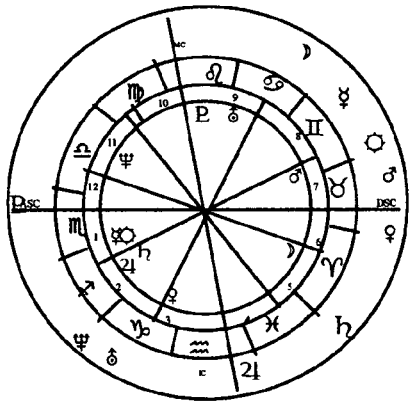
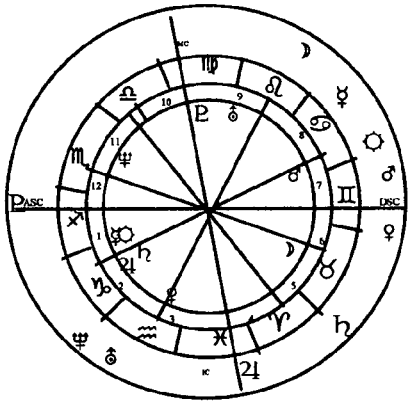

Figure 6E

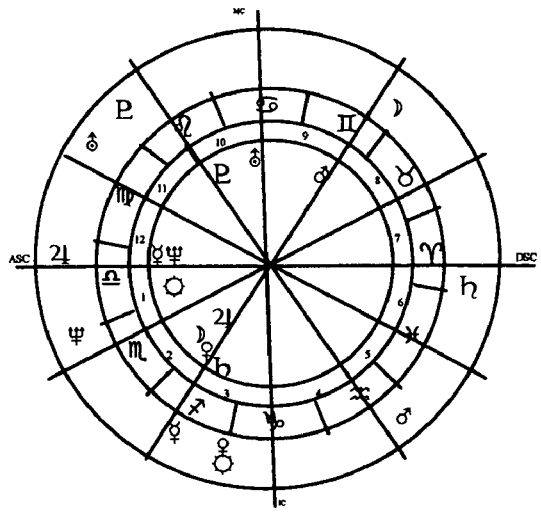

Invention's Natal Positions, January 20, 1970,
2:59 PM, Christchurch, New Zealand:
Sun: Sagittarius 29°   Moon: Gemini 3°   Mercury: Sagittarius 15°
Venus: Sagittarius 28°  Mars: Aquarius 26°  Jupiter: Libra 4°
Saturn: Aries 2°   Uranus: Virgo 8°   Neptune: Scorpio 0°
Pluto: Leo 27°   ASC: Aries 21°   MC: Aquarius 5°

Invention's Composite Positions, 1/20/1970 and 11/21/1960:
Sun: Scorpio 29°   Moon: Virgo 3°   Mercury: Sagittarius 12°
Venus: Sagittarius 17°  Mars: Aries 22°   Jupiter: Scorpio 5°
Saturn: Aquarius 8°  Uranus: Leo 17°   Neptune: Libra 20°
Pluto: Leo 17°   ASC: Cancer 15°  MC: Aries 25°

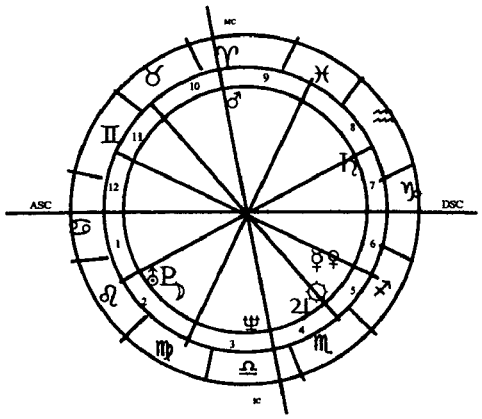

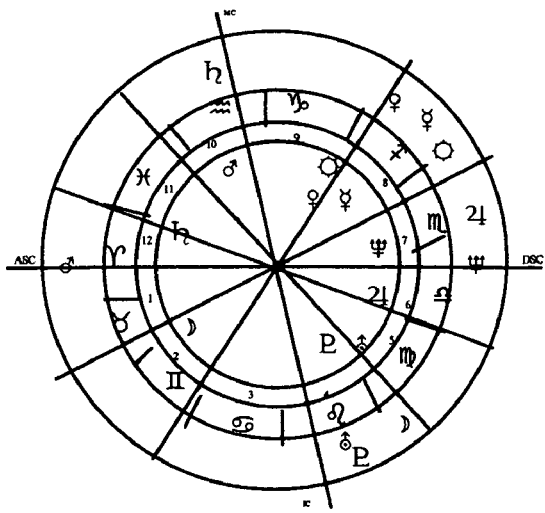

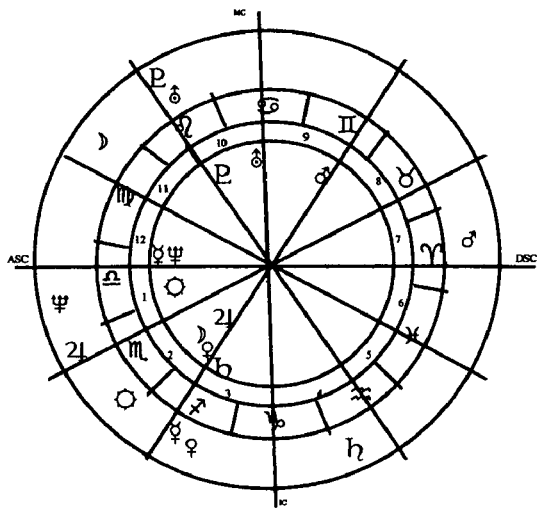

Figure 6F

| | Invention's Methods, Vedic Artifact | Vedic Sidereal Methods, Ayanamsa |
|---|---|---|
| Grahas ("Planet"): | | |
| Lagna (Ascendant) | Thula (Libra) 9 degrees | Thula (Libra) 15 degrees |
| Ravi (Sun) | Thula (Libra) 29 degrees | Vrischika (Scorpio) 5 degrees |
| Chandra (Moon) | Dhanus (Sagittarius) 3 degrees | Dhanus (Sagittarius) 9 degrees |
| Kuja (Mars) | Mithuna (Gemini) 18 degrees | Mithuna (Gemini) 24 degrees |
| Budha (Mercury) | Thula (Libra) 10 degrees | Thula (Libra) 16 degrees |
| Guru (Jupiter) | Dhanus (Sagittarius) 5 degrees | Dhanus (Sagittarius) 11 degrees |
| Sukra (Venus) | Dhanus (Sagittarius) 7 degrees | Dhanus (Sagittarius) 13 degrees |
| Sani (Saturn) | Dhanus (Sagittarius) 15 degrees | Dhanus (Sagittarius) 21 degrees |
| Rahu (North Node) | Simha (Leo) 11 degrees | Simha (Leo) 17 degrees |
| Kethu (South Node) | Kumbha (Aquarius) 11 degrees | Kumbha (Aquarius) 17 degrees |

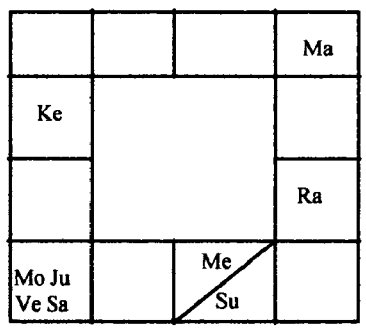
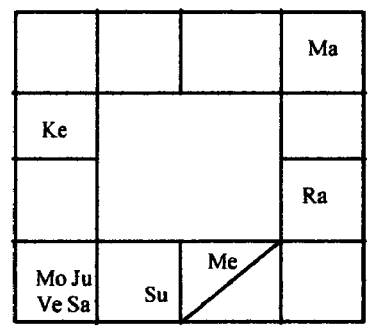
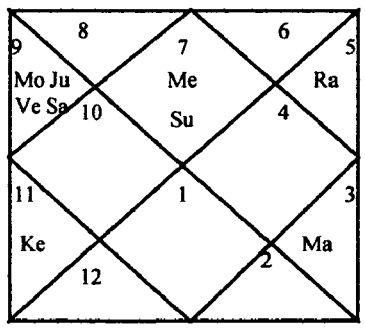
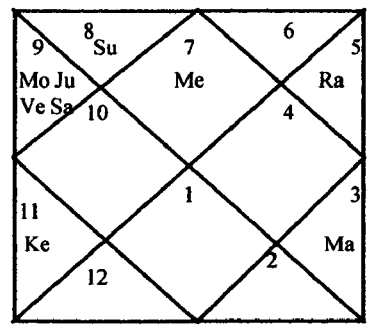

Figure 6G

| Chinese Astrology | Invention's Methods | Prior Art Methods |
|---|---|---|
| Lunar Sign for 1960 | Rat | Rat |
| Element for 1960 | Metal | Metal |
| Fixed Element, Rat | Water | Water |
| Season, Rat | Winter | Winter |
| Stem, Rat | Yang | Yang |
| Born Month of | cusp, Pig/Rat | cusp, Pig/Rat |
| - Pig | Water, Winter, Yin | Water, Winter, Yin |
| - Rat | Water, Winter, Yang | Water, Winter, Yang |
| Solar Sign | cusp, Libra/Scorpio | cusp, Scorpio/Sagittarius |
| - Zodiac Element | Air, Cardinal, Yang (Libra) | Water, Fixed, Yin (Scorpio) |
| - Zodiac Element | Water, Fixed, Yin (Scorpio) | Fire, Mutable, Yang (Sagittarius) |
| Ascendant Sign | Rabbit (Aquarius) | Rabbit (Pisces) |
| - Fixed Element, Rabbit | Wood, Spring, Yin | Wood, Spring, Yin |
| - Zodiac Element | Air, Fixed, Yang (Aquarius) | Water, Mutable, Yang (Pisces) |

| Star Name/Number | Longitude | Latitude |
|---|---|---|
| Aries Begins | 30° | N.A. |
| Mesarthim | 33.2° | 7.2° |
| Sheratan | 33.8° | 8.5° |
| Hamal | 37.6° | 10.0° |
| 41 | 48.0° | 10.5° |
| Aries Ends | 60° | N.A. |

Figure 9CI

| Planet | 30/360° Sign | Constellation | Nearby Stars | Symbol | Part of the Symbol |
|---|---|---|---|---|---|
| Sun | Libra 29° | Libra | θ Libra | the Balance | Scale of Balance |
| Moon | Sagittarius 3° | Sagittarius | μ Sagittarius | the Archer | Top of Archer's Bow |
| Mercury | Libra 10° | Virgo | κ, μ Virgo | the Virgin | Palm Leaf of Virgin |
| Venus | Sagittarius 7° | Sagittarius | λ,φ Sagittarius | the Archer | Archer's Shoulder |
| Mars | Gemini 19° | Gemini | δ Gemini | the Twins | Heart of the Twins |
| Jupiter | Sagittarius 5° | Sagittarius | λ Sagittarius | the Archer | Archer's Drawstring |
| Saturn | Sagittarius 15° | Sagittarius | π Sagittarius | the Archer | Head of Archer |
| Uranus | Cancer 26° | Leo | α, η Leo | the Lion | Chest of the Lion |
| Neptune | Libra 10° | Libra | α Libra | the Balance | Handle of Balance |
| Pluto | Leo 8° | Leo | θ Leo | the Lion | Guts of the Lion |
| | | | | | |

Figure 10

| HOROSCOPES for September 24, 1999 |
|---|

Virgo (September 23 - October 23)

With the Sun now in your sign, you will have the energy and opportunity to execute your plans and express your thoughts from the past couple weeks. Today, the Sun aligns with Neptune in Capricorn to form a beneficial trine aspect, which will infuse life with a spiritual purpose and a message to tell. Mercury in Virgo trines Uranus; ideas for changes.

Libra (October 24 - November 21)

With no planets presently in your sign, you are left to yourself to determine your thoughts and actions. The Moon in Aquarius makes you more welcome to friends. Oppositions by Jupiter and Saturn raise a hurdle, and bring someone close before the law.

Scorpio (November 22 - December 21)

With Pluto and Mars in your sign, you are running at full Scorpionic intensity, as these two planets are in rulership in Scorpio. Continue your efforts and maintain dedication to all of your initiatives. You can be greatly productive if you keep a pace.

Sagittarius (December 22 - January 19)

With no planets in your sign, life may seem empty if you don't cook something up for yourself. Long term projects continue to gain support and stature. With Uranus recently leaving your sign, a sudden change may seem smart but be a legal nightmare.

Capricorn (January 20 - February 18)

With Uranus in your sign, in favorable aspect to Mercury and Mars, your thoughts and actions are in tune for transformations, though Saturn squares. With Neptune early in your sign, recent dreams and inspirations warrant your positive energy, but outside supporters and politics may be obstructive.

Aquarius (February 19 - March 20)

With the Moon in your sign today, well aspected by Saturn, your home affairs could take a serious turn - for the better, if you keep health a priority. Unusual emotional circumstances favor romance, which may help alleviate continuing aggravations.

Pisces (March 21 - April 19)

With Pluto and Mars in fellow watersign Scorpio, and Venus in the third watersign of Cancer, living and love will be forefront in your heart and action. Your inner drive demands its suitable occupation and a partner is desired who sees deep within you.

Aries (April 20 - May 20)

With Jupiter and Saturn both in your sign, you will be called on as judge and jury, witness and suspect. Your family lends its support today for your trials - this helps to shelter you from the hardships you are facing in love. There is someone better to be with.

Taurus (May 21 - June 21)

With no planets in your sign, being alone is lonely, unless you know how to please yourself. Neptune and Uranus in Capricorn will instill a desire to make more lasting changes which are based on needs and ideals of the soul. Oppositions in Scorpio challenge your will and resolve, though support your changes.

Gemini (June 22 - July 22)

Without a planet in your sign, fill your thoughts to entertain you. The Sun squares your sign, making it difficult to realize plans and results - take your time, revise efforts and keep trying. Moon in Aquarius, sextile to Saturn, makes a home friendly and stable.

Cancer (July 23 - August 22)

With Venus in your sign, you are certain to receive attention wherever you go, but may be most pleased being at home and among family. Saturn in square could introduce losses or hardship at home. Since Pluto and Mars in Scorprio continue to be favorable for your activities and passions, it would be wise to find ways to enhance a domestic side in your plans.

Leo (August 23 - September 22)

With no planets in your sign, and the Sun having just left your sign, life may have suddenly taken a turn brought on by another person close to you. If so, you have the law and karma on your side, since Jupiter and Saturn are in Aries, a fellow fire sign.

| | Sun | Moon | Mercury | Venus | Mars | Jupiter | Saturn | Uranus | Neptune | Pluto |
|---|---|---|---|---|---|---|---|---|---|---|
| Day | | | | | | | | | | |
| 9/24/99 | 1°♍ | 18°♒ | 13°♍ | 22°♋ | 14°♏ | 3°♈ | 16°♈ | 13°♑ | 2°♑ | 8°♏ |

| | ♈ | ♉ | ♊ | ♋ | ♌ | ♍ | ♎ | ♏ | ♐ | ♑ | ♒ | ♓ |
|---|---|---|---|---|---|---|---|---|---|---|---|---|
| Planets in | | | | | | | | | | | | |
| Sign | ♃ ♄ | | | ♀ | | ☉ ☿ | | ♂ ♇ | | ⚷ ♆ | ☽ | |
| Conj. | ♃ ♄ | | | ♀ | | ☉ ☿ | | ♂ ♇ | | ⚷ ♆ | ☽ | |
| Trine | | ☉ ☿ ⚷ ♆ | ☽ | ♂ ♇ | ♃ ♄ | ⚷ ♆ | ☽ | ♀ | ♃ ♄ | ☉ ☿ | | ♀ ♂ ♇ |
| Opp. | | ♂ ♇ | | ⚷ ♆ | ☽ | | ♃ ♄ | | | ♀ | | ☉ ☿ |
| Square | ♀ ⚷ ♆ | ☽ | ☉ ☿ | ♃ ♄ | ♂ ♇ | | ♀ ⚷ ♆ | ☽ | ☉ ☿ | ♃ ♄ | ♂ ♇ | |

Figure 10B

Mark Wahlberg, aka Marky Mark, has the Sun in Taurus, a fixed earth sign. Ruler of Venus, for its physical beauty and creature comforts, symbolized as the Bull. Taurus is common among sensuous, muscular or full-figured models. He has Mercury and Venus in Aries, complementing his Sun, since Aries the Ram adds strong masculine content to his image. Venus is in detriment in Aries, but this Martian energy keys his look, words and deeds. A moon in Libra, opposite Aries, aids social standing.

Steffi Graf has her Sun, moon and Mercury all in the stubborn sign of Taurus. This makes her determined, enduring and solid under pressure or in pain. Given that the moon is exalted in Taurus, she maintains great physical fitness and healthful diet. The fixed nature of Taurus ensured a long stay at the top of her sport. The Taurus moon makes her steady and moderate, also a strong supporter of her family and home. Her Mars in its ruling sign of Aries the Ram, was her key as a top competitor, providing her the strength and will to win.

Sandra Bernhard has a Taurus Sun lending model type looks and her love of the high life. Her brash, outlandish, ribald and provocative temperaments churn out with her moon, a woman's traditional lead planet, here being in passionate, Scorpio, a position of fall for the moon. This, plus the tense opposition of her water moon to her earth Sun, both fixed signs, mixes as intense vulnerability, but also combine as deep attachments and loyalties to loved ones. Her Scorpio moon gives her a masterful, public persona.

Donald Trump is a Taurus, with many of its classic features, interests and ideals - bushy eyebrowed and acquisitive, lover of beautiful women and pleasure, a self-made mogul, his fortune made in property and real estate. His Mercury and Venus in the air sign, Gemini, a ruler of Mercury, gives him the trademark charm, wit and cunning eyes, making him an active, imaginative, showman. His deep, magnetic attraction and seductive power comes from his Scorpio moon, also his regular needs for big business, social status and power dealing.

Jessica Tandy was born with her Sun, Mercury and Venus all in Taurus. This makes her wonderfully gifted as a beautiful actress, with secure knowing of her roles, performances and stage demeanor. Her moon in Capricorn, in supportive trine to her Taurus placements, marks her as one who ages gracefully. As a Capricorn moon is in fall, she can be detached or remote, but is sophisticated, disciplined, devoted.

Will Smith has a Taurus Sun, making him a resourceful individual and provider, pulling himself up on his own bootstraps. His talent for comedy comes froma ruling Mercury in Gemini, particularly quick-witted slap-stick. That he arose as a songsmith is a Taurus note, but his niche as the family-loving, nurturing and supportive, sensitive guy comes from his moon in its rulership of Cancer, water sign: emotional, mothering, quirky Crab.

Tom Jones has that earthy look common to Taurus the Bull, the fixed earth sign, putting his full soul and body into his music. He is a natural entertainer since his Venus, Mars and Mercury all reside in Gemini. Mercury's rulership in Gemini gives his gift of voice and communication, empowered by the Taurus Sun, merging sexual drives, dance steps and flirtation. This much of Gemini ensures a bright, if unstable, persona.

Michael J. Fox has that down-to-earth, common sense know-how, a hallmark of the practical Bull. Venus in Aries gives him his adoration of captainship and top executive status. His headstrong convictions and attitude are the combination of two forces, Taurus the Bull and Aries the Ram. His place in comedy and media entertainment, plus his deft tongue and insight, are owed to his Mercury in its rulership of Gemini.

Figure 11A

| OPPOSITE 30/360 GRID-BASED | REVERSED 30/360 GRID-BASED | OPPOSITE & REVERSED 30/360 GRID-BASED |
|---|---|---|
| Planetary Positions:<br>Sun: in Aries (29°) : 7th House<br>Moon: in Gemini (3°) : 8th House<br>Mercury: in Aries (10°) : 7th House/DSC<br>Venus: in Gemini (7°) : 8th House<br>Mars: in Sagittarius(19°) : 3rd House<br>Jupiter: in Gemini (5°) : 8th House<br>Saturn: in Gemini (15°) : 9th House<br>Uranus: in Capricorn (26°) : 4th House<br>Neptune: in Aries (10°) : 7th House/DSC<br>Pluto: in Aquarius (8°) : 4th House | Planetary Positions:<br>Sun: in Libra (29°) : 12th House<br>Moon: in Sagittarius (3°) : 11th House<br>Mercury: in Libra (10°) : 12th House/ASC<br>Venus: in Sagittarius (7°) : 11th House<br>Mars: in Gemini (19°) : 4th House<br>Jupiter: in Sagittarius (5°) : 11th House<br>Saturn: in Sagittarius (15°) : 10th House<br>Uranus: in Cancer (26°) : 3rd House<br>Neptune: in Libra (10°) : 12th House/ASC<br>Pluto: in Leo (8°) : 3rd House | Planetary Positions:<br>Sun: in Aries (29°) : 6th House<br>Moon: in Gemini (3°) : 5th House<br>Mercury: in Aries (10°) : 6th House/DSC<br>Venus: in Gemini (7°) : 5th House<br>Mars: in Sagittarius(19°) : 10th House<br>Jupiter: in Gemini (5°) : 5th House<br>Saturn: in Gemini (15°) : 4th House<br>Uranus: in Capricorn (26°) : 9th House<br>Neptune: in Aries (10°) : 6th House/DSC<br>Pluto: in Aquarius (8°) : 9th House |
| Angular Regents:<br>Ascendant: ASC of Libra (9°)<br>Midheaven: MC of Cancer (16°)<br>Descendant: DSC of Aries (9°)<br>ImumCoeli: IC of Capricorn (16°)<br>2nd House: Scorpio 8° 11th: Leo 19°<br>3rd House: Sagittarius 11° 12th: Virgo 16° | Angular Regents:<br>Ascendant: ASC of Libra (9°)<br>Midheaven: MC of Capricorn (16°)<br>Descendant: DSC of Aries (9°)<br>ImumCoeli: IC of Cancer (16°)<br>2nd House: Virgo 16° 12th: Scorpio 8°<br>3rd: House: Leo 19 ° 11th: Sagittarius 11° | Angular Regents:<br>Ascendant: ASC of Libra (9°)<br>Midheaven: MC of Capricorn (16°)<br>Descendant: DSC of Aries (9°)<br>ImumCoeli: IC of Cancer (16°)<br>2nd House: Virgo 16° 12th: Scorpio 8°<br>3rd: House: Leo 19 ° 11th: Sagittarius 11° |
| Astrological Disposition:<br>Planets by Element<br>  Fire: 4 Water: 0<br>  Air: 5 Earth: 1<br>Planets by Quality<br>  Cardinal: 4<br>  Fixed: 1<br>  Mutable: 5<br>Planets by Polarity (M/F)<br>  Positive: 9 Negative: 1<br>Planets in Regency N/A<br>Planets in Exaltation<br>  Sun in Aries<br>Planets in Detriment<br>  Jupiter in Gemini<br>Planets in Fall N/A<br>End Depositor Planet N/A<br>Mutual Reception N/A | Astrological Disposition:<br>Planets by Element<br>  Fire: 5 Water: 1<br>  Air: 4 Earth: 0<br>Planets by Quality<br>  Cardinal: 4<br>  Fixed: 1<br>  Mutable: 5<br>Planets by Polarity (M/F)<br>  Positive: 9 Negative: 1<br>Planets in Regency<br>  Jupiter in Sagittarius<br>Planets in Exaltation<br>  Pluto in Leo<br>Planets in Detriment N/A<br>Planets in Fall<br>  Sun in Libra<br>End Depositor Planet<br>  Jupiter in Sagittarius<br>Mutual Reception N/A | Astrological Disposition:<br>Planets by Element<br>  Fire: 4 Water: 0<br>  Air: 5 Earth: 1<br>Planets by Quality<br>  Cardinal: 4<br>  Fixed: 1<br>  Mutable: 5<br>Planets by Polarity (M/F)<br>  Positive: 9 Negative: 1<br>Planets in Regency N/A<br>Planets in Exaltation<br>  Sun in Aries<br>Planets in Detriment<br>  Jupiter in Gemini<br>Planets in Fall N/A<br>End Depositor Planet N/A<br>Mutual Reception N/A |

Figure 12

| Tarot Major Arcanum | Astrology Planets and Signs |
|---|---|
| I | Sun |
| II | Mercury |
| III | Venus |
| IV | Mars |
| V | Jupiter |
| VI | Saturn |
| VII | Uranus |
| VIII | Neptune |
| IX | Pluto |
| X | Moon |
| XI | Aries |
| XII | Taurus |
| XIII | Gemini |
| XIV | Cancer |
| XV | Leo |
| XVI | Virgo |
| XVII | Libra |
| XVIII | Scorpio |
| XIX | Sagittarius |
| XX | Capricorn |
| XXI | Aquarius |
| XXII | Pisces |

| Tarot Court Cards | Astrology Quality |
|---|---|
| Kings | Cardinal |
| Queens | Fixed |
| Knights | Elemental |
| Pages | Mutable |

| Suits | Elements |
|---|---|
| Batons | Fire |
| Cups | Water |
| Swords | Air |
| Coins | Earth |

| Chinese | Western |
|---|---|
| Metal | Akasha |
| Fire | Fire |
| Water | Water |
| Wood | Air |
| Earth | Earth |

Figure 12AI

| Tarot Major Arcanum | Astrology Planets |
|---|---|
| I | Sun |
| II | Mercury |
| III | Venus |
| IV | Mars |
| V | Jupiter |
| VI | Saturn |
| VII | Uranus |
| VIII | Neptune |
| IX | Pluto |
| X | Moon |

| Tarot Major Arcanum | Astrology Signs | | | | |
|---|---|---|---|---|---|
| | *Age of Aries* "traditional" | *Age of Pisces* by stars | *Age of Aquarius* by 30/360 grid | *Age of Virgo* opposite stars | *Age of Leo* opp. 30/360 |
| XI | Aries | Pisces | Aquarius | Virgo | Leo |
| XII | Taurus | Aries | Pisces | Libra | Virgo |
| XIII | Gemini | Taurus | Aries | Scorpio | Libra |
| XIV | Cancer | Gemini | Taurus | Sagittarius | Scorpio |
| XV | Leo | Cancer | Gemini | Capricorn | Sagittarius |
| XVI | Virgo | Leo | Cancer | Aquarius | Capricorn |
| XVII | Libra | Virgo | Leo | Pisces | Aquarius |
| XVIII | Scorpio | Libra | Virgo | Aries | Pisces |
| XIX | Sagittarius | Scorpio | Libra | Taurus | Aries |
| XX | Capricorn | Sagittarius | Scorpio | Gemini | Taurus |
| XXI | Aquarius | Capricorn | Sagittarius | Cancer | Gemini |
| XXII/0 | Pisces | Aquarius | Capricorn | Leo | Cancer |

Figure 12AII

| Mj. Arc. | Planet | Number | Card Name | Mj. Arc. Image | Mj. Arc. Meaning |
|---|---|---|---|---|---|
| I | Sun | 1 | Magician | mage w/element suits | purpose, ability, will |
| II | Mercury | 2 | Priestess | priestess, 2 columns | knowledge, science |
| III | Venus | 3 | Empress | empress in gardens | fertility, art, nature |
| IV | Mars | 4 | Emperor | emperor on throne | production, welfare |
| V | Jupiter | 5 | Pope | pope with pentagram | religion, law, mercy |
| VI | Saturn | 6 | Lovers | man btwn. 2 women | choice, karma, trial |
| VII | Uranus | 7 | Chariot | charioteer, 2 horses | brilliance, conquest |
| VIII | Neptune | 8 | Justice | scales of balance | virtue, justice, honor |
| IX | Pluto | 9 | Hermit | hermit with lantern | spirituality, wisdom |
| X | Moon | 10 | Wheel | wheel of life/fortune | fate, cycle, lunation |
|  |  |  |  |  |  |
| XI |  | 11 | Strength | person mastering lion | courage, initiative |
| XII |  | 12 | Hang Man | hanged man expiating | patience, sacrifice |
| XIII |  | 13 | Death | death the undertaker | change, transform |
| XIV |  | 14 | Temperance | angel mixing liquid | balance, tempering |
| XV |  | 15 | Devil | devil with enslaved | obligation, bondage |
| XVI |  | 16 | Tower | stone tower in storm | test of fundament |
| XVII |  | 17 | Star | woman, water, stars | faith, hope, truth |
| XVIII |  | 18 | Moon | moon, crab, 2 pillars | secrets, regeneration |
| XIX |  | 19 | Sun | sun shine on children | happiness, triumph |
| XX |  | 20 | Judgment | the day of judgment | judgment, resurrect |
| XXI |  | 21 | World | goddess in wreath | success, attainment |
| XXII/0 |  | 22 | Fool | fool at precipice | folly, depart, begin |

Figure 12BI

| Tarot Major Arcanum | Astrology Planets | Subject Data (Western Art) for Example, 11/21/60 5:50AM, Cincinnati, Ohio | |
|---|---|---|---|
| I | Sun | Scorpio 29° | |
| II | Mercury | Scorpio 10° | |
| III | Venus | Capricorn 7° | |
| IV | Mars | Cancer 18° | |
| V | Jupiter | Capricorn 5° | |
| VI | Saturn | Capricorn 15° | |
| VII | Uranus | Leo 25° | |
| VIII | Neptune | Scorpio 10° | |
| IX | Pluto | Virgo 8° | |
| X | Moon | Capricorn 3° | |
| | *"Traditional"* | *for same Example* | *Mj. Arc.* |
| XI | Aries | | |
| XII | Taurus | Descendant | |
| XIII | Gemini | | |
| XIV | Cancer | Mars | IV |
| XV | Leo | Uranus, Midheaven | VII |
| XVI | Virgo | Pluto, North Lunar Node | IX |
| XVII | Libra | | |
| XVIII | Scorpio | Sun, Mercury, Neptune, Ascendant | I, II, VIII |
| XIX | Sagittarius | | |
| XX | Capricorn | Moon, Jupiter, Venus, Saturn | X, V, III, VI |
| XXI | Aquarius | Imum Coeli | |
| XXII/0 | Pisces | | |

Figure 12B

| Tarot Major Arcanum | Astrology Planets and Signs | Subject Data (30/360 grid-based) for Example, 11/21/60 5:50AM, Cincinnati, Ohio | |
|---|---|---|---|
| I | Sun | Libra 29° | |
| II | Mercury | Libra 10° | |
| III | Venus | Sagittarius 7° | |
| IV | Mars | Gemini 18° | |
| V | Jupiter | Sagittarius 5° | |
| VI | Saturn | Sagittarius 15° | |
| VII | Uranus | Cancer 25° | |
| VIII | Neptune | Libra 10° | |
| IX | Pluto | Leo 8° | |
| X | Moon | Sagittarius 3° | |
| | *Age of Aquarius* | *for same Example* | *Mj. Arc.* |
| XI | Aquarius | | |
| XII | Pisces | | |
| XIII | Aries | Descendant | |
| XIV | Taurus | | |
| XV | Gemini | Mars | IV |
| XVI | Cancer | Uranus, Midheaven | VII |
| XVII | Leo | Pluto, North Lunar Node | IX |
| XVIII | Virgo | | |
| XIX | Libra | Sun, Mercury, Neptune, Ascendant | I, II, VIII |
| XX | Scorpio | | |
| XXI | Sagittarius | Moon, Jupiter, Venus, Saturn | X, V, III, VI |
| XXII/0 | Capricorn | Imum Coeli | |

Astrological Tarot Disposition:

Planets by Element/Suit:

Fire/Batons: 5   Water/Cups: 1

Air/Swords: 4   Earth/Coins: 0

Planets by Quality/Court Card:

Cardinal/Kings: 4

Fixed/Queens: 1

Mutable/Pages: 5

Planets by Polarity (M/F)

Positive: 9   Negative: 1

Planets in Regency

Jupiter (V) in Sagittarius (XXI)

Planets in Exaltation

Pluto (IX) in Leo (XVII)

Planets in Detriment  N/A

Planets in Fall

Sun (I) in Libra (XIX)

End Depositor Planet

Jupiter (V) in Sagittarius (XXI)

Mutual Reception  N/A

Figure 12BII

| Tarot Major Arcanum | Astrology Planets | Subject Data (Eastern Art) for Example, 11/21/60 5:50AM, Cincinnati, Ohio | |
|---|---|---|---|
| I | Sun | Scorpio 5° | |
| II | Mercury | Libra 16° | |
| III | Venus | Sagittarius 13° | |
| IV | Mars | Gemini 24° | |
| V | Jupiter | Sagittarius 11° | |
| VI | Saturn | Sagittarius 21° | |
| VII | Uranus | Leo 1° | |
| VIII | Neptune | Libra 16° | |
| IX | Pluto | Leo 14° | |
| X | Moon | Sagittarius 9° | |
| | *Age of Pisces* | *for same Example* | *Mj. Arc.* |
| XI | Pisces | | |
| XII | Aries | | |
| XIII | Taurus | | |
| XIV | Gemini | Mars | IV |
| XV | Cancer | | |
| XVI | Leo | Uranus, Pluto, North Lunar Node | VII, IX |
| XVII | Virgo | | |
| XVIII | Libra | Mercury, Neptune, Ascendant | II, VIII |
| XIX | Scorpio | Sun | I |
| XX | Sagittarius | Moon, Jupiter, Venus, Saturn | X, V, III, VI |
| XXI | Capricorn | | |
| XXII/0 | Aquarius | | |

Figure 12C
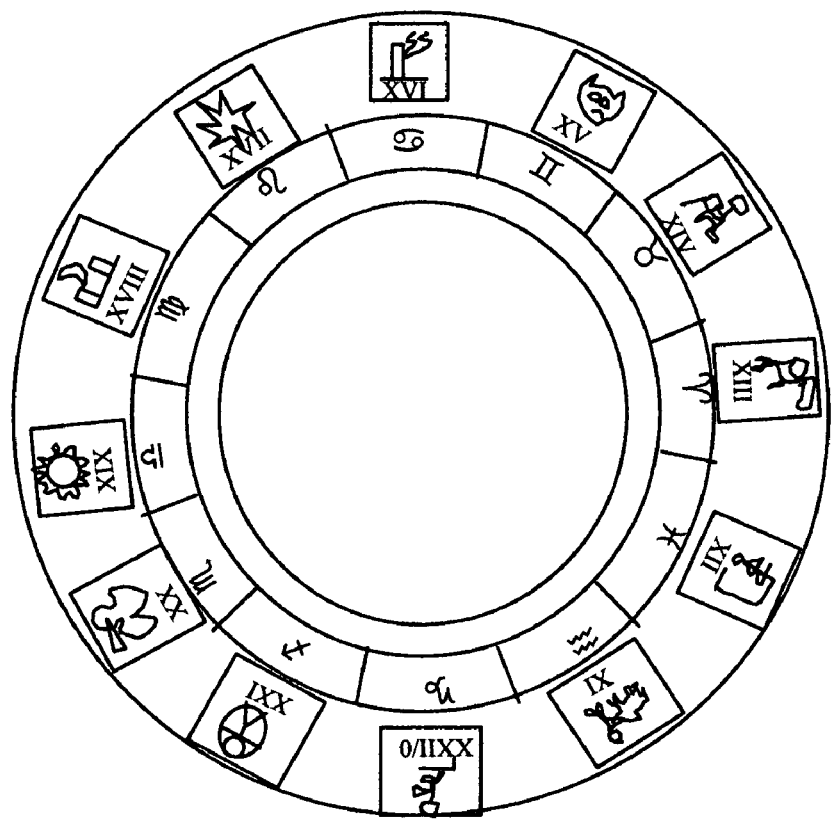
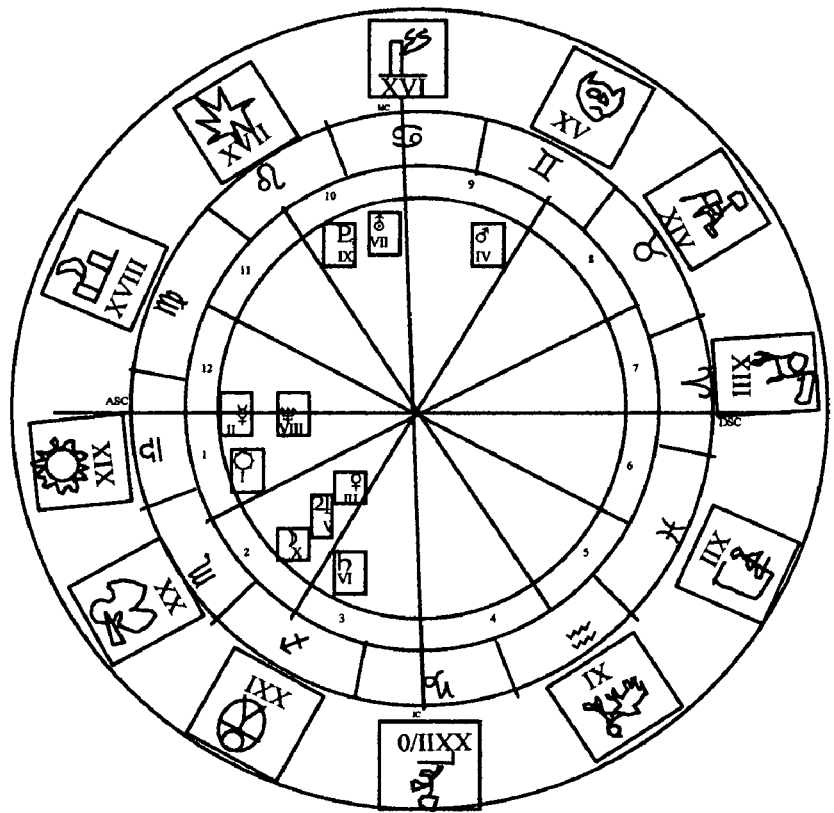

Figure 12EI

| Tarot Court Cards | Astrology Quality |
|---|---|
| Kings | Cardinal |
| Queens | Fixed |
| Knights | Elemental |
| Pages | Mutable |

| Tarot Court Cards | Astrology Quality |
|---|---|
| Kings | Cardinal |
| Queens | Fixed |
| Pages | Mutable |

| Suits | Elements |
|---|---|
| Batons | Fire |
| Cups | Water |
| Swords | Air |
| Coins | Earth |

| Suits | Elements |
|---|---|
| Batons | Fire |
| Cups | Water |
| Swords | Air |
| Coins | Earth |

78-Card Astrological Tarot Deck

Suits:

Batons/Fire

Cups/Water

Swords/Air

Coins/Earth

Suit Cards:

Numbers 1-10 (with planet and I - X)

King, Queen, Knight, Page

Major Arcanum:

I through XXII/0 (image, correspond.)

Total Cards:

78 Cards

74-Card Astrological Tarot Deck

Suits:
Batons/Fire

Cups/Water

Swords/Air

Coins/Earth

Suit Cards:

Numbers 1-10 (with planet and I - X)

King, Queen, Page

Major Arcanum:

I through XXII/0 (image, correspond.)

Total Cards:

74 Cards

Figure 12EII

| 78-Card Astrological Tarot Deck | |
|---|---|
| Suits: | |
| Batons/Fire | |
| Cups/Water | |
| Swords/Air | |
| Coins/Earth | |
| Suit Cards: | |
| Numbers 1-10: | |
| 1: Sun, I | 6: Saturn, VI |
| 2: Mercury, II | 7: Uranus, VII |
| 3: Venus, III | 8: Neptune, VIII |
| 4: Mars, IV | 9: Pluto, IX |
| 5: Jupiter, V | 10: Moon, X |
| Kings: | |
| Batons: Aries | Swords: Libra |
| Cups: Cancer | Earth: Capricorn |
| Queens: | |
| Batons: Leo | Swords: Aquarius |
| Cups: Scorpio | Earth: Taurus |
| Knights: | |
| Batons: Fire | Swords: Air |
| Cups: Water | Coins: Earth |
| Pages: | |
| Batons: Sagittarius | Swords: Gemini |
| Cups: Pisces | Earth: Virgo |
| Major Arcanum: | |
| I through XXII/0: image, correspond. | |
| Total Cards: | |
| 78 Cards | |

| 74-Card Astrological Tarot Deck | |
|---|---|
| Suits: | |
| Batons/Fire | |
| Cups/Water | |
| Swords/Air | |
| Coins/Earth | |
| Suit Cards: | |
| Numbers 1-10: | |
| 1: Sun, I | 6: Saturn, VI |
| 2: Mercury, II | 7: Uranus, VII |
| 3: Venus, III | 8: Neptune, VIII |
| 4: Mars, IV | 9: Pluto, IX |
| 5: Jupiter, V | 10: Moon, X |
| Kings: | |
| Batons: Aries | Swords: Libra |
| Cups: Cancer | Earth: Capricorn |
| Queens: | |
| Batons: Leo | Swords: Aquarius |
| Cups: Scorpio | Earth: Taurus |
| Pages: | |
| Batons: Sagittarius | Swords: Gemini |
| Cups: Pisces | Earth: Virgo |
| Major Arcanum: | |
| I through XXII/0: image, correspond. | |
| Total Cards: | |
| 74 Cards | |

Figure 12EIII

78-Card Astrological Tarot Deck

Suits: per Figure 12, 12EI, and 12EII

Suit Cards:

Numbers 1-10:

| | |
|---|---|
| 1: Sun, I | 6: Saturn, VI |
| 2: Mercury, II | 7: Uranus, VII |
| 3: Venus, III | 8: Neptune, VIII |
| 4: Mars, IV | 9: Pluto, IX |
| 5: Jupiter, V | 10: Moon, X |

Kings:

| | |
|---|---|
| Batons: Aries | Swords: Libra |
| Cups: Cancer | Earth: Capricorn |

Queens:

| | |
|---|---|
| Batons: Leo | Swords: Aquarius |
| Cups: Scorpio | Earth: Taurus |

Knights:

| | |
|---|---|
| Batons: Fire | Swords: Air |
| Cups: Water | Coins: Earth |

Pages:

| | |
|---|---|
| Batons: Sagittarius | Swords: Gemini |
| Cups: Pisces | Earth: Virgo |

Major Arcanum:

| | |
|---|---|
| I: Sun | XI: Aquarius |
| II: Mercury | XII: Pisces |
| III: Venus | XIII: Aries |
| IV: Mars | XIV: Taurus |
| V: Jupiter | XV: Gemini |
| VI: Saturn | XVI: Cancer |
| VII: Uranus | XVII: Leo |
| VIII: Neptune | XVIII: Virgo |
| IX: Pluto | XIX: Libra |
| X: Moon | XX: Scorpio |
| | XXI: Sagittarius |
| | XXII/0: Capricorn |

74-Card Astrological Tarot Deck

Suits:

Batons/Fire
Cups/Water
Swords/Air
Coins/Earth

Suit Cards:

Numbers 1-10:

| | |
|---|---|
| 1: Sun, I | 6: Saturn, VI |
| 2: Mercury, II | 7: Uranus, VII |
| 3: Venus, III | 8: Neptune, VIII |
| 4: Mars, IV | 9: Pluto, IX |
| 5: Jupiter, V | 10: Moon, X |

Kings:

| | |
|---|---|
| Batons: Aries | Swords: Libra |
| Cups: Cancer | Earth: Capricorn |

Queens:

| | |
|---|---|
| Batons: Leo | Swords: Aquarius |
| Cups: Scorpio | Earth: Taurus |

Pages:

| | |
|---|---|
| Batons: Sagittarius | Swords: Gemini |
| Cups: Pisces | Earth: Virgo |

Major Arcanum:

| | |
|---|---|
| I: Sun | XI: Virgo |
| II: Mercury | XII: Libra |
| III: Venus | XIII: Scorpio |
| IV: Mars | XIV: Sagittarius |
| V: Jupiter | XV: Capricorn |
| VI: Saturn | XVI: Aquarius |
| VII: Uranus | XVII: Pisces |
| VIII: Neptune | XVIII: Aries |
| IX: Pluto | XIX: Taurus |
| X: Moon | XX: Gemini |
| | XXI: Cancer |
| | XXII/0: Leo |

Figure 12EIV

| 78-Card Astrological Tarot Deck | |
|---|---|
| Suits: per Figures 12, 12EI and 12EII | |
| Suit Cards: | |
| Numbers 1-10: | |
| 1: Sun, I | |
| Batons: regency, exaltation | Swords: detriment, fall |
| Cups: neutral | Coins: neutral |
| 2: Mercury, II | |
| Batons: detriment | Swords: regency |
| Cups: fall | Coins: regency, exalt. |
| 3: Venus, III | |
| Batons: detriment | Swords: regency |
| Cups: exaltation | Coins: regency, fall |
| 4: Mars, IV | |
| Batons: regency | Swords: detriment |
| Cups: regency, fall | Coins: exaltation |
| 5: Jupiter, V | |
| Batons: regency | Swords: detriment |
| Cups: exaltation | Coins: fall |
| 6: Saturn, VI | |
| Batons: fall | Swords: exalt., regency |
| Cups: detriment | Coins: regency |
| 7: Uranus, VII | |
| Batons: detriment | Swords: regency |
| Cups: exaltation | Coins: fall |
| 8: Neptune, VIII | |
| Batons: exaltation | Swords: fall |
| Cups: regency | Earth: detriment |
| 9: Pluto, IX | |
| Batons: neutral | Swords: neutral |
| Cups: regency | Earth: detriment |
| 10: Moon, X | |
| Batons: neutral | Swords: neutral |
| Cups: regency, fall | Earth: exalt., detriment |
| Kings, Queens, Knights,Pages: Fig.12EIII, 78-Cd. Deck | |
| Major Arcanum: correspondence per any of Fig. 12AI | |

| 74-Card Astrological Tarot Deck | |
|---|---|
| Suits: per Figures 12, 12EI and 12EII | |
| Suit Cards: | |
| Numbers 1-10: | |
| 1: Sun, I | |
| Batons: regency, exaltation | Swords: detriment, fall |
| Cups: neutral | Coins: neutral |
| 2: Mercury, II | |
| Batons: detriment | Swords: regency |
| Cups: fall | Coins: regency, exalt. |
| 3: Venus, III | |
| Batons: detriment | Swords: regency |
| Cups: exaltation | Coins: regency, fall |
| 4: Mars, IV | |
| Batons: regency | Swords: detriment |
| Cups: regency, fall | Coins: exaltation |
| 5: Jupiter, V | |
| Batons: regency | Swords: detriment |
| Cups: exaltation | Coins: fall |
| 6: Saturn, VI | |
| Batons: fall | Swords: exalt., regency |
| Cups: detriment | Coins: regency |
| 7: Uranus, VII | |
| Batons: detriment | Swords: regency |
| Cups: exaltation | Coins: fall |
| 8: Neptune, VIII | |
| Batons: exaltation | Swords: fall |
| Cups: regency | Earth: detriment |
| 9: Pluto, IX | |
| Batons: neutral | Swords: neutral |
| Cups: regency | Earth: detriment |
| 10: Moon, X | |
| Batons: neutral | Swords: neutral |
| Cups: regency, fall | Earth: exalt., detriment |
| Kings, Queens, Pages: per Fig. 12EIII, 74-Card Deck | |
| Major Arcanum: correspondence per any of Fig.12AI | |

Figure 12F

| Tarot Court Cards | Astrology Quality |
|---|---|
| Kings | Cardinal |
| Queens | Fixed |
| Pages | Mutable |

| Suits | Elements |
|---|---|
| Batons | Fire |
| Cups | Water |
| Swords | Air |
| Coins | Earth |

| Playing Cards Standard Court | Astrology Quality |
|---|---|
| Kings | Cardinal |
| Queens | Fixed |
| Jacks | Mutable |

| Pl.Card Suits | Tarot Suits | Elements |
|---|---|---|
| Spades | Batons | Fire |
| Hearts | Cups | Water |
| Diamonds | Swords | Air |
| Clubs | Coins | Earth |

| Playing Card Deck | Tarot Card Deck | Multi-Purpose Deck |
|---|---|---|
| Suits: | Suits: | Suits: |
| Spades | Batons | Batons/Spades/Fire |
| Hearts | Cups | Cups/Hearts/Water |
| Diamonds | Swords | Swords/Diamonds/Air |
| Clubs | Coins | Coins/Clubs/Earth |
| Suit Cards: | Suit Cards: | Suit Cards: |
| Numbers 1-10 | Numbers 1-10 | Numbers 1-10 |
| King, Queen, Jack | King, Queen, Page | King, Queen, Page/Jack |
| Major Arcanum: | Major Arcanum: | Major Arcanum: |
| I through XXII/0 | I through XXII/0 | I through XXII/0 |
| Total Cards: | Total Cards: | Total Cards: |
| 74 Cards | 74 Cards | 74 Cards |

Figure 12G

| 30/360 Age of Aquarius Planetary Positions: |
| --- |
| I: Sun: in Libra (29°) : XIX : 1st House |
| II: Mercury: in Libra (10°) : XIX: 1st House/ASC |
| III: Venus: in Sagittarius (7°) : XXI : 2nd House |
| IV: Mars: in Gemini (19°) : XV : 9th House |
| V: Jupiter: in Sagittarius (5°) : XXI : 2nd House |
| VI: Saturn: in Sagittarius (15°) : XXI: 3rd House |
| VII: Uranus: in Cancer (26°) : XVI : 10th House |
| VIII: Neptune: in Libra (10°) :XIX: 1st House/ASC |
| IX: Pluto: in Leo (8°) : XVII : 10th House |
| X: Moon: in Sagittarius (3°) : XXI : 2nd House |

| 30/360 Age of Aquarius Planetary Positions: |
| --- |
| I: Sun: in Libra (29°) : XIX : Cardinal Air |
| II: Mercury: in Libra (10°) : XIX : Cardinal Air |
| III: Venus: in Sagittarius (7°) : XXI : Mutable Fire |
| IV: Mars: in Gemini (19°) : XV : Mutable Air |
| V: Jupiter: in Sagittarius (5°) : XXI : Mutable Fire |
| VI: Saturn: in Sagittarius (15°) : XXI : Mutable Fire |
| VII: Uranus: in Cancer (26°) : XVI : Cardinal Water |
| VIII: Neptune: in Libra (10°) : XIX : Cardinal Air |
| IX: Pluto: in Leo (8°) : XVII : Fixed Fire |
| X: Moon: in Sagittarius (3°) : XXI : Mutable Fire |

| Angular Regents: |
| --- |
| Ascendant: ASC of Libra (9°) : XIX |
| Midheaven: MC of Cancer (16°) : XVI |
| Descendant: DSC of Aries (9°) : XIII |
| ImumCoeli: IC of Capricorn (16°): XXII |
| Houses w/Zodiacal Regents |

| Composition of the Subject's Court: |
| --- |
| I: Sun: in Libra (29°) : King of Swords : fall |
| II: Mercury: in Libra (10°) : King of Swords : neutral |
| III: Venus: in Sagittarius (7°) : Page of Batons : neutral |
| IV: Mars: in Gemini (19°) : Page of Swords : neutral |
| V: Jupiter: in Sagittarius (5°) : Page of Batons : regency |
| VI: Saturn: in Sagittarius (15°) : Page of Batons : neutral |
| VII: Uranus: in Cancer (26°) : King of Cups : neutral |
| VIII: Neptune: in Libra (10°) : King of Swords : neutral |
| IX: Pluto: in Leo (8°) : Queen of Batons : exaltation |
| X: Moon: in Sagittarius (3°) : Page of Batons : neutral |

| Astrological/Tarot Disposition: |
| --- |
| Planets by Element/Suit |
|   Fire/Batons: 5 Water/Cups: 1 |
|   Air/Swords: 4 Earth/Coins: 0 |
| Planets by Quality/Court Card |
|   Cardinal/Kings: 4 |
|   Fixed/Queens: 1 |
|   Mutable/Pages: 5 |
| Planets by Polarity (M/F) |
|   Positive: 9 Negative: 1 |
| Planets in Regency |
|   Jupiter (V) in Sagittarius (XXI) |
| Planets in Exaltation |
|   Pluto (IX) in Leo (XVII) |
| Planets in Detriment N/A |
| Planets in Fall |
|   Sun (I) in Libra (XIX) |
| End Depositor Planet |
|   Jupiter (V) in Sagittarius (XXI) |
| Mutual Reception N/A |

| Composition of the Subject's Hand: |
| --- |
| 1: I: Sun: in Libra (29°) : Ace of Diamonds/Swords/Air |
| 2: II: Mercury: in Libra (10°) : Two of Diamonds/Swords/Air |
| 3: III: Venus: in Sagittarius (7°) : Three of Spades/Batons/Fire |
| 4: IV: Mars: in Gemini (19°) : Four of Diamonds/Swords/Air |
| 5: V: Jupiter: in Sagittarius (5°) : Five of Spades/Batons/Fire |
| 6: VI: Saturn: in Sagittarius (15°) : Six of Spades/Batons/Fire |
| 7: VII: Uranus: in Cancer (26°) : Seven of Hearts/Cups/Water |
| 8: VIII: Neptune: in Libra (10°) : Eight of Diamonds/Swords/Air |
| 9: IX: Pluto: in Leo (8°) : Nine of Spades/Batons/Fire |
| 10: X: Moon: in Sagittarius (3°) : Ten of Spades/Batons/Fire |
| Totals: |
| Spades/Batons/Fire: 5 (3, 5, 6, 9, 10) Diamonds/Swords/Air: 4 (Ace, 2, 4, 8) |
| Hearts/Cups/Water : 1 (the 7) Clubs/Coins/Earth: 0 (void) |

Figure 12H

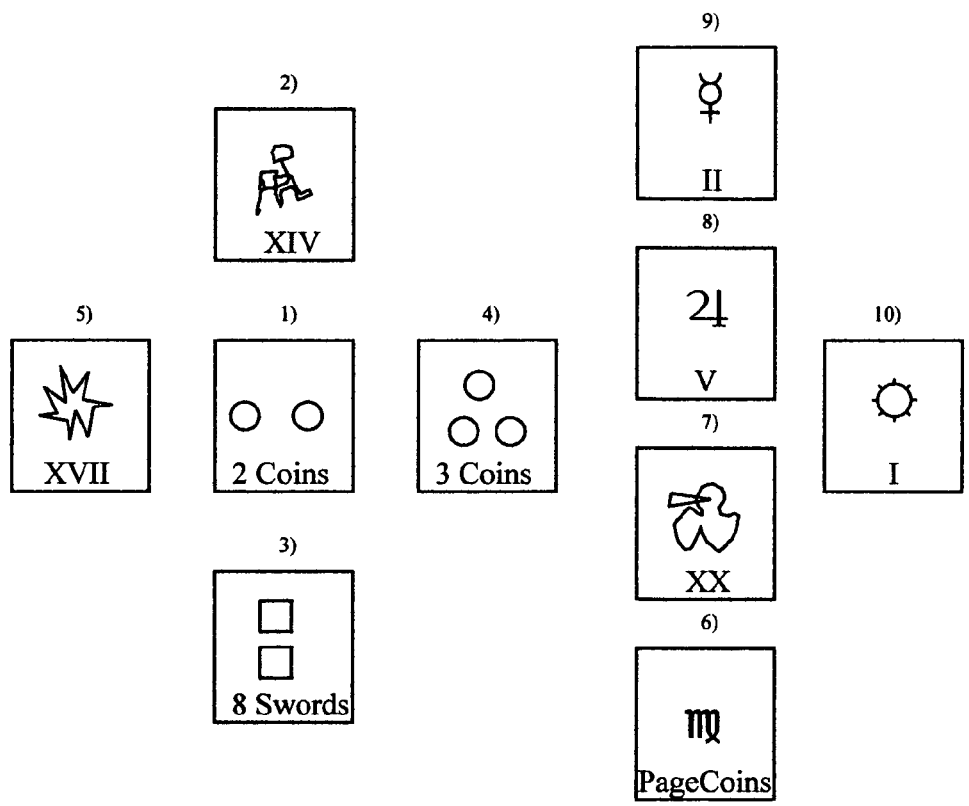

| Composition of the Subject's Spread: (modified 30/360 grid-based; Age of Aries signs for XI-XXII/0) | | | | |
|---|---|---|---|---|
| Card Position: | Card | Suit, Sign or Planet | Ruling Planet, Ruling Sign or Planets in Sign | Disposition |
| 1) | Two of Coins | Earth/Clubs | Mercury | regency |
| 2) | XIV | Cancer | Uranus, MC | neutral, detriment |
| 3) | Eight of Swords | Air/Diamonds | Neptune | neutral |
| 4) | Three of Coins | Earth/Clubs | Venus | object of art |
| 5) | XVII | Libra | Sun, Neptune, ASC | fall, neutral, detri. |
| 6) | Page of Coins | Earth/Clubs | Virgo | mutable earth |
| 7) | XX | Capricorn | no planets, IC | external, detriment |
| 8) | V | Jupiter | Sagittarius | regency |
| 9) | II | Mercury | Virgo | regency |
| 10) | I | Sun | Libra | fall |

Figure 15
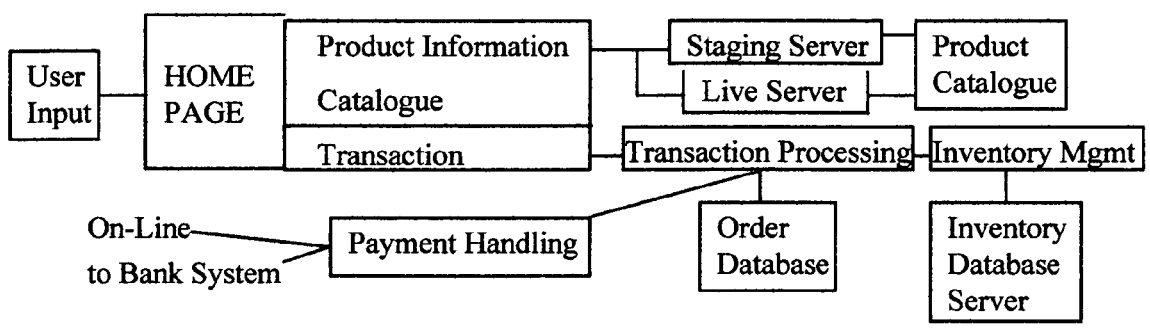
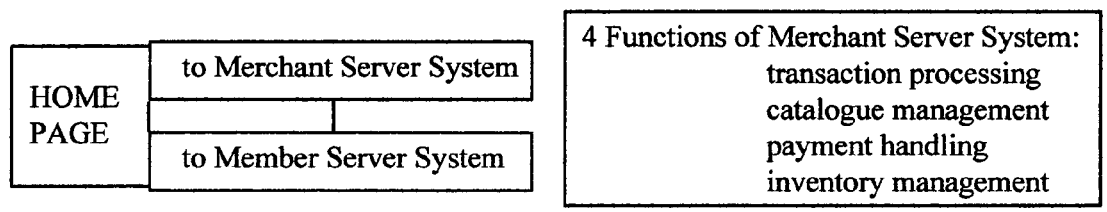
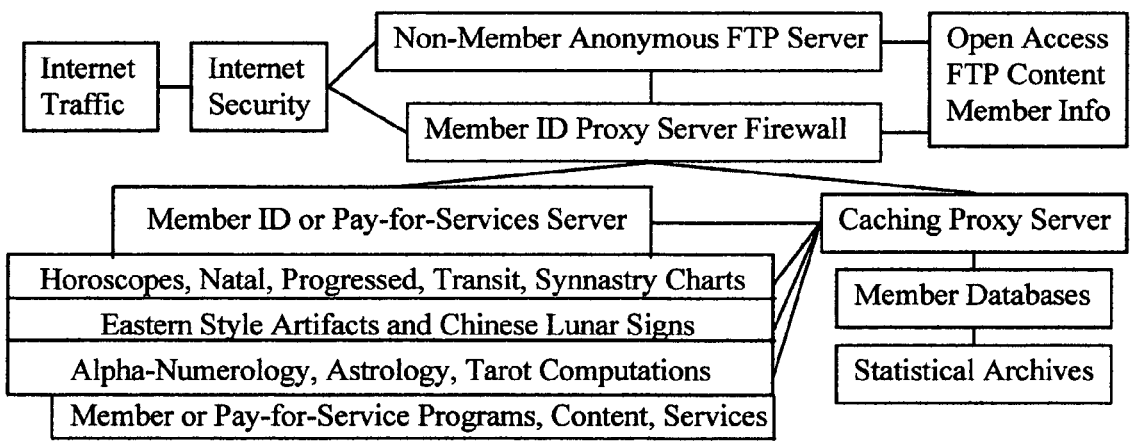

Figure 15A

Profile, Interpretation and Prediction for Subject

Example Subject:
David Andrew D'Zmura
November 21, 1960
5:50AM
Cincinnati, Ohio USA Mr. D'Zmura:

You are born with an immediate and intense selfhood, expounding by communication, and articulate in thought and expression, because your Mercury is conjunct to your ascendant. Mercury at your birth is in the zodiac symbol of the Virgin, Virgo, in the palm leaf she holds, this being her written tablet. Virgo rules Mercury, expressing feminine qualities, of research, finding and proving the word, scientific and technical knowledge, and intellectual work. Mercury conjunct ascendant further indicates an extraordinary intelligence, with tremendous capacity to penetrate topics. Given Saturn in Sagittarius, in the third house, the ruling house of Mercury's other ruling sign, Gemini, the masculine aspect of Mercury, in loose sextile to Mercury on the ascendant, this reveals you as having profound depth of thoughts, and endurance to develop and create extensive and complex intellectual and mathematical works.

In conjunction to both Mercury and your ascendant lies a distant planet, Neptune, which countenances your being, the essential ascendant self, as of a subtle, diffuse and enlightened character, likely mystical, imbuing likely talents in music, dance, photography. Saturn here augments your artistic ability, indicating, your development of a body of work. You will create, document and produce, even withstanding Saturn's limiting circumstances, affecting material conditions, you can create substantial things from very little. The positions of Mercury and Neptune on your ascendant make you sensitive and naive. However, an opposition brings great endurance and determination to your creative endeavors, and favors them, as Mars is in Gemini. Because Mars trines your Mercury and your Sun, at the cusp of Libra and Scorpio, exalted in your first house, your birthday marking the origin of Chinese lunar signs at Rat, born in the year of the Metal Rat, you are an original and indomitable force.

These are preludes to your culminating self, this being your stellium in Sagittarius: of the Moon (3°), Jupiter (5°), Venus (7°), and Saturn (15°). Your Moon is exalted, found in the second house, and your Venus is at home, in its ruling house, the second. These indicate you will have substantial property, and physical benefits of Sagittarian nature, Sagittarius ruling higher thought, hence, you will create and own intellectual and copyright property. Sagittarius rules Jupiter, hence, your Jupiter is in regency, as is your Mercury, predicting a philosophical, religiously inclined, spirit, and in sextile to Mercury and Neptune, works of the truly inspired. These four planets make beneficial trine aspects to your Pluto and Uranus, these in the tenth house of career. Your career concerns the revolution of flawed establishments and practices; you will improve and reengineer using far-sighted, almost occult, innovations of your genius. As your Pluto is exalted in Leo, further, in sextile to Mercury and Neptune, trine to Jupiter, you will be the founder of a religion, school, institution or movement, to elevating humanity.

Figure 15B

Profile, Interpretation and Prediction for Subject

Example Subject:
David Andrew D'Zmura
November 21, 1960
5:50AM
Cincinnati, Ohio USA Mr. D'Zmura:

For March 31, 2001: you are forty years old, witness to progressions in your lifetime. Of especial importance, your progressed Sun is in Sagittarius, as is progressed Mercury, in conjunction in sign to your progressed Jupiter and Saturn, thus continuing your path of a stellium in Sagittarius, in both your nativity (of Moon, Jupiter, Venus and Saturn) and your present progression (of Mercury, Sun, Jupiter and Saturn). This latter stellium is animated and energetic, whereas your natal stellium has the receptive components of the Moon and Venus. The arrival of your progressed Mercury and Sun in Sagittarius a few years ago launched a favorable empowerment and focus of your thoughts and efforts on your intellectual property. It also indicates, with Sun and Mercury progressing to natal Moon, Venus and Jupiter, a lot of progress and development in the materialization of things related to your intellectual property.

Today's date, the Sun and Venus are transiting Pisces, and this brings momentum and satisfactions through, in your case, your sixth house of work and health. Be careful not to overdo it! It can be a fine time to quit any bad habits in conflict with your general well-being. Because Pisces begins in the later part of your fifth house of creativity and romance, you can be sure to experience the Piscean nature of universality or unconsciousness as a spiritual self.

Taurus is highly accented, Saturn at the left eye of the Bull and Jupiter at the left horn. Neither of these planets is dignified in Taurus, but in your chart, Taurus marks the eighth house, the house opposite its ruling home of the second. These mean matters of resolution and expansion will be active in comprising your legacy, and your contribution in that to come. Like your Sun in Libra, Libra a ruler of Venus in her social and interpersonal characteristics, these planets in Taurus, the other ruler of Venus, convey her base and material characteristics.

In Scorpio, the zodiac sign opposite Taurus, are Mars and Pluto, both ruled by the Scorpion. These confer tremendous enterprise, transformation, and passion to the times, and for you, these concern your second house, the house of your personal property and materials, but also the house of physical and bodily needs and pleasures. The Mars and Pluto opposition to Saturn and Jupiter, means there is high tension and troubles to these times and everywhere people feel it. Since you have a natal opposition between Mars and Saturn, you can handle it.

Neptune and Uranus lie in Capricorn, the Sea Goat, these in favorable sextile to Mars and Pluto, and beneficial trine Saturn and Jupiter, helping to alleviate transit opposition, and to empower it, in your case, in the third and fourth houses, of communications and the home. The Moon is presently in Gemini, transiting your natal Mars in the Twins, meaning your efforts in rendering your written works are coming to fruition and will emerge in the public. Certainly, in your ninth house, it means you are presenting your works of higher knowledge.

As Mercury leaves Aquarius, Mercury is transiting your sixth house, its home house!

Figure 15C

> Profile, Interpretation and Prediction for Subject
>
> Example Subject:
> David Andrew D'Zmura
> November 21, 1960
> 5:50AM
> Cincinnati, Ohio USA
>
> Mr. D'Zmura:
> David Andrew D'Zmura, you have an unusual birth date, in so far as its numerology returns the same unique number, 21, for each of the three means for alpha-numerological identification, of day, digit and decade. Because 21 corresponds to roman numeral XXI, one of the major arcanum cards, it is not reduced. Meeting those two sets of conditions makes your date a triple 21, but moreover, indicates a pure, clean, consistent and unanimous being relating to 21, XXI, "the world" of the major arcanum. Three and seven comprise non-identity divisors of 21, three sevens indicating the perfection on physical, astral and spiritual planes, and thus "the world" is symbolized as the human adept encircled in a wreath, with the four elements of fire, water, air and earth symbolized by the fixed element signs of the lion, the eagle, the waterman and the bull, placed in the four corners outside the wreath, the world. This predicts your being and purpose on earth as an adept, in a complete and tri-fold representation.
>
> Your astrological tarot substantiates the identifications of your birth date. Under the Age of Aquarius correspondences, your natal and progressed stelliums in Sagittarius, have identification to major arcanum XXI, "the world", being the card ruled by Sagittarius. You will find peace through religion and higher thought, and are akin to those of such incline. Your Sun in peaceable Libra is domiciled in major arcanum XIX, "the Sun"- pursue success. Don't shy away, despite your polite and retiring ways of your Chinese ascendant, the Rabbit.
>
> Your name compliments and supports the alpha-numerology of your birth, indicating your name as uniquely suited to you. Your full name corresponds to 63, wherein 63 is three times 21, a triple 21. Hence, your name replicates exactly the alpha-numerology of your birth. You are recommended to use your full name for purposes relating to your activity as an adept, as well as for formal announcements of yourself. On a "first name" basis, your name of Andrew is well suited to you, as it identifies as 23, reducing to five, the number activating your Jupiter, in regency in your natal and progressed astrology in the sign of Sagittarius. Because your progressed Sun and Mercury have moved into Sagittarius, and your natal Moon and Venus are in conjunction to natal Jupiter in Sagittarius, these planets are associated by stellium to Jupiter, and thus are positively actuated through your use of your name, Andrew. In contrast, the name David, a great name of biblical proportions, is less suitable, on its own. This is because David identifies as 16, XVI, "the tower", which is critical test of firmament. Given that your natal astrology features only one planet in the quality of the fixed signs, the nine other planets divided between the remaining qualities of the cardinal and mutable signs, you are more of a vanguard, and a changeable one at that. Just as in the life of David, king of Israel, the use of that name brings unrelenting challenges, genuine hardships, and hard won accomplishments. In combination within your full name, it supplies you with a fixed quality.

Determine Positions of Requisite Zodiac Components as Data:

Taking Values for Input Parameters: date, plus time and geographic position on earth Calculating Intermediate Data for Zodiacal Discovery: local sidereal time adjustments Referencing Invention's Resources, Ephemerides, Look-up Tables, Algorithms: innovation or Adjusting Prior Art Resources, Ephemerides, Look-up Tables, Algorithms: innovation Returning Invention's Zodiacal Positions of Astrological Component Data: innovation

---

Requisite Zodiac Component Data for Astrological Discovery per Inquiry any or all, as sought by querist, for astrological purposes

| Planetary Components: | Axial Components: |
|---|---|
| Sun, Moon, Mercury, Venus, Mars, Jupiter, Saturn, Uranus, Neptune, Pluto, Lunar Nodes | Ascendant, Descendant, Mid-Heaven, Imum Coeli, Twelve Houses |
| Reference Resource Components: | Advanced Components: |
| Source Component Data for Ephemeris or Calendar Astrologers' and Astronomers' Tables or Algorithms | Progressed, Transit, Synnestry, Composite Data, Eastern- and Chinese-Style Data, Artifacts |

---

Component Data Processing into Analytic Tools and Artifacts

Processing of Component Data for Astrological Charts, Tables and Aspect Grids

Formatting, Rendering, Imaging and Manufacturing Astrological Artifacts

Publishing, Releasing, Distributing or Providing Processed Astrological Artifacts

---

Manufacture of Astrological Artifacts

Astrological Information and Component Data

| Reference Resources: | Astrological Charts: |
|---|---|
| Ephemeris, Books of Houses, Lunar Tables, Calendars, Aspectarians, Dates of Sun and Lunar Signs | Natal, Progressed, Transit, Mundane, Synastry, Composite, Conception, Horary |
| Grids of Aspects between Components: | Tables of Disposition: |
| Conjunction, Opposition, Trine, Square | Components by Sign, Elements, Polarity, Houses |
| Sesquiquadrate, Sextile, Quincunx | Components in Rulership, Exaltation, Detriment, Fall |
| Semi-Square, Semi-Sextile | Mutual Reception, End-Depositing, Archetype Charts |

Horoscopes:

based on Astrological Information and Component Data

---

Astrological Apparatuses, Systems, Reference Resources and Commerce

Devices Housing, Storing, Processing, Manufacturing or Communicating per the Invention's Innovations

Figure 19

> Inputs of: Date, Time, Geographical Location; mimimum, date;
> Selectable Value for Precisely Marking Origin (Figure 21);
> Selectable Astrological System Perspectives (Figure 20)
>
> Processes of: Sidereal Time Computation, Ephemeris Look-up,
> Call-Back Data to User Input, Assemble Artifacts
>
> Outputs of: Astrology Data, Charts, Tables, Grids, Resources, Information
> Aritifacts to be Produced as Required by User Inputs;
>
> Side-by-Side Comparisons with Prior Art Outputs > Step 1: Discover Local Sidereal Time from Input Parameters
>
>     i.e. GMT: Conventional Conversion to Local Sidereal Time:
>
>     Local input time converted to GMT, time zone adjustment;
>
>     next, Adjustment for sidereal movement by combination-
>
>         Look-up sidereal at Greenwich,
>
>         Find interval btwn GMT noon,
>
>         Add/Subtract interval
>
>         Compute, Add/Sub acceration interval;
>
>     then, Adjust for longitudinal equivalent, Add/Subtract:
>
>     Rendering Local Sidereal Time for Input Parameters
>
> Step 2: Extract Positions of Zodiac Planetary and Axial Components,
> per Rendered LST, Linked with Input's Geo-Location;
> using Invention's Ephemeris, Tables, Book of Houses.
>
> Step 3: Assemble Astrological Artifacts per Invention from Processing,
> Sorting, Filtering , Rendering Component Data Output:
> Information, Charts, Tables, Aspect Grids, Horoscopes.

Figure 20

| | |
|---|---|
| a) | Standard Natal Astrology (see Figures 1, 2, 3, 4, 5, 6, 7, 8, 9, 10) |
| | astrologer's positions of houses, planets, solar system, earth-cenetered |
| b) | Standard Progressed Astrology (see Figure 6C) |
| | natal positions of a) progressed by astrologer's algorithm, I.e. one day/year |
| c) | Solar-Centered Standard Astrology |
| | positions of planets, incl. earth locations, from solar-centered core |
| d) | Solar-Centered Progressed Astrology |
| | temporal state of c) progressed by astrologer's algorithm, I.e. one year/day |
| e) | Luminary-Centered Astrology (see Figures 11, 11A, 11B , as from all) |
| | from any luminary in solar system, or as from all towards earth locations |
| f) | Luminary-Centered Progressed Astrology |
| | temporal state of e) progressed by astrologer's algorithm, I.e. orbit/earth year |
| g) | Standard, Solar, and Luminary Transit Astrology (see Figure 6D) |
| | imposing any a) through g) upon other a) thorugh g), or set to present date |
| h) | Extra-Solar System, Standard Natal Astrology (see Figures 8, 9, 9A-9D) |
| | per a), but including the locations of luminaries outside solar system |
| i) | Extra-System, Luminary-Centered Astrology (see Figure 7) |
| | per e), but allowing vantages to include a luminary outside the solar system |
| j) | Extra-System, Multi-Valence, Selectable Multi-Perspective |
| | per i), but as integrating multiple vantages and concurrent viewpoints |
| k) | Progressed and Transited Astrology of h) through j) |
| | progression: distance, onelight.yr/earth yr; extra-solar, galaxy etc. transits |
| l) | Synnestry and Composites, any of a)-k) with other a)-l) (see Figure 6E) |
| | by combining one rendering with another, astrologers examine relations |

Figure 21

| | |
|---|---|
| 1) | Stated and Implemented, Origin has precessed 30° west from Aries 0° to Pisces 0° (♓0°)<br>Point Pisces 0° is equivalent to Aquarius 30°, in Aquarius in the New Millennium |
| A) | *Determinations of Precession based on using the period, 129 BC, to the year, 1997 AD:* |
| 2) | Using Newcomb's precession in longitude, for129 BC-1997 AD: 29.7°, Pisces 0.3° (♓0°)<br>Using date of Ptolemy 150 AD, precession in longitude: 26°, Pisces 4°(♓4°) |
| 3) | Calculating elapsed general precession, over 129BC-1997 AD: 29.71°, Pisces 0.29° (♓0°) |
| 4) | Adding precession in right ascension and declination same period:29.6°, Pisces 0.4°(♓0°) |
| 5) | Estimating precession in longitude by star, coordinate conversion:29.2°, Pisces 0.8°(♓0°) |
| B) | *Determinations based on "catalogue" argument for 146 BC, as of the New Millennium:* |
| 6) | Using 146 BC to New Millennium, rate of general precession: 30°, Aquarius 30° (♒30°)<br>Using Newcomb's precession in longitude, same period: 29.97°, Pisces 0.0° (♓0°) |
| 7) | Using ancient positions and precession in α, 146 BC to N.M.: 30°, Aquarius 30° (♒30°) |
| C) | *Determinations using precise current positions of "first point" stars and constellations:* |
| 8) | Using "first point of Aries" stars, based on ancient measurement: 29.7°, Pisces 0.3° (♓0°) |
| 9) | Using precise current position of "first point" stars, 30.9° elapsed since it marked V.E. |
| 10) | Using a constellation basis, it is apparent that sign of Pisces still marks Vernal Equinox |
| D) | *Determinations based on date of change from the Age of Pisces to the Age of Aquarius:* |
| 11) | Using average Newcombe's precession in longitude from 149BC: Aquarius 30° 2012 AD |
| 12) | Using constellation basis, St. Germain prophecy End of Ages, Leg of Man, in 1000 years<br>Using constellation Aquarius, begins 2897 AD; IAU map, Aquarius in 2117 AD |

| | |
|---|---|
| I) | Using rate of general precession: +0.0139696 per year after N.M.; -0.0139696 p.y. before |
| II) | Using precession in longitude: 50".2784 per year (+0.022C) epoch 2000, Century = 100y. |

Figure 22

| | |
|---|---|
| Goal: | Invention's component data and artifacts in 30°/360° coordinate systems of astrological conventions: vernal equinox marks, initiates annual solar cycle, set this also reflecting general precession convention: positions in celestial longitude ecliptic coordinate, positions by sign to degree convention mandates twelve zodiac signs on ecliptic belt, each uniform 30 degrees of 360: prior art convention from Hipparchus, ~146 BC, vernal equinox is first point, was Aries 0° astrological data, resources, apparatuses, systems use Greenwich Mean Sidereal Time, UT. |
| 1) | <u>Adjust Astronomers' Data in Ephemerides, Charts of Positions, Calendars, Catalogues, Almanacs</u> |
| 1a) | <u>Adjust prior art astronomy data already stated as celestial longitude, per conventions of astrology</u>: celestial longitude data is adjusted for general precession of west one zodiac sign, i.e. 30° of 360°, or use westward adjustment of 29.7° for 1998; precession for other years add ≅0.014°×(year-1998), or any reasonable adjustment, eg. star-basis or ≠ 129BC, or general precession measured to time(T); or adjust prior art data via Newcomb's precessional constant (P) or general precession in longitude (p). |

Coordinate System        Remarks and Relations
        Ecliptic:        used by many astrologers and planetary astronomers reference planes and directions: ecliptic and equinox position expressed in celestial longitude $\lambda$, latitude $\beta$.
        Origin:        origin of coordinates is observer location on Earth.

| | |
|---|---|
| 1b) | <u>Adjust prior art astronomy data stated in coordinate systems other than ecliptic coordinate system</u>: convert, adjust prior art component position data to ecliptic coordinates, or adjust in original system adjust prior art astronomy data if converted as celestial longitude, per convention of astrology, 1a). |

Coordinate Systems        Remarks and Relations
        Equatorial :        widely used in present day as astronomers' coordinate system reference planes and directions: equator and equinox: ($\alpha$ and $\delta$) general precession≅0.01397° per year ≅29.7° west since 129BC precession in $\alpha$ and in $\delta$ compose ≅ 99.7% of general precession mean rate of precession per year: in $\alpha$ ≅0.01281°; in $\delta$ ≅0.0056° 1998 general precess ≅29.7°; precess $\alpha$≅27.5°; precess $\delta$≅11.8°.
        Conversion to Ecliptic:        a) $\beta$= arcsin (-cos$\delta$sin$\alpha$sin$\epsilon$ + sin$\delta$cos$\epsilon$), $\epsilon$=obliquity of ecliptic (23.44°)
                b) $\lambda$= arccos ((cos$\delta$ cos$\alpha$)/cos$\beta$), where b) is calculated for values in a)
        Rectangular:        three-dimensional coordinates: X, Y, Z and R; or $\xi$, $\eta$, $\zeta$ and $\Delta$:
        Equatorial Rectangular:        $\xi/\Delta$ or X/R =cos$\alpha$cos$\delta$; $\eta/\Delta$ or Y/R=sin$\alpha$cos$\delta$; $\zeta/\Delta$ or Z/R=sin$\delta$.
        Other Origins of Coordinates        Remarks and Relations
        Geocentric:        origin of coordinates is the center of the Earth.
        Heliocentric:        origin of coordinates is the center of the Sun.
        Barycentric:        origin of coordinates is solar system's center of mass.
        Other Reference Planes and Directions        Designation of Spherical Coordinates
        Horizon and Local Meridian        Azimuth and Altitude
        Equator and Local Meridian        Hour Angle and Declination
        Orbit and Equatorial or Ecliptic Node        Orbital Longitude and Latitude.

| | |
|---|---|
| 1c) | <u>Adjust prior art astronomy data stated for position types, into useful data per astrology convention</u>: trivial differences exist among these types due to parallax, refraction, aberration; max. 1.5° (Moon). |

Position Types        Remarks and Relations
        Apparent:        where the observer, at origin of coordinates, would see object.
        Geometric:        actual position at time of observation, relative to Earth's center.
        Astrometric:        positions corrected for small aberrations, used with catalogues.
        Mean Place of Stars:        heliocentric position, Besselian year, mean equinox and equator.

Figure 22 (Continue)

| | |
|---|---|
| 1d) | Adjust time conventions of prior art astronomy data, artifacts and references for any of 1) thru 10): relations between conventional time systems and their related concepts generally afford conversion. |

Time Systems — Remarks and Relations

Sidereal Time: hour angle of the vernal equinox, the first point of solar year based on rotation period of Earth, or diurnal motions of stars.

Local Sidereal Time: = [Greenwich (meridian) sidereal time − longitude of observer].

Greenwich Mean Sidereal Time: rotation of Earth relative to mean vernal equinox; defines UT1
(GMST or GMT) nutation is averaged out; only precession affects mean equinox.

Universal Time (UT, UT1, UTC): precise measure of time, the world standard civil time-keeping mean solar time at Greenwich meridian, adjusted polar motion.

International Atomic Time (TAI): based on dispersed atomic clocks, most precise real-time scale.

Coordinated Universal Time (UTC): related to UT1 and TAI, basis of world's official time-keeping.

Ephemeris Time (ET): based on orbital motions of moon, Earth, planets in solar system used to be the basis of astronomical ephemerides: $ET=UT+\Delta T$.

Terrestrial Dynamical Time: TDT or TT, scaled to ET, for apparent geocentric ephemerides.

*Note:* expressions of one time system in another may not be possible, eg. sidereal and ephemeris.

Date Conventions: eg. Greenwich sidereal or Julian ephemeris, date or day number.

Calendar and Cycle Conventions: seasonal tropical: solar year, synodic: lunar month, diurnal: day.

2) Adjust Western (tropical) Astrological Data, Artifacts, Ephemerides, Calendar, Reference Resources
data in astrology convention: adjust for precession by one zodiac sign, i.e. 30° of 360°, westward, or use westward adjustment of 29.7° for 1998; precession other years add ≅ 0.014°×(year-1998), or any accurate adjustment for precession of equinox at any time(T); adjust other times accordingly.

3) Adjust Eastern (vedic, Hindu, sidereal) Astrological Data, Artifacts, Calendars, Reference Resources
related to Western data by increment (ayanamsa), range 19°-25°, now ≅23.4°=obliquity of ecliptic: adjust Eastern for westward precession by remainder of one zodiac sign, i.e. 30° − given ayanamsa, or, base adjustment on (29.7°− given ayanamsa) for 1998; other years add ≅ 0.014°×(year-1998), or make any accurate correction of Eastern data for or at any time(T); adjust other times accordingly.

4) Adjust Chinese (lunar animal, element) Astrological Data, Artifacts, Calendars, Reference Resources
to the extent zodiac sign astrology has demonstrable correspondence, invention's data are possible: eg. if Western solar zodiac dates are used, these are adjusted by invention's calendar dates or by 2).

5) Adjust Data, Artifacts of Computer Programs, Apparatuses and Systems of Astronomy or Astrology
Astronomy: eg. planetarium programs use α and δ; find component's ecliptic positions by conversion
Astrology: adjust output, data, artifacts for input time and location per appropriate form 2), 3) or 4).

6) Determination of Invention's Positions by Direct Observation(s), with or without, Aid or Equipment
determination for components and zodiac belt by single party on a local, partial, viewable sky basis.

7) Determination of Invention's Positions by Planetary Radar Astronomy or by Echo Imaging Device
high precision technology to determine component positions, using radar, echo or imaging devices.

8) Determination of Invention's Positions from Data Set(s) across Time by Algorithms or Adjustments
positions for and from components rendered via complex formulae of motions or changes over time.

9) Determination of Invention's Positions by Multiple, Coordinated, Observations, Images or Data Sets
comprehensive (full sphere) determination for components and zodiac belt using coordinated means.

10) Determination of Invention's Positions not mapped to Twelve Uniform Zodiac Signs on Ecliptic Belt
invention's positions to or from data of IAU 1930 delineation or data of thirteen signs/constellations.

STARS IN ECLIPTIC COORDINATES

This application is a divisional of my U.S. Non-Provisional application Ser. No. 10/671,415, which I filed on Sep. 25, 2003, as pro-se independent inventor, and claims benefit under Sec. 120 and 365. application Ser. No. 10/671,415 is a divisional of Ser. No. 09/849,582.

This application is a divisional of my U.S. Non-Provisional application Ser. No. 09/849,582, which I filed on May 5, 2001, as pro-se independent inventor, and claims benefit under Sec. 120 and 365.

My Ser. No. 09/849,582 is a continuation of my PCT/US00/28838 of Oct. 18, 2000, and claims benefit under Sec. 120 and 365, said PCT/US00/28838 claims the benefit of my following applications:

U.S. Non-Provisional application Ser. No. 09/421,192, Oct. 18, 1999;

U.S. Provisional Application Ser. No. 60/172,651, Dec. 20, 1999;

U.S. Provisional Application Ser. No. 60/181,502, Feb. 10, 2000.

My Ser. No. 09/849,582 is a continuation of my Ser. No. 09/421,192 of Oct. 18, 1999, and claims benefit under Sec. 120 and 365, said Ser. No. 09/421,192 claims the benefit of my following applications:

U.S. Provisional Application Ser. No. 60/040,442 of Mar. 12, 1997;

U.S. Non-Provisional application Ser. No. 08/883,753, Jun. 27, 1997;

International PCT Application, PCT/US98/13383, Jun. 26, 1998;

U.S. Provisional Application Ser. No. 60/144,056 of Jul. 16, 1999;

U.S. Provisional Application Ser. No. 60/158,065, Oct. 7, 1999.

My Ser. No. 09/849,582 claims benefit of my provisional applications:

U.S. Provisional Application Ser. No. 60/189,332 of Mar. 14, 2000;

U.S. Provisional Application Ser. No. 60/202,038 of May 5, 2000;

U.S. Provisional Application Ser. No. 60/205,290 of May 19, 2000;

U.S. Provisional Application Ser. No. 60/206,536 of May 21, 2000;

U.S. Provisional Application Ser. No. 60/206,603 of May 25, 2000;

U.S. Provisional Application Ser. No. 60/207,310 of May 30, 2000;

U.S. Provisional Application Ser. No. 60/207,415 of May 30, 2000;

U.S. Provisional Application Ser. No. 60/207,450 of May 30, 2000;

U.S. Provisional Application Ser. No. 60/208,580 of Jun. 2, 2000;

U.S. Provisional Application Ser. No. 60/212,694 of Jun. 19, 2000.

I, David Andrew D'Zmura, am a pro-se independent inventor, the sole inventor/sole applicant/sole owner. The inventions herein were not made under Federally sponsored research and development.

TECHNICAL FIELD

The invention describes innovative astrological methods, processes, apparatuses and systems. Unique celestial mapping systems, processes and star catalogues are described, as are unique innovations in astrological tarot and in alphanumerology.

BACKGROUND

"In the beginning God created the heavens and the earth . . . . And God said, "Let there be light in the expanse of the sky to separate the day from the night, and let them serve as signs to mark seasons and days and years, and let them be lights in the expanse of the sky to give light on the earth." And it was so. God made two great lights—the greater light to govern the day and the lesser light to govern the night. (God) also made the stars. God set them in the expanse of the sky to give light on the earth, to govern the day and the night, and to separate light from darkness. And God saw that it was good. And there was evening, and there was morning—the fourth day." From the Book of Genesis, The Holy Bible, New International Version, Zondervan Bible Publishers.

As popular as the weather, astrology is a global, omnipresent, mainstream endeavor, with substantial media coverage and commercial industry. Nearly every one has opinions about it or has heard of it. The bevy of astrologers offering services confirms the public curiosity, acceptance and commercial support of this vocation, hobby and entertainment. Syndicated columns in newspapers, magazines and publications, televised programs and spots, tele-services and info-mercials, internet and web sites, plus the myriad advisors, professionals and professional associations, books, CD-ROM's and disks, comprise the large astrology industry. On a global, world-wide basis, astrology is practiced and performed in a few distinct, but interrelated, methodological forms across the entirety of the world's peoples.

In turn, astrologers ardently study and discuss their subject. Assorted titles are available at most libraries, with many volumes being carried by America's largest booksellers and computer program vendors. The use of astrology permeates the personal realm as numerous persons and peoples use astrology for diverse purposes and reasons. From "getting to know" someone, to the decisions shaping nations and business, one hears frequently of the use of astrology by people, from President's wives to stock selection experts. "What is your sign?" is a question often heard.

But this interest in astrology is undermined by the methods of the consolidated astrology industry. Unbeknownst to the public at large, the current and exclusive methods for the determination of astrological information, to discover and render the "signs" under which a person is allegedly born, are factitious or erroneous. For each or any astrological component and at each and every epoch in time, the zodiac positions determined, rendered or stated by these prior arts are wrong as to astrological content.

Astrology has long been practiced, with peoples over the course of time using its products and services for interpretation, recreation, meditation, analysis, fortune-telling, games, augury and entertainment. Now astrology is used in many applications including psychology, healing, planning, investment, diet, hygiene, travel, interpersonal relationships, self and God awareness. Astrology for the common individual first became popular last century, in tow with the advent of personal psychology. Earlier, astrology was practiced for nations, leaders, celebrities, omens, wars and welfare, or for past, present and future dates or events such as solstices and eclipses.

Up until the nineteenth century, our solar system was known to include only the planets up to Saturn. Ancient astrologers were the astronomers of yore and devised an interpretative system for the meaning of the planetary locations and interactions. Hence, just as alchemists were the forerunners of modern chemistry, astrologers were de facto the astronomers in times past. Yet, just as the chemists separated out from the alchemists, the astronomers parted ways with the astrologers.

The astronomers were concerned with the precise, tangible science of celestial mechanics, coming to renounce any interpretative arts, for lack of proven causality. This fissure continues today, overshadowing the vital error within the astrologers' fundamental methods. This dispute covers over the substantive issue at the heart of astrological inquiry: the current astrological methods return factitious, empirically false, phenomenologically inaccurate, zodiacal positions, leading to the larger consequence that all prior art artifacts, products and services misinform as well, given their erroneous component data.

Astrology evolved in its own course, having much about it that is sturdy. Historic progress through the nineteenth and twentieth centuries included new discoveries, such as the planets Uranus, Neptune and Pluto. Astrologers assigned meaning to these new planets; astrology embraced these gifts from astronomy, with a resultant common presumption that astrology is as scientific as possible, if still questionable in effect.

Although the physics of astrology depict the heavens as circling the earth, the consequence of this fallacy is trivial, as pertains to the accuracy of the components moving across the zodiacal belt. So it is not a consequential fault for the astrologer to showcase the component positions as moving along the zodiacal circuit, with the earth as center. Moreover, this conveys the relativity from the subject's perspective. Ancient maps of the heavens, however, were as apt to be drawn from the vantage looking in on earth, with the order of the constellations, the zodiac included, then being reversed in order and directional motion, from the earth-centered, outward-looking, vantage. From their system perspective, the subject is in the opposite sign, and the sign order is reversed. See also *Constellations*. National Audubon Society Pocket Guide. ISBN 0-679-77998-1. Page 192.

Astrology, according to Webster's Dictionary, is "the divination of the supposed influences of the stars and planets on human affairs and terrestrial events by their positions and aspects". The positions are of primary importance to the astrologer, since the aspects are found from the component positions, which must first be established correctly. Astrologer's reference sources are used to establish the zodiacal positions per the query inputs of time, date and earthly location. "One's horoscope is a map of the heavens at the time of one's birth, showing the position of the heavenly bodies in the ZODIAC", according to *The Concise Columbia Encyclopedia*. However, these astrologer's resources, containing any of ephemerides (calendars of component zodiac positions), related look-up tables, instructions, algorithms and/or automated computations, engineer, or are themselves engineered to, empirically artificial positions. Nevertheless, the implicit and obvious assumption is that component data be of the empirically natural, zodiacal position of star, sign and symbol.

Neither the astrological community nor its commercial products and services utilize the concretely observable zodiacal positions. Thus, while the astrological community uniformly uses prior art systems, the public is not aware of this discrepancy from natural fact, especially as the various practiced forms of astrology imply or even assert that their methods are concrete. Moreover, what is not obvious is the magnitude and significance of systemic error, for its magnitude causes the data, the astrological artifacts rendered thereby and interpretative comments thereon, to be greatly comprised. The signs must be right and not corrupted.

Astrological methods, and hence their reference resources, processing apparatuses and systems, do not produce the invention's zodiacal positions and artifacts for the querist or for those who use astrology. If the error of prior art methods were but slight! Current methods essentially place every planet and angle in an incorrect zodiacal sign, or at a significantly incorrect degree within a sign, depending on the particular prior art astrological form, thus misleading the astrologer at each and every turn during assessment of a profiled disposition.

Indeed, when a Western astrologer says, for example, that in February 1998, Saturn is in Aries (per standard astrologer's ephemeris, e.g., *Parker's Astrology*, by J. and D. Parker, 1991, p. 388), how should anyone using that reference know that this is naturally incorrect? Saturn was actually in the sign/constellation of Pisces at that time, see FIG. 4, for month, February 1998.

Aries is a cardinal, masculine fire sign, ruler of Mars, exalted by the Sun. In comparison, Pisces is a mutable, feminine water sign, ruler of Neptune (and by tradition, of Jupiter), exalted by Venus. These two signs, like all neighboring signs, are very different, with very distinct meanings for purposes and usages of interpretative astrology.

This falsification occurs not to just a single, isolated planet, but to each and every solar, lunar, planetary and axial component requisite to astrological purposes. The component data represented by all prior art methods, resources, apparatuses and systems consistently reveal empirically false zodiacal position/sign assignment and data. This systemic and persistent error is of catastrophic import because all astrological signs/positions change as a result. Products and services using prior art artifacts of position data will fully mislead any user's interpretation, information or entertainment.

Nature of Error in, and Improvement by Invention of, Prior Art

I) Astrological Prior Art:

On a global basis, there are three major systems of prior art astrological methods in use today. All three of these methods are in consequent manner either erroneous or factitious, being subsequently improved by the invention specified herein. These three methods are identified below as they are commonly referred:

1) Western: "tropical", "sign" astrology: primary form practiced in USA, Europe and Australia/NZ
2) Eastern: "Hindu", "vedic", "sidereal" astrology: primary form in India, Middle East, Asia, Africa
3) Chinese: "animal", "element" astrology: primary form in China, popular elsewhere.

1) Western Astrology:

Western, tropical astrology determines positions of planetary, solar, lunar and axial components not as stating the actual, observable locations of these within the twelve zodiac constellations, but rather under the factitious practice of assigning each zodiac "sign" with one-twelfth (30°) of the ecliptic (360°), beginning on the vernal equinox as Aries 0°, then Taurus at 30°, then Gemini, Cancer, Leo, Virgo, Libra, Scorpio, Sagittarius, Capricorn, Aquarius and concluding in Pisces, irrespective of the physical zodiac constellations.

Western, tropical, astrology was institutionalized through conditions, conventions and data dating to Ptolemy (c. 90

AD–c. 168 AD) and to Hipparchus (fl. c. 146 BC–127 BC). Considered the greatest astronomer until Copernicus, Hipparchus provided detailed and exact mappings of star positions and constellations, completed in 129 BC (this is one date used to estimate precession herein), and discovered the phenomenon, the "precession of the equinoxes", a 26,000-year cycle. His catalogue of positions was assimilated in full by Ptolemy and used by astronomer, Edmund Halley. Today, astronomy catalogues still refer to his work.

Ptolemy, however, had a greater effect in establishing the preeminent forms of astronomy, cosmology and astrology which ruled the next millennium. Although inaccurate as far as depicting the orbital relations, his work fixed the mapping, naming and designations for the divisions along the zodiac belt over the course of the year, initiating on the vernal equinox, as concurrent to the beginning of Aries. Ptolemy's lasting work is his thesis on astrology, the *Tetrabiblios*, that eternally fixed the astrological zodiac sign on the vernal equinox as Aries 0° for Western "tropical" astrology, also named the "moving zodiac".

At the time of Hipparchus, the actual observable constellations were used—this is where modern Western astrology holds them to this day. Yet, over any lapse of time, a slow and constant phenomenon, the "precession of the equinoxes", moves the equinox and solstice points westward along the ecliptic belt of zodiac constellations. The rate of precession is slow, almost nil (about 50 seconds/year), such that it barely moves one single degree (or 60 minutes) of the 360 degrees along the reference coordinate sphere during a long human life. Under the ecliptic coordinate system, this used predominantly in astrology, the precession of the equinoxes, general precession, is roughly equal to the precession in longitude and the precession in latitude.

Whether as being general precession under an ecliptic coordinate system or as general precession under the equatorial system, these two are shown at the vernal equinox to be equal to one another and reflect the elapsed precession of the equinoxes for the purposes of astrology. General precession is a complex measurement that involves several unique factors, in equatorial coordinates, precession in right ascension and in declination, whereas the precession longitude is a single factor, defined, and convenient for use with an ecliptic mapping system of astrology.

The precession of the equinoxes occurs because of solar, lunar and planetary gravity on the earth's equatorial bulge (lunisolar and planetary precessions). Precession renders the earth to spin like a top: the plane of the actual ecliptic forms an oblique angle of about 23.4° to the plane of the celestial equator, and intersects the equatorial plane at the equinox points. If the obliquity were zero, there would be no seasonal change during each year. The precession of the equinoxes causes the shifting zodiac position of the seasons.

The Earth's precession, orbit and position are continually being affected: by oscillations termed nutations, varying the speed of rotation and the oscillation of axis; from the Moon and Sun, the Earth's atmosphere, magnetosphere and oceans; by interplanetary mutual attractions, solar wind, tidal braking and space weather. Though these slight variances affect a planet's rotation and movement, determinations by simple fixed constants for general precession rates, for precession in longitude, and for physical star movement, of the zodiac signs at the vernal equinox, are fully sufficient over the 2000 year period involved.

At this point in time, the effects of precession over time yield significantly different positions than those held by Western astrology. Western astrology says that at the vernal equinox the sun is always under Aries 0°, but at the vernal equinox, the sun is actually, presently, 30 degrees westward, thus at Pisces 0°, this equal to Aquarius 30°. This thirty degree differential is accurate to within one degree, the precision required in most astrological artifacts. Note that with any more westward precession, the actual zodiac sign on the vernal equinox will have changed from Pisces to Aquarius, the Age of Aquarius.

Beyond the simple observable truth that Western astrology determines positions by factitious means, there are three critical self-contradictions within Western astrology. First, Ptolemy neglected to incorporate the precession of the equinoxes into his astrological catechism, though, through Hipparchus, he was aware of its effect. Although Ptolemy defined the vernal equinox to nearly accurate positions of his time, when he fixed this location of the equinox zodiac position, the zodiac constellations became, increasingly over time, factitious signs.

His failure to incorporate precession is understandable— did he think his system and records would be in use two thousand years later when precession was relevant? Second, current arguments say that Aries, the first sign, represents the new, fresh beginning of Spring, with its expansion and growth into Summer, and hence, must mark the vernal equinox. But this ignores the fact that on each vernal equinox, in the Southern Hemisphere, the equinox marks the beginning of Autumn, the end of Summer, and the coming contraction in Winter.

Nonetheless, even on the basis of claiming to prefer their methods because of the seasonal nature of the year, this very physical phenomenon, the seasons, is caused by the very set of physical circumstances, obliquity and precession, which the Western methods failed to incorporate. The precession of the equinoxes and obliquity cause the seasons. Their movements are related by a perpendicular and are not the same. By making seasonal arguments and marking the year according to the natural seasons, Western astrology should necessarily incorporate the shift of the zodiac sign on the equinox to reflect the scientific fact of precession, the causation of the annual seasonal cycle.

Second, Western astrologers contradict themselves by their use of precessed positions or methods in other instances. Some examples are given. Firstly, Western astrologers are proud to announce that we are on the brink of the Age of Aquarius. Now, these "Ages" refer to the position of the sun on the vernal equinox, and we are at the change from the Age of Pisces into the Age of Aquarius. Yet, Western prior art says the vernal equinox is always fixed at Aries 0°, contradicting themselves unless this is instead the Age of Aries, and always has been and will be, the Age of Aries.

Secondly, Western astrologers create their artifacts to otherwise reflect the obliquity of the ecliptic. The axial components of charts, principally, the perpendicular angle between the subject chart's ascendant and midheaven, reflect the practice that the midheaven is usually determined with respect to the actual angularity relative of the input subject's location on Earth to the ecliptic, not the equator. This fundamental axis in Western astrological chart artifacts is only ever exactly 90° when the subject's location is exactly under the path of the ecliptic. Here, prior art is accurate, though its signs are not.

Thirdly, Western astrology books and information sources routinely represent, use or make use of representations, that the physical constellations underlie as foundation and causes of astrological phenomena. Included often are illustrations suggesting the determination of planetary positions from the empirically observable positions of such within the physical constellations ringing the zodiac. Tropical methods "use" a physically sophomoric "moving" zodiac "sign" system, but often depict the twelve astrological signs as the zodiac constellations of physical stars. Yet, actual positions in the zodiac regions are never shown concurrent with their factitious zodiac signs.

2) Eastern Astrology:

Now, in books and practice, many knowledgeable and expert astrologers say that the determination of positions based on the applicable constellations is performed by the prior art form of Eastern, "Hindu", "vedic" and "sidereal" astrology. These astrologers frequently cite the precession of the equinoxes as crux of the fundament of their methods for the determination of positions: these sources state that their positions can be calculated from the Western positions for a given subject by adjusting for a differential increment. This is supposed to make the positions adjusted for precession since the ancient times.

This differential is termed, in vedic parlance, the ayanamsa, and is alleged by Hindu, vedic and sidereal astrologers to be the correct, precession adjustment for the correction over time from the Western tropical positions. There are many slightly differing numbers on the applicable degree adjustment, but all Eastern sources place the correct ayanamsa between 19 and 25 degrees, with all of the leading references quoting a figure of between 23 and 24 degrees for present day. These methods best estimates (23½°) mirror the angle of the ecliptic's obliquity in magnitude and variance.

It is worth remarking that variation occurs in the angle of obliquity over a lengthy 41,000-year cycle, but never by more than a few degrees in either direction, such that the present angle, about 23.4°, is near to the middle of the range in values. Thus, the variation across the degree estimations of the ayanamsa by leading Eastern experts also belies the fact that this astrological method identifies and adjusts by the angle of obliquity. However, it is the degrees of general precession, appropriately in ecliptic systems, the precession in longitude, that correctly defines the adjustment from the Western positions.

Astronomers' references cite the figure of 30° degrees as the elapsed amount of precession from Aries 0° on the vernal equinox. As additional proofs, the actual degrees of precession since the time of Hipparchus can be approximated using Newcomb's constant for precession in longitude (50.26 seconds per year) times the elapsed time from 129 BC to 1997 AD (2126 years), divided by 60 seconds per minute and by 60 minutes per degree. The result is 29.7 degrees. The Eastern ayanamsa is not set to Ptolemy (c. 150 AD: this would be some 26 degrees of precession).

Since the amount of precession, the ayanamsa, from the Western zodiac signs and positions, is now a 30 degree subtraction, a real and substantial imprecision results when using Eastern methods. All Eastern (and Western) signs of the zodiac, listed for calendar dates of signs and sign changes, are in error. All calculations of Eastern (and Western) component positions, to degree, are in error. Eastern astrology emphasizes sign over degree; on average, 20% (6/30) of sign assignations are errant; under Eastern, if the ascendant is errant all houses err.

On page 30 of her book, *Vedic Astrology*, Samuel Weiser Inc., 1997, Ms. Ronnie Dreyer claims as fact that the vernal equinox, Mar. 21, 1997, falls at Pisces 6° 17", instead of Western astrology's Aries 0°. As Ms. Dreyer correctly points out, page 33, because of Eastern astrology's emphasis on sign over degree, though accuracy to the degree is required to convert Western data, "a discrepancy . . . between the ayanamsas . . . can make a very marked difference, especially with planets that change signs according to different ayanamsas". Hence the invention's methods help here.

Eastern astrology is widely practiced by the people in the nations of China, Asia, India, Moslem Near East and much of Africa. Vedic astrology's purposes tend to be focused on the spiritual enlightenment of the inquiring subject, much as the New Age astrology directs inquiry. Vedic astrology can be shown to share mainly similarities to the practiced Western astrology, for instance, twelve zodiac signs, twelve houses, ascendant, sun and planets (usu. excluding the outer planets) and lunar nodes, with their meaning and correspondences as concordant to Western ones.

Vedic (Hindu) astrologers do not create a circular astrology chart like their Western counterparts. Rather they form a box square of twelve house units, some with an open middle. Thus, rather than a circle, the zodiac is pictured within a box. Some siderealists use a circular chart. Of greater significance, all of these Eastern astrology charts do not render angles and houses at the exact degree within a zodiac sign, say, an ascendant at Libra 15°. Each house is solely dedicated to a single sign, here, the first house is simply Libra, although the ayanamsa calculated out Libra 15°.

In Western astrology the exact detail typically would be transposed, let's assume here a Western ascendant of Libra 15°, hence the first house begins at Libra 15°. The Western's first house generally contains parts of two signs since it runs up to the second house angle, say, thirty degrees later, at Scorpio 15°. The Eastern second house is just Scorpio, from 0°–30°. Thus, if a position was at Scorpio 2° for both systems, it would be in the first house under Western astrology, while it would be in the second house under the Eastern methods. Eastern houses are each 30° long (one sign); Western ones can be equal, but more often are of "placidus" design, not equal, or other convention is used.

3) Chinese Astrology:

The third form of astrology, Chinese, is based on a cycle of twelve animals, each being designated a year of regency in continuing order. Each animal has been attributed characteristics, with differences among any one animal type being further describable by element category. There are five elements: metal, water, wood, fire and earth (Western has four elements: fire, water, air and earth). All astrological forms have two polarities: expressed as any of: yang and yin; positive and negative; masculine and feminine; and/or active and passive.

Chinese astrology shares Western and Eastern astrological formats in that it has twelve signs, with each animal therefore often held as corresponding to the one of the twelve zodiac signs and constellations. Chinese astrology emphasizes lunar position, in fact unlike Western and Eastern (tropical year, Gregorian) calendars, the Chinese method is based on lunar calendar cycles of 60 years generated from the five twelve-year animal variations. The Chinese animals are lunar signs, in contrast to Western emphasis on a solar sign.

Unlike Eastern astrology, which fully corresponds to Western astrology, but with different names and artifact designs, Chinese astrology is focused on a reduced set of astrological components, principally the lunar sign, specified by animal and element, and the ascendant sign, also one of the twelve animals, determined by the time of day in which the subject is born, with each sign affixed with 2 of 24 hours per day. The lunar sign is held to hold import for the course of one's life; the ascendant reflects personality.

Chinese astrology places great weight upon the balance of elements present in each subject's case. The preferable disposition has a representation by each of the elements, as the sixty different lunar years and ascendant lunar sign, etc., give that opportunity. In the absence of balanced representation within the subject profile, the Chinese recommendation is to compensate and balance by evocative naming or a marriage or partnership which add vital elements. Chinese astrology describes the animals and elements at play in an individual life and in one's relationships with others.

Each lunar animal sign is given a month of the year, enabling the Western and Eastern zodiac sun sign systems (a tropical year is equinox to equinox) to be connected and reflected in the Chinese astrological form. Each animal year also has two elements: one relating to the specific year and one that is fixed of the animal. The Chinese form is based on a lunar calendar, institutionalized by Emperor Huang Ti, c. 2637 BC. It is an agrarian calendar system, claimed to be based on and to reflect the annual seasons and growth cycles.

At first glance, it might seem odd that the first animal lunar sign, the Rat, is found corresponding to the calendar dates, November $22^{nd}$–December $21^{st}$. Under Western astrology, this same set of dates is held to be under the solar sign of Sagittarius. Remembering precession, this same period is, per invention, under the sign of Scorpio. How can this be proven? In the year 2637 BC, the vernal equinox would have been in the sign of Taurus. Under this Taurus sun, the first full moon is found in its opposite sign, Scorpio.

Hence, the first lunar sign, commensurate with the start of the seasons and growing cycles in 2637 BC, is the Rat, corresponding to the invention's solar sign of Scorpio and to its current calendar dates, November $22^{nd}$–December $21^{st}$. The list of animal ascendants for the time of day also seems arcane. This can be explained, again, via precession, and without this effect in explication, neither the ascendant by hours or solar date correspondences between Chinese animals and zodiac signs have any logical basis which reconcile these relations.

The Chinese calendar, while focused on the seasons, and hence, its first lunar sign animal is to be found on the vernal equinox, actually begins about the end of January each year. In the year 2637 BC, the Sun, then, would have been in the sign of Pisces. The Sun and ascendant are identical at sun-up. Sun-up in China then would occur in the period, 7 A.M. to 9 A.M., for which time of day the Dragon is assigned. This sign, by the Chinese form, has had the present solar dates, March $21^{st}$–April $19^{th}$, when the Sun by invention has been in the zodiac sign of Pisces.

II) Astrological and Astronomical Reference Resources:

This section has so far examined the zodiac positions of components used in astrological artifacts and as information, showing where and how the three prior art astrological forms are factitious or in error. Recalling Webster's definition of astrology, the astrological profile is developed from positions and aspects. The positions are the primary artifacts of information which must be determined. Once the component positions are known with accuracy, then the aspects between components are found and identified, as a secondary matter.

To the aid of Western, Eastern and Chinese astrologers, in their determination of the component positions, is a dedicated reference resource, termed an ephemeris. Now, an astrologer's ephemeris shows the positions of sun, moon and planets by zodiac sign and degree (one of thirty per sign), per Western methods. Uniformly, Western references and resources do not contain the invention's positions by sign and to degree for any of the astrological components, for or at any and all of the various epochs for which their positions and component data are given.

This is not to assert that prior art astrological ephemerides, aspectarians, reference resources and computer programs do not perform an accurate form of astrometry. Indeed, from the data and/or outputs of prior art resources, accurate information is represented, but for it to state the astrological position per this invention, these data and/or output would have to be additionally processed. The prior art data in ephemerides, book of houses, or as obtained from prior art astrology programs and books can be made per invention after appropriate adjustment.

What may come as a surprise is that astronomers' ephemerides of the sun, moon and planets do not provide the invention's astrological positions either, without a transformation of the data and/or output. With astronomer's positional data, the data is in formats, either, a) not otherwise known and used by astrologers, such as by right ascension and declination, or by local apparent sidereal time, etc., or b) that are misleading, such as by thirteen zodiac constellations under the IAU delineations, or c) that are identical to astrological resources.

In short, the astrologer's reference format requires the components' ecliptic coordinate positions to be given by zodiac sign and often, by the degree (of 30) within the sign. As an example of a prior art astrological ephemeris, see *Parker's Astrology*. Julia and Derek Parker. Dorling Kindersley Publishing. New York. 1991. Compare the information on March 1960, page 369, with that of an astronomer's ephemeris which meets the format per astrology, see *The Complete Planetary Ephemeris* for 1950 to 2000 AD. Hieratic Publishing. Mass. 1975.

For instance, on Mar. $7^{th}$, 1960, the Sun is listed in the astrology ephemeris at Pisces 16.4°, while in the astronomy ephemeris, it's longitude is listed at Pisces 16° 26.4° (i.e. 16.44°). These, and all the data for the given solar, lunar and planetary components in every epoch, are similar. The reason is essentially identical to that previously discussed: based on historical conventions from 2000 years ago, the zodiac sign on the vernal equinox is always marked by astronomers, if marked at all, as Aries 0°, commonly referred to as, "the first point of Aries".

Other types of ephemeris positional data of the astronomer, whether epochs are given by civil calendar or by Julian date, such as the right ascension and declination, geocentric rectangular coordinates, transit times, or in greenwich or local sidereal times, typically do not indicate the zodiac sign expressly, but instead, list positions in hours and minutes. An exception, also found on astronomers' planetarium programs, is when the right ascension is listed by zodiac sign and degree, though unless the conversion to longitude is then effected, the degree cited is misleading as it is in equatorial coordinates.

For instance, on Mar. $7^{th}$, 1960, the right ascension is given by the astronomer's ephemeris as Pisces 17° 31.3' (i.e. 17.52°). If an unwitting astrologer were to use this data, thinking it was Western form, the amount of error (over one degree) would be unacceptable for some astrological purposes and artifacts. To use this data, a trigonometric equation for coordinate transformation is required to render the right ascension into the precise longitude. Most astronomy data for component positions are not listed by the signs and degrees.

If an astrologer utilized an astronomer's ephemeris program, such as NASA Jet Propulsion Laboratory's Ephemeris Generator, (http://ssd.jpl.nasa.gov), and requested the zodiac sign constellations for the Sun's position throughout the course of the year, one might be surprised to find the named signs for many dates at such variance with the accepted solar dates used in astrology. This type of ephemeris provides for constellation ID as defined by IAU (1930) boundary delineations. This standard has thirteen non-uniform, unequal zodiac signs (the twelve traditional signs, plus Ophiuchus).

For the purposes of astrology and planetary astronomy, the reliance upon twelve zodiac signs is both logical and apparent. Mapping and sighting are greatly facilitated by dividing the celestial sphere of 360° into equal sections, twelve by thirty degrees. The use of thirteen odd, non-uniform, sky regions is a burden on a novice. Also, the insertion of Ophiuchus, between Scorpio and Sagittarius, is argued for based on the ecliptic's path, and change to it, but a visual, non-grid perspective on the ecliptic's current movement in that region does not necessarily convince one of this need.

The use of twelve is the civil calendar standard of months, driven by the seasons, and reflects the long-standing and well-developed lore pursuant to astrological inquiry and understanding. All major forms of astrology utilize a twelve sign convention. Astronomers may have no need to change their ephemerides to reflect precession, as their data needs not bear any astrological significance. It, however, is clear and direct to state, find, understand and imagine the invention's component data, rather than using the "first point of Aries", which calls that first 30 degree segment of the ecliptic the sign of Aries, though the constellation Pisces is there in reality. If anything concrete is driving astrological phenomena, it is the actual, physical zodiac star sign constellations along the ecliptic.

Invention's Technical Means and Determinations on Astrological Coordinate Systems, Zodiac Positions, Precession and Precision The "tropical year" is measured as the length from equinox to equinox, 365.24 days, marking the complete annual cycle of the seasons and underlying the Gregorian civil calendar. The synodic month, 29.5 days, marks the cycle through the lunar phases. At the vernal equinox, the Sun crosses north over the equator. Time, specifically, the duration of a second, is the most accurately measured unit known, though many of its properties are unknown.

The principal time standard in astrological use today is Greenwich Mean Time (GMT), established 1884 as the world's official time. The meridian through the Greenwich Observatory was designated as the prime meridian. Astronomical measurements were used to mark GMT local time; other time zones added or subtracted a related number of hours. Astronomical and astrological ephemerides, data and artifacts were, and still are, honed to GMT specifications. Modern time-keepers, however, no longer use astronomical time.

Instead, the current official world time standard derives off of International Atomic Time (TAI), and is termed, Coordinated Universal Time (UTC), this being based off multiple coordinated atomic clocks located around the globe and in space. A single blended, refined value originates from a scientific center near Paris. Universal Time is used in astrological and astronomical data, usually having the Greenwich meridian. Variants of UT exist, as do Greenwich and Local Sidereal Time, plus another format called Ephemeris Time.

While small distinctions result and are required for the various time standard used, conversions exist in references for the manipulation between these time formats, between the coordinate systems, and between these two sets of structures. Thus, there are no existent barriers to the transformation or rendering of any given set of accurate data values into or from astrological component positions, specified per invention, for instance, by zodiac sign and degree, incorporating and displaying the position, properly and accurately accounted for precession.

Coordinate systems have two defining features—the origin of the coordinate perspective and the referential planes of spherical coordinates. For astrological purposes, the origin is "topocentric", i.e. from the spot of the observer on the surface of the Earth; "apparent" positions. Spherical coordinates in astrological references today show position by celestial longitude and latitude, ecliptic coordinates, standardized by Ptolemy, based on Hipparchus. Astronomy today uses mainly right ascension and declination of the equatorial coordinate system or of the three-dimensional rectangular coordinates (X, Y, Z and R).

Hipparchus divided the ecliptic and the equator into the same twelve 30° regions, naming each for the zodiacal constellation occupying the region. The Surya Siddhanta, the canon of Hindu astronomy, named each twelfth of the circumference with similar zodiac constellations. These markings and assignations remain unchanged today, except, as mentioned previously, under the IAU thirteen constellation delineations. Exact physical description and positions of the zodiacal stars and constellation mapping outlines are available from prior art.

Positions of the sun, moon and planets used to proceed from direct observation. Now, ephemerides are generated using sophisticated algorithms. However, high precision determination of positions is achieved via planetary radar astronomy. In fact, the "astronomical unit", the Earth's mean distance to the Sun, was precisely measured this way. Regardless of means, sound, accurate data are feasible. Hipparchus' own data erred by 0.7°; Ptolemy's deviated by 5.5°. Petersen, Schmidt. "The Determination of the Longitude of the Apogee of the Orbit of the Sun according to Hipparchus and Ptolemy". *Centaurus*. Vol. 12. 1967/68. P. 78.

In practiced astrology, the precision of positional data may not need to meet the extreme fineness of the astrophysicist. Much of astrology rests on the general sign involved, with the degree then being very relevant in determining the accurate sign and in exactly measuring for aspectations. Chinese, and to some extent Eastern, avoid degree specification altogether. In Western astrology, specification to the degree is necessary for axial and house data, for quick moving planets, and for determining inter-planetary aspects within degrees of orb. Critically, the sign must be uniformly correct without exception, the degree accurate.

It is in the interest of the invention's usage to address specifically certain estimates and conversions which are essential to the implementation of methodological, celestial and technical systems, apparatuses, resources, references, data and astrological artifacts, these astro-physical mechanics and computations revealing, confirming and correcting the nature and magnitude of error in the prior art galaxy of the astrology industry. This technical excursion covers the criteria and factors that shape context and data of the invention's astrology.

The point marking and ordering the coordinate positions of astrology's components on the zodiac belt, along the ecliptic's path and throughout the course of time, for zodiac sign astrologers and astronomers alike, is the vernal equinox. This point, defined at the ecliptic's northerly crossing of the equator, has the unique property, that at that point, this position, whether expressed in the ecliptic coordinates of astrologers and planetary astronomers, as celestial longitude (by zodiac sign and degree) and latitude (respective the ecliptic) or in equatorial coordinates of right ascension (as hours or by sign) and declination (respective the equator), has the same values, namely, zero, i.e. the first point. These two coordinate systems converge and are set here. Thus, one same and identical figure can relate the precession at the equinoxes to both systems, and to other systems, eg. X, Y, Z and R rectangular one.

The property of ecliptic and equatorial coordinate system convergence at the vernal equinox enabled Hipparchus to connect both these systems under the same twelve 30° zodiac signs. Also, it enables the amount of general precession at the vernal equinox to be implemented in both systems via the identical, single amount in degrees (30 of 360). This amount elapsed over time, at that position, is relevant to astrological improvement. It allows one simple adjustment factor and value at the vernal equinox. It is estimated and is approached below in a variety of ways.

The relation between ecliptic and equatorial coordinates is satisfied by any of several different equalities for any point and at any time, but the simplest for use herein, is their relation characterized as (see, *Explanatory Supplement of the Ephemeris*. H.M. Nautical Almanac Office. London 1961. Chapter 2, "Coordinate and Reference Systems", Sections A., B., and P. 26.):

$\cos \alpha \cos \delta = \cos \lambda \cos \beta$ with: $\alpha$=right ascension; $\delta$=declination:

$\lambda$=longitude; $\beta$=latitude where all measurements are expressed in degrees of 360.

Confirming this relation, for Apr. 21, 1998, *The Astronomical Almanac for the Year* 1998, U.S. Naval Observatory, Washington, D.C. 1997, P. C8, shows the Sun's apparent right ascension as 1 h 54 m 17.7 s, with declination of +11° 42' 50", and the Sun's ecliptical longitude as 30° 42' 03", latitude of +0.15". After converting hours into degrees (15 degrees per hour), etc., the values are entered into the above equation, confirming the transformation equation as an acceptable means to move between these coordinate systems:

$\cos(28.5737°)\cos(11.7138°)=0.8599\ 0.8598=\cos(30.7008°)\cos(0.0042°)$.

As mentioned, except as at the equinoxes, the two coordinates systems do not post the same position for components at the same point in time. For example, the planetary astronomers' ephemeris, *The Complete Planetary Ephemeris* for 1950 to 2000 AD, Hieratic Publishing, Mass., 1975, shown earlier to have longitude data identical in form and values as astrologers' ephemerides, has however, any component at any date specified by both ecliptic and equatorial coordinates. On Apr. 21, 1998, the Sun is listed at Aries 28.578° by its right ascension, but its longitude is listed as Taurus 0.698°, both fairly mirroring hours in the *Almanac*. But, unless one knows the difference and relations between these coordinate systems, as well as knowing that astrologers' ephemerides quote positions in celestial longitude, not right ascension, which they do not generally specify, then any astrologer choosing to use astronomers' references may select the errant data set. For, in the absence of instruction, both quoted values for the Sun are in the terminology used by astrologers.

Moreover, while there is a single value for both systems to calibrate the vernal equinox correctly, the annual rate of general precession is not equivalent or identical to the annual rate of precession in right ascension. The former's value, which can be used directly to approximate the elapsed precession of the vernal equinox since the time when "the first point of Aries" was initially set, is 0.0139696 degrees per year. Multiplied by the 2127 years, 129 BC to 1998 AD, gives a total general precession at the vernal equinox of 29.71°, increasing about 0.014° per year thereafter. This amount supports the figure estimated earlier, 29.7° of 360° general precession, this is one full sign back along the zodiac belt, an origin of Pisces 0.3°.

However, if one simply applies the annual precession in right ascension, 0.0128122°, to 2127 years, this precession calculates at 27.30. This is not the full and correct value appropriate, but by incorporating the precession in declination, 0.0055676°/yr, the other major contributor to general precession, an accord results (*The Astronomical Almanac for the Year* 1998. U.S. Naval Observatory. Washington, D.C. 1997. P. B19.):

$\cos(27.3°)\cos(-2127\ yrs\times 0.0055676)=0.8697$ arc-cosine (0.8697)=near general precession=29.6°.

While other precise methods exist to compute estimates for the general precession of the equinoxes over time, there are qualifying comments made here. Any date being called back to, ie. 129 B.C., as the origin and data set of the present conventions and required adjustments, is at best itself an approximation, since the work and catalogue of Hipparchus is concluded then, but began years earlier. Because the ancient catalogues recorded the positions of stars and planets with low accuracy, this data denies high precision statement. Personal preference on precision, or dates, is reasonably accommodated. Approximation by ecliptic precessional elements is also viable, or as by the reduction of equatorial rectangular coordinates (for listing of equatorial or ecliptic precessional elements, and on precession, see *Explanatory Supplement of the Ephemeris*, by the H. M. Nautical Almanac Office, London, 1961, pp. 28–37).

Today, "the first point of Aries", Aries 0°, is a name and convention used by Western astrologers and planetary astronomers to name the vernal equinox and initiate the coordinate order. It is factitious, since it does not refer to the set of physical components that can be found independently in the sky, such as stars or constellations otherwise known as "the first point of Aries", or the constellation of Aries, etc. Yet, a physical-based definition of zodiac star objects in the heavens was the original, non-factitious method, and basis for "the first point of Aries" as used and understood in astrology and in astronomy.

At the time of Hipparchus, a time when the positions and the coordinates reflected the concrete zodiac signs per region, the vernal equinox was physically marked when "the first point of Aries" appeared. Alas, this "point" was not a single star, but came to refer to two stars, Beta Arietis and Gamma Arietis, otherwise named, Sheratan and Mesarthim, respectively. These stars begin the constellation, Aries, but are separated themselves by about 0.3° in right ascension and 1.5° in declination. "The first point of Aries" never could be one point in the heavens, or a given star(s), fixed at the vernal equinox over time. See *The Constellations*. Motz, Nathanson. Doubleday. New York. 1988. P. 309–310. See *Dictionary of Astronomical Names*. Room, A. Rutledge. London. 1988. P. 92, 112, 144–145.

Nonetheless, this physical object definition of the vernal equinox, existent and accurate then, serves to provide a means to estimate the elapsed general precession of the equinoxes. Recalling that general precession is, to 99.7%, the precession in right ascension and the precession in declination, and also that at the vernal equinox, the ecliptic crosses the equator, hence, latitude and declination are identical there, one can use Hipparchus' recordings on these stars, and their present positions, to evaluate and render another sound approximation.

The star, Alpha Arietis, a.k.a. Hamal, the brightest star in the constellation of Aries, is near to Beta and Gamma, the former's declination being recorded by Hipparchus as ">12°". See Maeyama, Y. "Ancient Stellar Observations Timorcharis, Aristyllus, Hipparchus, Ptolemy-; the Dates and Accuracies". *Centaurus*. Vol. 27. 1984. P. 294. Recalling that Hipparchus' variance in error on measurements was about one degree, and that the rate of annual precession in declination is 0.0055676°, about 11.8° from 129 BC to 1998 AD, then today's declination for the star, Alpha Arietis, should be about 23.8°. It's actual 1998 declination at upper transit at Greenwich is listed as 23° 27' 19", i.e. 23.46°, which is within the error range of Hipparchus. See *Apparent Places of Fundamental Stars* 1998. Astronomisches Rechen-Institut. Heidelberg. 1996. P. 33.

Using the value, 11.8°, the approximation of the elapsed precession in declination, as the change from original declination, the commensurate change in right ascension can also be found for Beta (Sheratan) and Gamma Arietis, knowing that at the outset, their right ascension was near or at zero, hence, the change is about today's value. Gamma is west of Beta, appearing first as "the first point of Aries"; the first estimate must be Gamma itself, or just to its east. The mean apparent place of Beta Arietis for 1998 is listed with right ascension of 1 h 54 m 33 s (28.6°) and declination of 20° 47' 54" (20.8°). See *Apparent Places of Fundamental Stars* 1998. P. 31. Gamma Arietis, 1998, has right ascension of about 1.1 m less than Beta ($\cong 27.5°$), a declination of about 1.5° less ($\cong 19.3°$). Precession in latitude is near zero and held as zero here: stars parallel the ecliptic.

Gamma Arietis: $[\cos(27.5°)\cos(11.8°)]/\cos 0° = 0.8683 \rightarrow \text{arc-cosine } (0.8683) = 29.7°$.

The present positions of the "first point of Aries" stars, Mesarthim and Sheratan, given in equatorial coordinates, are ($\alpha = 28.4°$, $\delta = 19.3°$) and ($\alpha = 28.7°$, $\delta = 20.8°$), respectively (converted by inventor to degrees, from sidereal times, in *Starlist 2000*, Dibon-Smith, John Wiley & Son, New York, 1992). The ecliptic coordinates of the "first point" stars, found in FIG. 9, are ($\lambda = 33.2°$, $\beta = 7.2°$) and ($\lambda = 34.0°$, $\beta = 8.5°$), respectively, from:

$\sin \beta = -\cos \delta \sin \alpha \sin \epsilon + \sin \delta \cos \epsilon$ $\cos \lambda = (\cos \delta \cos \alpha)/\cos \beta$ with the obliquity of the ecliptic, $\epsilon \cong 23.4°$.

Next, I subtract out the elapsed general precession since 129 BC, in right ascension (0.0128122° to 129 BC=27.25°) and in declination (0.0055676° to 129 BC=11.84°), from current data of Mesarthim, ($\alpha = 28.38°$, $\delta = 19.29°$), to estimate position in 129 BC: $\alpha = (28.38° - 27.25°) = 1.13°$ and $\delta = (19.29° - 11.84°) = 7.45°$. Then, holding $\epsilon \cong 23.6°$, to reflect its mean angle since 129 BC, and using the same conversions just above, Mesarthim's position in 129 BC stated in ecliptic coordinates, was ($\lambda = 4.03°$, $\beta = 6.37°$). Subtracting these past coordinates from the present coordinates for Mesarthim gives elapsed precession as ($\lambda = 29.2°$ and $\beta = 0.8°$). Thus, general precession $\cong (\alpha = 27.3°$, $\delta = 11.8°)$ or ($\lambda = 29.2°$, $\beta = 0.8°$).

This section demonstrated sound estimations, these uniformly indicating the amount of precession in longitude, at the vernal equinox, to be west one full zodiac sign, i.e. 30 of 360 degrees, about 29.7° precession for 1998 AD, when calculated from 129 BC.

As shown in arguments, the general precession can be broken down into its equatorial coordinate components, some 27.3° in right ascension and 11.8° in declination, or into its ecliptic coordinate components, 29.2° in longitude and 0.8° in latitude.

Arguments also afford calculation to dates somewhat earlier or later than 129 BC. General precession, calculated from 149 BC to present, is 30.0°. The elapsed general precession can also be estimated using the position of the "first point of Aries" stars.

The invention's incremental adjustment is necessary on Western, Eastern and Chinese astrology positions, dates of signs, syndicated and reference data, and for any artifacts, systems or apparatuses. For Western astrology charts and/or computer programs, the zodiac ring is effectively rotated 30 degrees back.

In the means to this point, the inventor used where required the date, 129 BC, as the date at which the vernal equinox was fixed as Aries 0 degrees by Western, tropical, astrology; this is the date when Hipparchus is to have finished his star catalogue.

But, to begin to construct a star catalogue, the origin of the mapping system needed be first set, and as this is the vernal equinox, so, another valid and appropriate date to select for calculations is at the beginning of his cataloguing, by 146 BC. From 146 BC to the new millennium 2000 AD, is 2146 years. Arguments the new millennium begins 2001 AD, is 2147 years. Further, arguments for 147 BC project 2147 years as year 2000 AD.

Next, is measured the number of years time, required to equal thirty degrees of elapsed precession, as from that full measure of one sign, the vernal equinox is marked thenceforth, Aquarius, and continues on at that time from Aquarius 30 degrees.

In ecliptic and in equatorial coordinate systems, the rate for general precession, 0.0139696 degrees/year, can be applied to determine the number of years required to equal thirty degrees:

$$\frac{30 \text{ degrees}}{0.0139696 \text{ degrees/year}} = 2147 \text{ years.}$$

Starting the new millennium we enter the Age of Aquarius! Newcomb's precession in longitude per tropical year, 50"0.2564 (+0.0222 T, where T=# of centuries), epoch 1900, is one means to use to precess the origin in each year after the new millennium.

As follows, are means showing an independent, second proof, also substantiating changing from 129 BC to 146 BC or earlier, by next determining the shift of the heavens at the vernal equinox, calculated from the first estimate of the "first point of Aries", the double star, Gamma Arietis, Mesarthim, marking that point.

Its current position, was roughly estimated earlier, as having right ascension ($\alpha$) of 27.5 degrees. This approximated value can be divided by the annual rate of precession in right ascension, 0.0128122 degrees/year, to find the elapsed years since this "first point of Aries" star marked the vernal equinox:

$$\frac{27.5 \text{ degrees}}{0.0128122 \text{ degrees/year}} = 2146 \text{ years.}$$

2000 AD minus 2146 years is 146 BC.

This shows that at 146 BC, the star, Gamma Arietis, was physically observable as accurately marking the vernal equinox.

As a confirming proof that both the star based means and the numerical means are reasonably robust, it is collaborated that the 27.5 degrees Gamma Arietis has shifted equals 30 degrees elapsed general precession, their rates in ratio:

$$\frac{\text{rate, precession right ascension}}{\text{rate, general precession}} = \frac{X \text{ degrees, } p.r.a}{30 \text{ degrees, } g.p.} \quad 1)$$

$$\frac{0.0128122°/\text{yr} \times 30 \text{ degrees}}{0.0139696°/\text{yr}} = 27.514 \text{ degrees, } p.r.a \quad 2)$$

Thus, using a physical basis, here being the star, Gamma Arietis, which marked the vernal equinox at 146 BC, a full 30 degrees precession is shown having elapsed by the new millennium.

The precise current position of Mesarthim ($\alpha=28.382°$) determines, 2215 years ago it marked the vernal equinox, determining an origin marked at Aquarius 29.1 degrees. Using a non-grid basis, Pisces marks the vernal equinox. These two means, star and non-grid, can also set the coordinate system's origin.

To this point, several means have been provided by which the origin of the celestial mapping system and astrological positions can be determined. First, it was stated, and is implemented, that the vernal equinox and every astrological position has precessed thirty degrees from Aries 0°, to Pisces 0°, this point being also equal to Aquarius 30°. Second, Newcomb's constant for precession in longitude per tropical year was used (50.26 seconds per year), from 129 BC to 1997 AD and from 150 AD. Third, it was determined by calculation of elapsed general precession over that period; fourth, by adding precession in right ascension and declination, fifth, by transform between equatorial and ecliptic coordinates. Sixth, a determination was made using the "first point of Aries" stars' positions as they were catalogued by ancient astronomers.

Then, a logical argument was introduced supporting the use of 146 BC or earlier as the date setting Aries 0°. A means used the rate for general precession (0.0139696 degrees per year), to show that at the new millennium, the equinox changes to Aquarius. Another means was determined, based on the "first point of Aries" star's ancient position and its precession in right ascension, also indicating the equinox change to Aquarius at the millennium.

Next, precise current position of Mesarthim (Gamma Arietis) was used to determined the historical date at which it was the exact marker of the vernal equinox, being before 146 BC. Finally, using the physically observable zodiac stars in constellation, as determinable from the two-dimensional reproduction found herein, it was shown that the point of the vernal equinox, is in Pisces.

All of these means are valid bases for precisely setting the origin of the celestial mapping system, and in turn, for naming the positions of any astrological planetary and axial component, of Sun signs and calendar dates, of lunar animal signs, of ascendants by hour, and for all astrological data, information and artifacts, including of horoscopes and subject dispositions.

Now, the essential consequence of these varied means for the determination of the origin concern the date when the sign on the vernal equinox changes from Pisces to Aquarius, and here, the user is advised to select the date from among the various choices which most suits their preferences or convictions. The various means presented herein do not otherwise ostensibly effect results found in the positions, signs, horoscopes and dispositions, since all data from these means are within one degree of each other.

Thus, the core mean prevails and is repeatedly confirmed: that the invention's astrological data, artifacts and information are based on a mapping system's origin at Aquarius 30°:Pisces 0°.

To conclude this section on the invention's technical means, several further means are detailed which can determine a precise setting of the coordinate mapping system's origin based on the date of the change from the Age of Pisces to the Age of Aquarius.

First, the given form of Newcomb's precession in longitude per tropical year, 50"0.2564 (+0.022 T), for epoch 1900, where T is per century, can be used, after finding the average value for the precession in longitude over the period, 150 BC to 2000 AD. This value is 50"0.0419. Determining a full thirty degrees gives:

(30 degrees×60 seconds×60 minutes)/
50"0.0419=2158.1914 years 2158 years from 146 BC determines that the Age of Aquarius begins in the year, 2012 AD+70 days. This date, of 2012 AD, is accepted as significant to spiritualists, mystics and believers, many of who prognosticate that the Messiah appears in this year.

Others, particularly those who consider the admonitions and cosmic progression as revealed in the Apocalypse or Nostrodamus, may aver that before the Messiah appears, a phase of destruction and judgment occurs. To determine the accurate date of the era of destruction, a unique means using a physical star basis is given.

Acknowledged as one of the preeminent Rosicrucian alchemists of his millennium, the Comte St. Germain, provides in his obscure treatise, "The Most Holy Trinosophia" (see same, Manly P. Hall, editor, ISBN 0-89314-417-7), in Section IX, cuneiform inscription stating: "The gate of the end (completion or conclusion, ed.) when the Leg or the Waterman turns in the circle (the equinox in Aquarius, ed.)". The reference to the Leg is that of the Great Man (Aquarius). In Section VII, in cuneiform-Hebrew, "And is the outbreathing of Everlastingness. Know that place (sign or symbol, probably a zodiacal constellation, ed.) to be the end (of the ages, ed.). The Leg . . . is the beginning of the destruction." In Section XI, "To be the sign of the Leg with Everlastingness, to pour out and to be the herald of destruction." The sign being XI is Aquarius; the Leg with Everlastingness is the eastward leg, bent in kneeling, as it supports the pouring of the water vessel.

The stars making up that Leg of the Great Man (of Aquarius) have right ascension ranging from 23 hours 09 minutes ($\alpha=347.25°$) to 22 hours 50 minutes ($\alpha=342.5°$). To determine that future date:

(360°−347.250)/0.01281220 per year=in 995 years (360°−342.50)/0.01281220 per year=in 1365 years.

Thus, there is one millennium to come before the end of the ages. Mystics talk of a thousand years of peace to rein on Earth; this is in time. "Christ has died (Age of Aries), Christ is risen (of Pisces), Christ will come again (as Messiah, of Aquarius)".

Ptolemy, in his *Tetrabiblios*, relates his astrological facts regarding the unique stars within each different constellation along the ecliptic's belt. He makes comments on the astrological power of the stars, bearing on the "power of the fixed stars", with reference to those ones occupying the figures in the zodiac.

The constellation Pisces ends at its star, γ Pisces, (α=349.25°): hence marking the vernal equinox until 2839 AD; the constellation Aquarius begins at star, φ Aquarius, (α=348.5°), at the water vessel: marking the equinox starting in 897 years. Under the IAU constellation mappings, the constellation Aquarius begins at 23:54' (α=358.5°): thus marking the equinox in 2117 AD.

This concludes the section detailing means for determining the zodiac sign to degree on the mapping systems' equinox origin.

DESCRIPTION OF THE DRAWINGS

FIG. 1, top, contains the Positions of the Zodiac Signs, each Sign determined with respect to its named Constellation, each of the twelve zodiac Signs of equal thirty degree length. In FIG. 1, bottom, gives Positions of the Zodiac Constellations.

FIGS. 2A, 2B, 2C and 2D provide Catalogue of the Fixed Stars of the Zodiac Constellations in Ecliptic Coordinates by Longitude and Latitude, longitudinal positions given in degree of 360. In right column, star position is given by 30/360° per Sign. FIGS. 2E, 2F, 2G and 2H provide Catalogue of the Fixed Stars of the Zodiac Constellations, in right column, star position is given by Corresponding Part of Zodiac Symbol.

FIG. 3 presents innovative Unification of Sun ("Birth") Signs and Lunar ("Animal") Signs by Dates, calendar year, 1998 AD. FIG. 3A presents Sun Sign Positions at the Equinoxes starting in the New Millennium and Unification of Sun ("Birth") Signs and Lunar ("Animal") Signs by Dates during the calendar year; bottom, is a two-dimensional Reproduction of the Vernal Equinox Origin.

FIG. 3B presents the invention's Calendar Dates for Sun ("Birth") Signs, in side-by-side comparison to the Dates by Western Tropical and Eastern Sidereal prior art, and presents comparisons of Equinox and Solstice positions by the Invention's, Western and Eastern, methods, with related references.

FIG. 4, unique Ephemeris for February 1998, noon GMT, gives invention's Longitudinal Position Data for Planetary Components. FIG. 4 bottom, are tables of Sun Sign Changes for 1998 and 2000. FIG. 4A presents Samples and Portion of Tables per Invention: a Table of Lunar Nodes; a Book of Houses; and a Shortened Ephemeris for the Year 2000.

FIG. 5 contains a complete Set of relevant Look-Up Tables for an Example Subject, born Nov. 21, 1960 at 5:50 AM in Cincinnati, Ohio (longitude West 84° 31", latitude North 39° 6"), containing portion of an Ephemeris by invention, this ephemeris containing the Latitudinal Position of the Planetary Components, in addition to Longitudinal. Beneath that, portions of Look-Up Tables for Sidereal Time and North Lunar Node. The Book of Houses then follows below. At bottom, Lists of extracted Planetary Component Data, stated for longitude and latitude, with the data for the Moon reduced from the Greenwich noon data, and of Axial Component Data. FIG. 5A presents Manufactured Artifacts of Invention in comparison to Western Tropical Prior Art, the data and artifacts per Invention being: 30/360 grid-based; and non-grid constellation-stars based.

Figure 6:
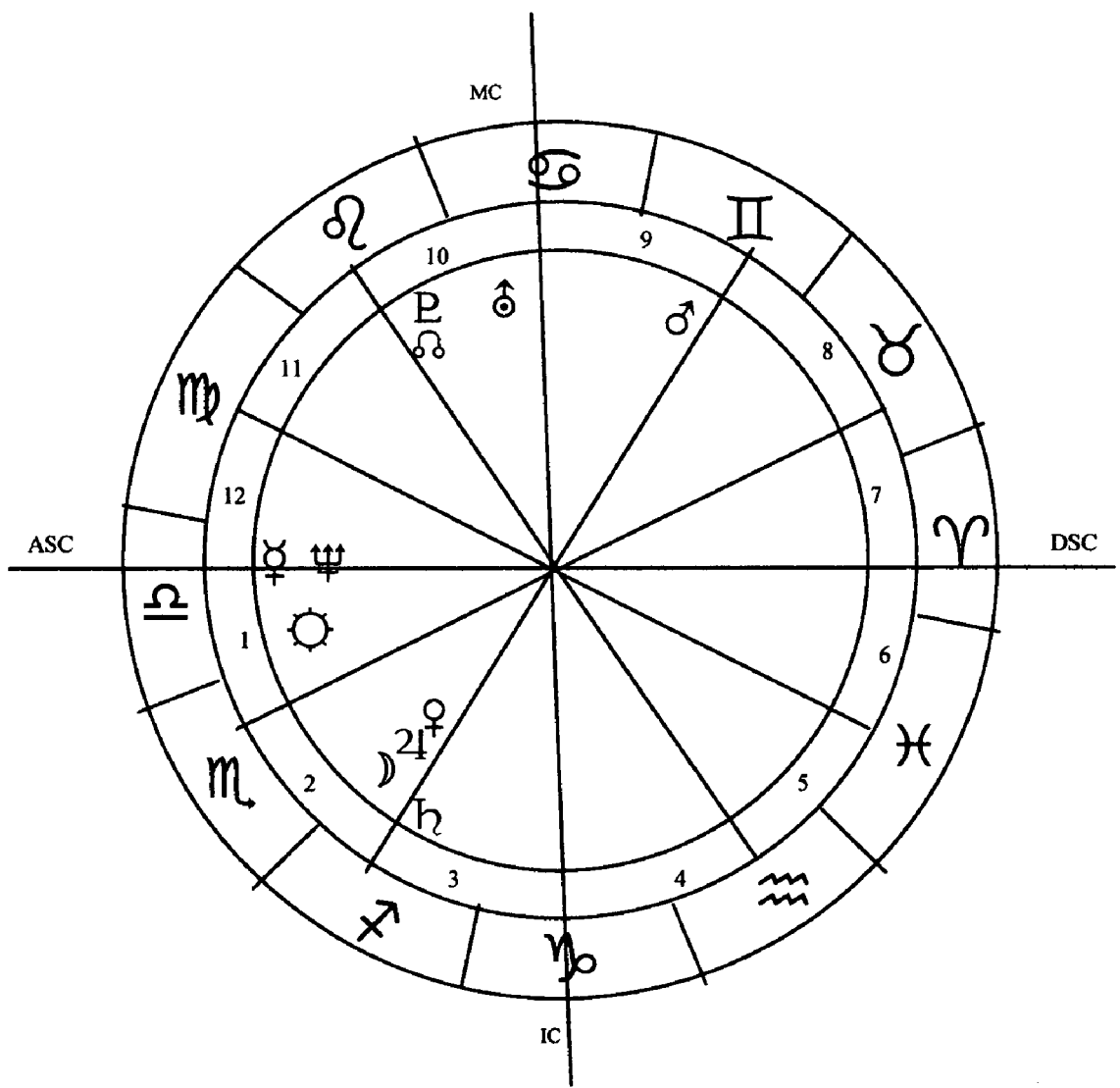
FIG. 6 illustrates a Western-Style, Placidus Houses, Natal Astrological Chart for same example input subject, per invention.
Figure 6A:
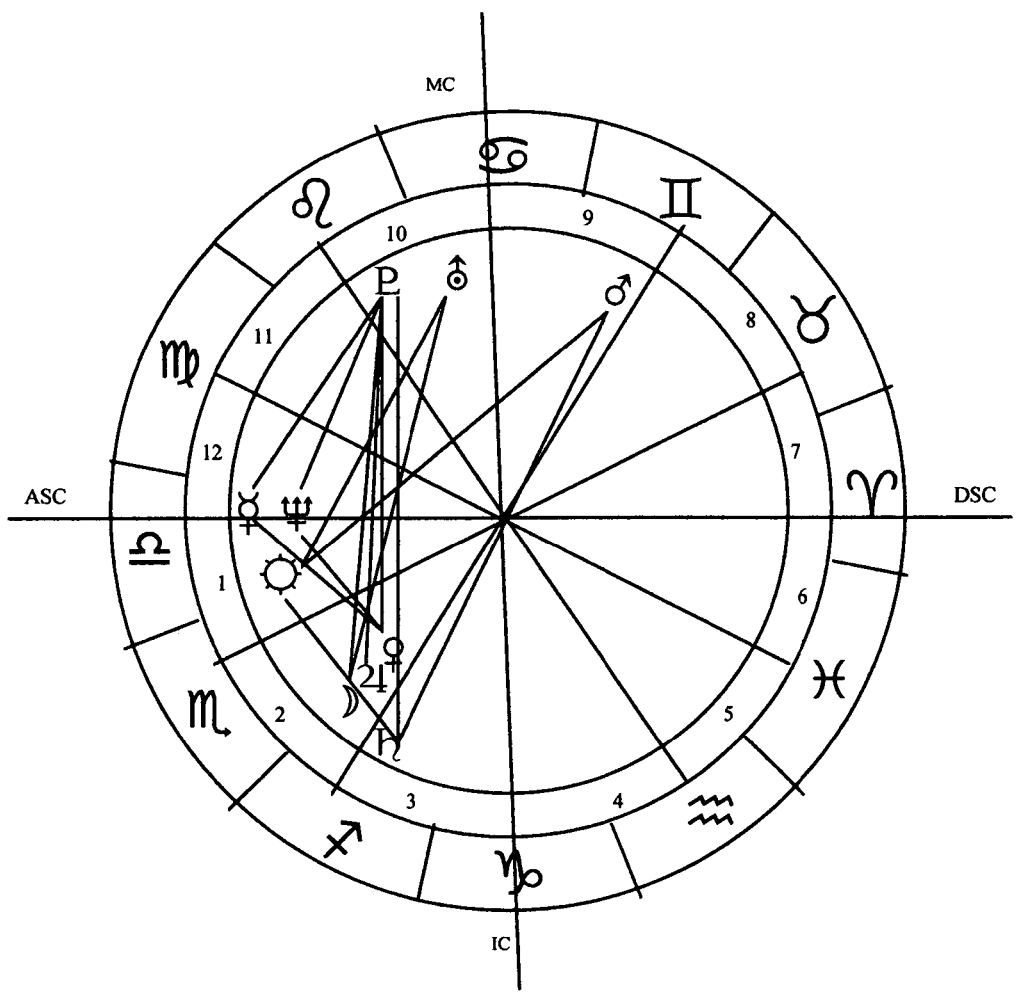

The Natal Chart of FIG. 6 is re-presented in FIG. 6A with Lines of Aspectation drawn and with the subject's Grid of Aspects.

FIGS. 6B, 6C and 6D show the invention's Astrology Chart artifact types of Natal, Progressed and Transits, respectively. In FIGS. 6B and 6C, the invention's Charts are displayed above Tables of Planetary Positions, Angular Regents and Astrological Disposition, contrasted by the Western prior art artifacts for the same subject parameters. In FIG. 6D, the Transit data, is placed on the subject chart, by Overlay technique. FIG. 6D contrasts Western art transit artifacts. FIG. 6E applies the invention's methods to Synastry, Composite and Overlay Charts. FIG. 6F, contains the invention's Eastern-Style artifacts, the same Natal data as FIG. 6, including, Vedic-Style artifacts of Indian design—the List of Grahas ("Planets") and North and South Indian Charts, contrasted with the prior art Eastern methods of the Ayanamsa. FIG. 6G shows Chinese Lunar Astrology of same Natal subject of the various FIG. 6.

Figure 7:
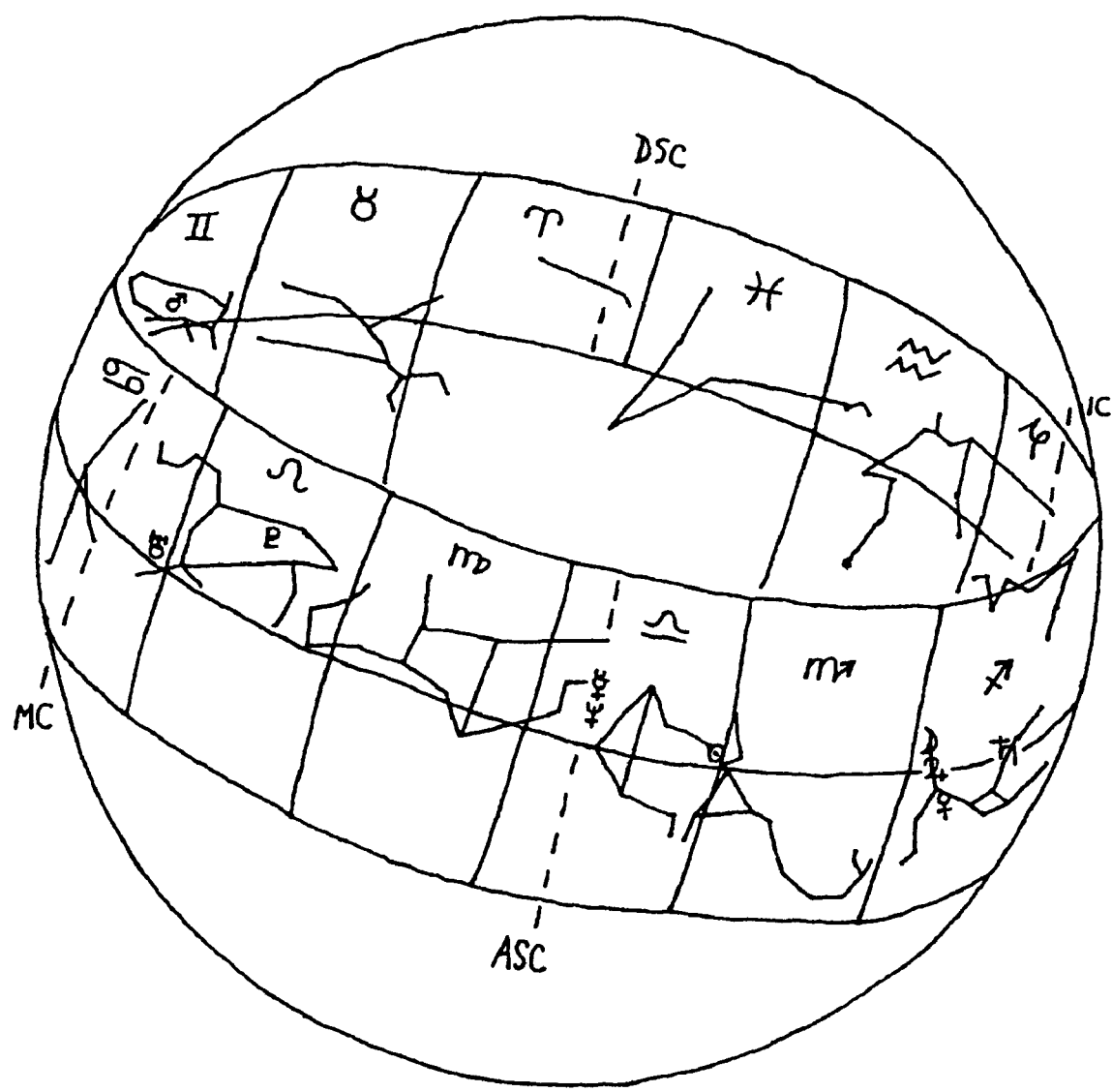

FIG. 7 is a three-dimensional Reproduction showing the Example subject's Natal Astrological Sphere from Comprehensive Sky Vantage, with Components mapped within the zodiac Constellations.

Figure 8:
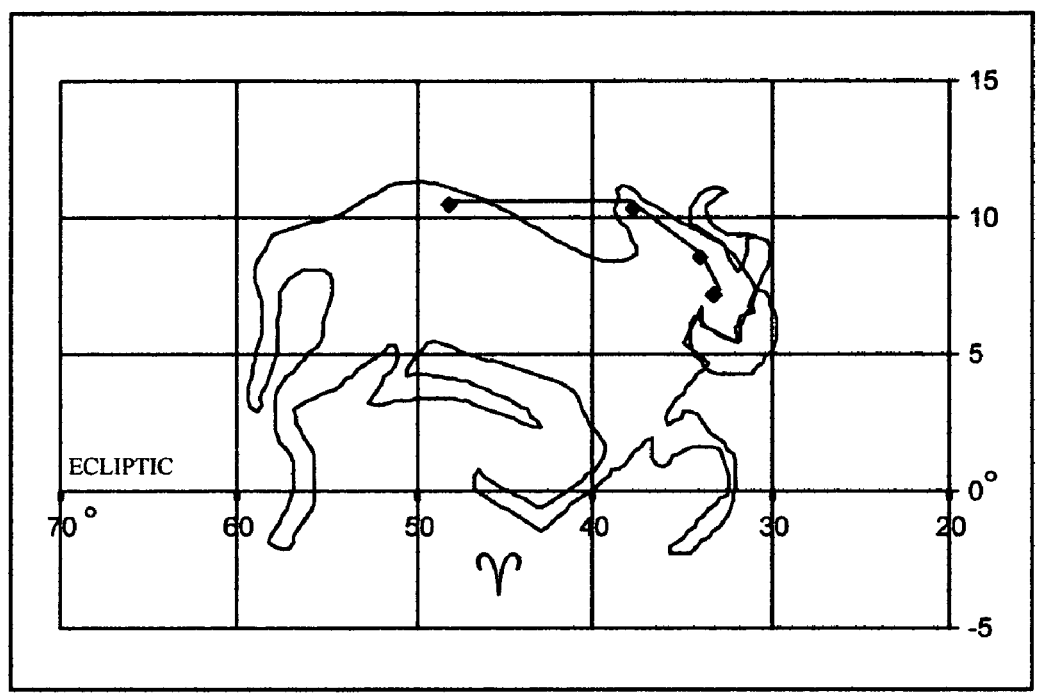

FIG. 8 is a zodiac Sign Mapping, with Constellation Stars mapped to ecliptic coordinates of longitude and latitude, zodiac Sign figuratively illustrated on its location in space and star.

Figure 9:
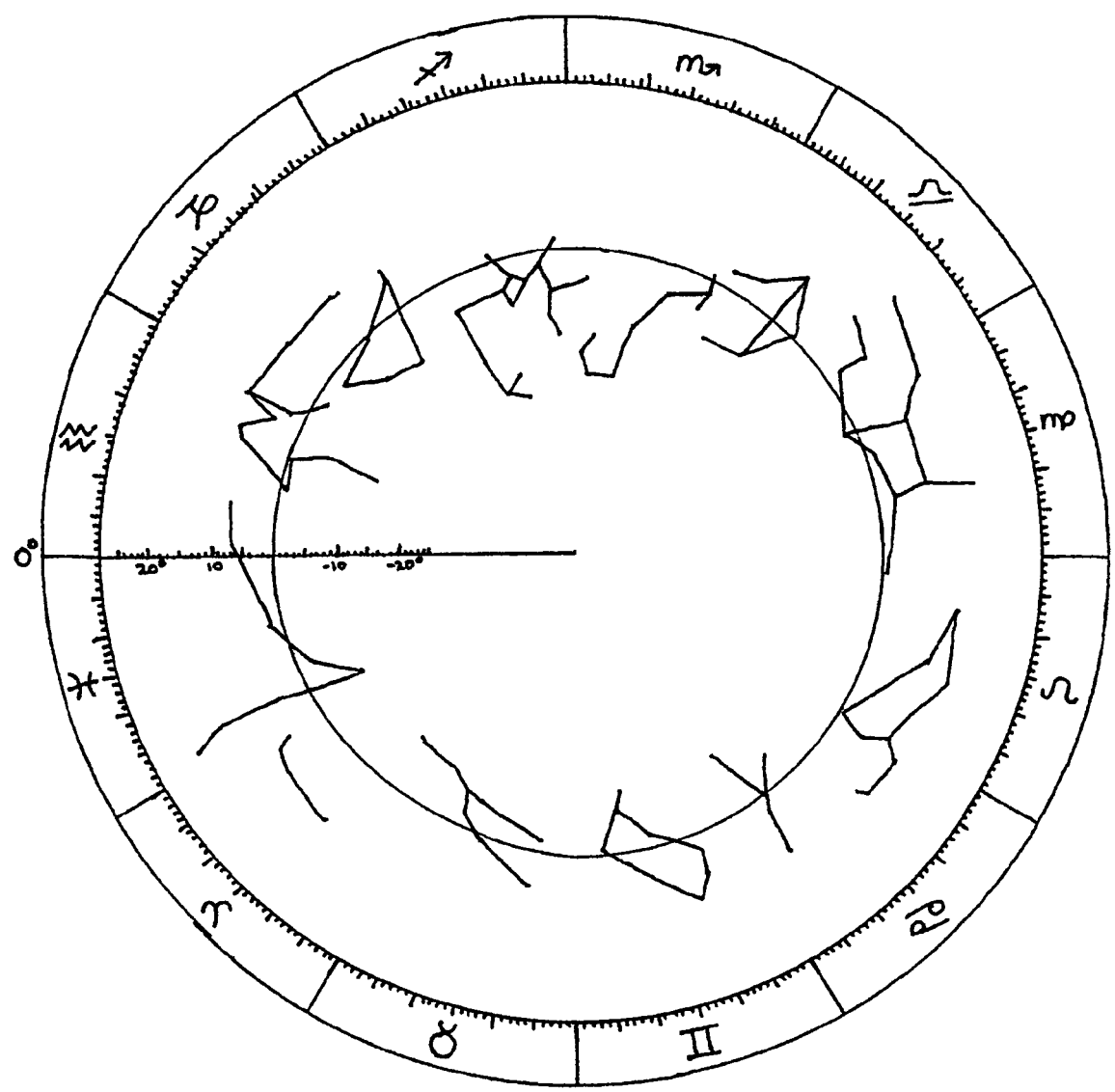
Figure 9C:
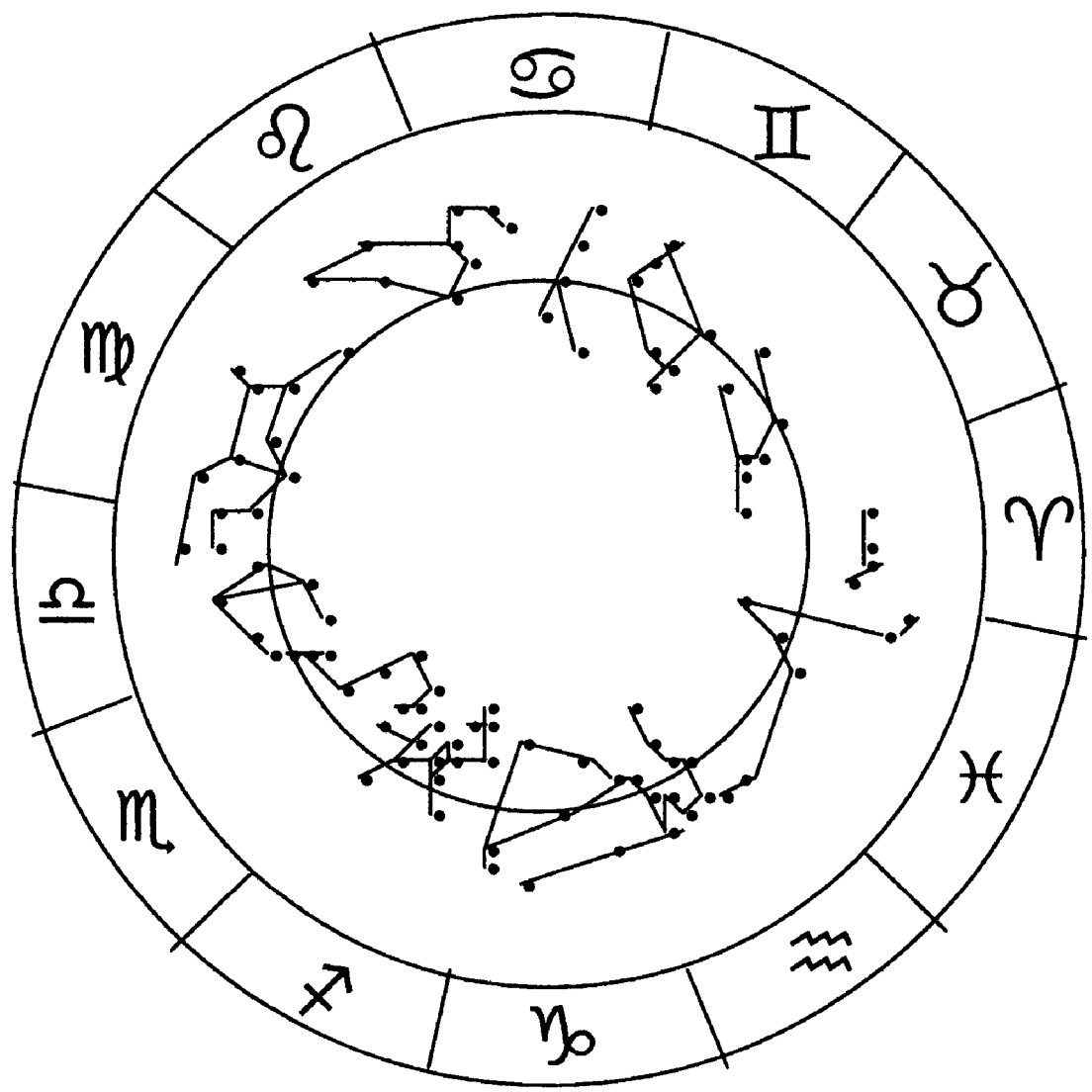

FIG. 9 is an Astrological Mapping Device, consisting of a circular Base Sheet, with zodiac Signs and Constellations mapped, in an Ecliptic Coordinate System, each Sign as 30 of 360 degrees. FIG. 9c is a Computer Rendered Device of FIG. 9.

Figure 9A:
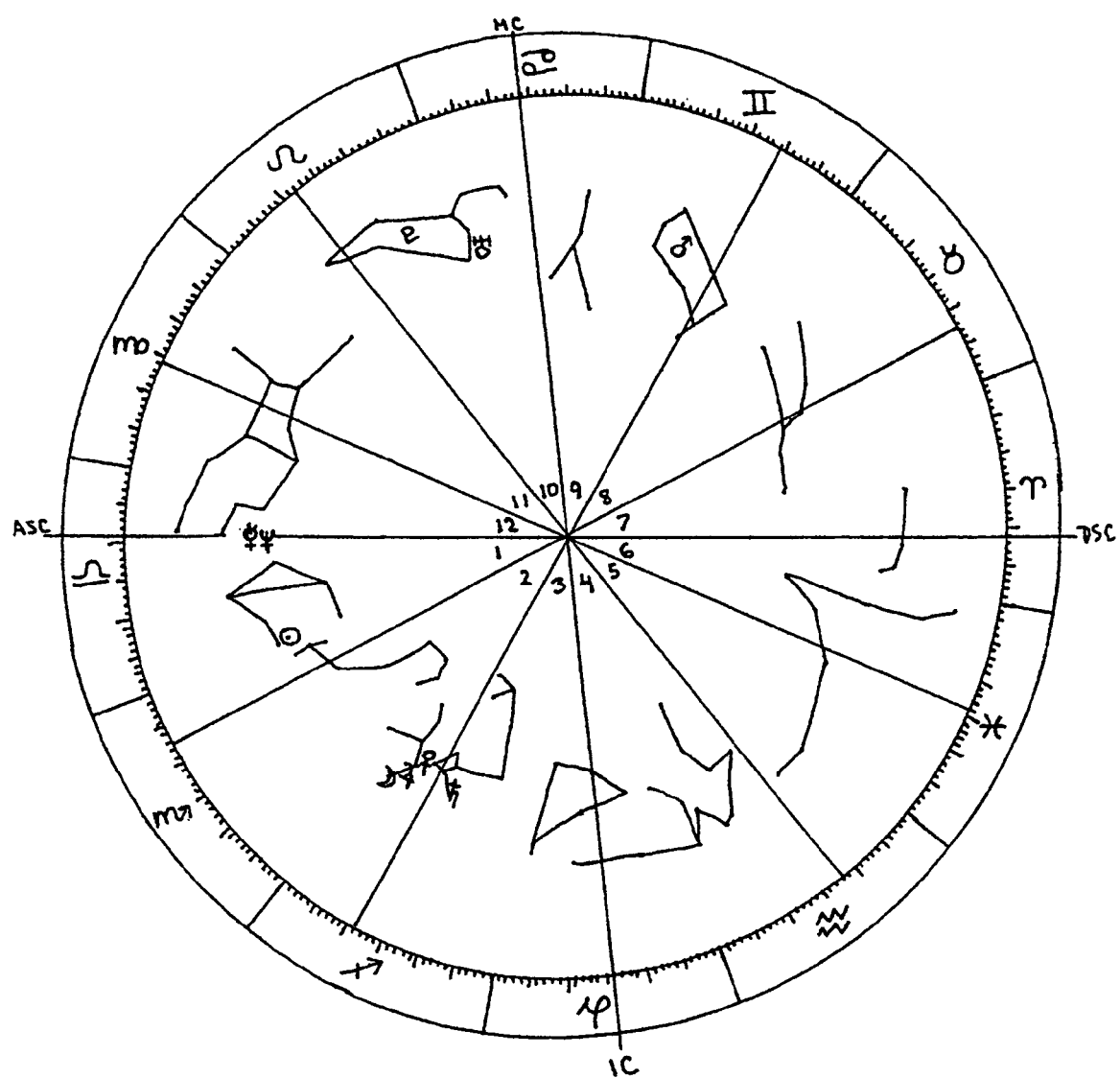
Figure 9A:
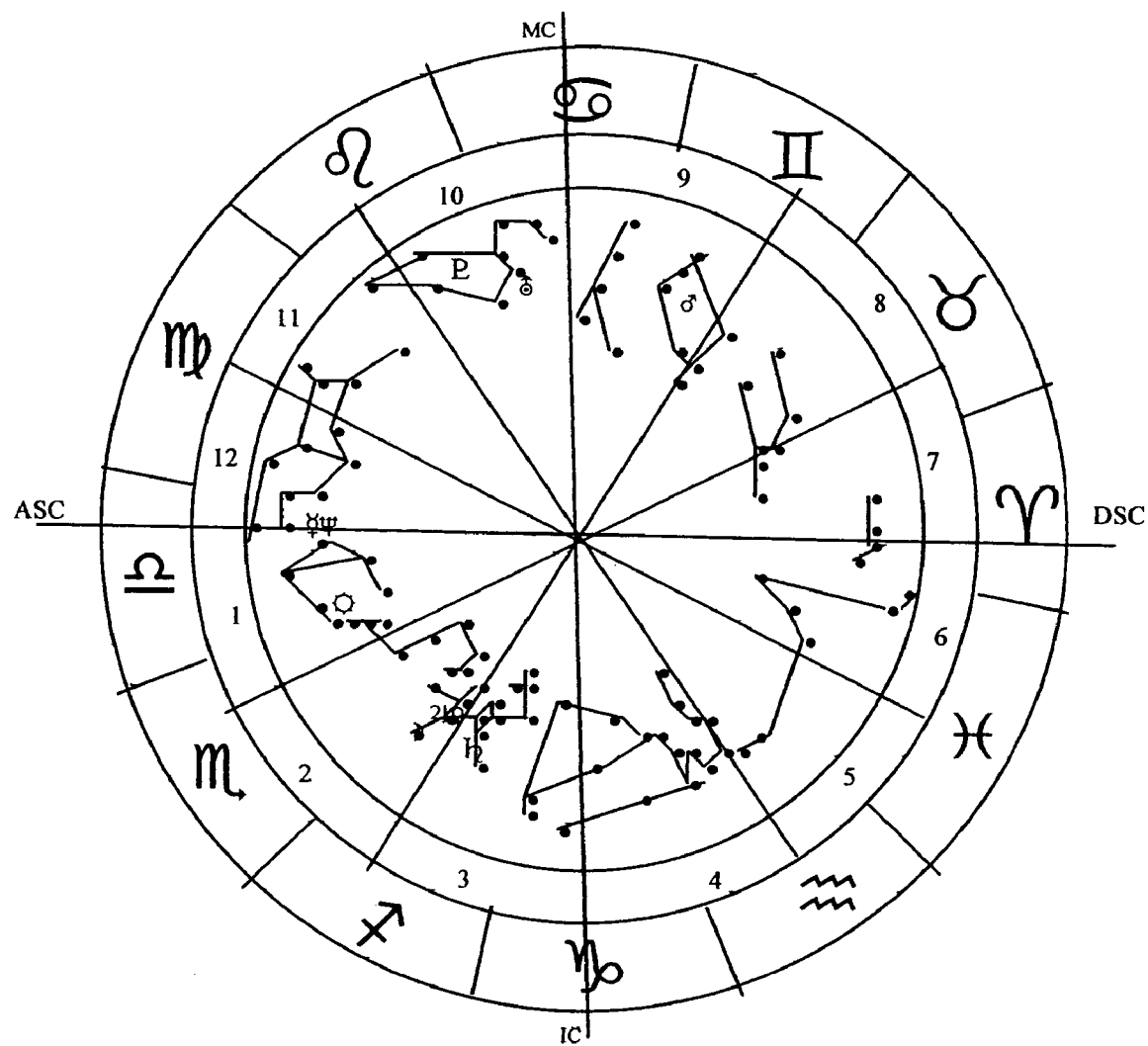

FIG. 9A is a Natal Astrological Chart utilizing the Device of FIG. 9, Example subject identical to FIGS. 5, 6 and 7, the Component Position Data mapped zodiac Constellations and Signs. FIG. 9Ac is a Computer Rendered Chart utilizing the Device of FIG. 9c.

Figure 9B:
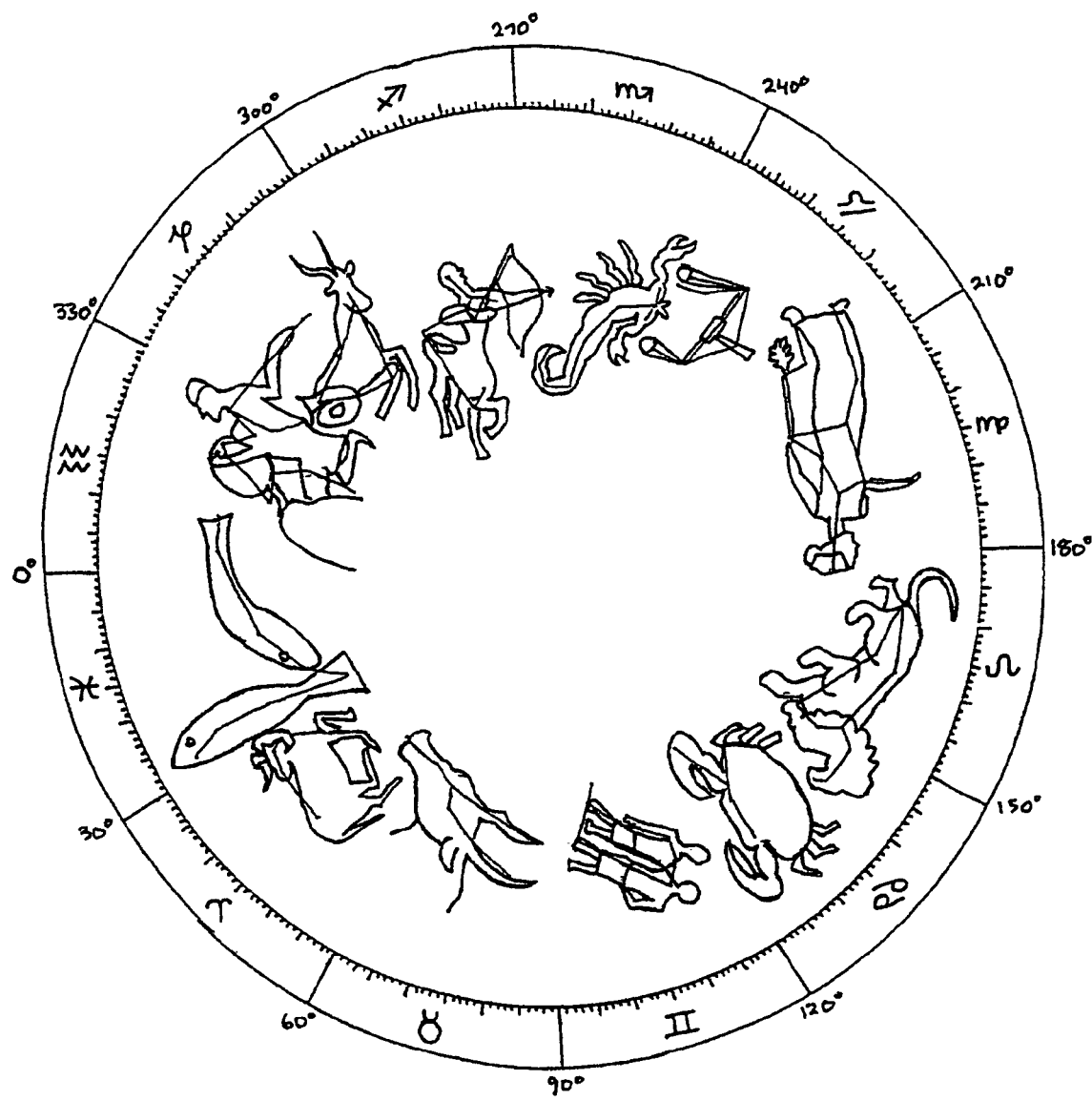
Figure 9B:
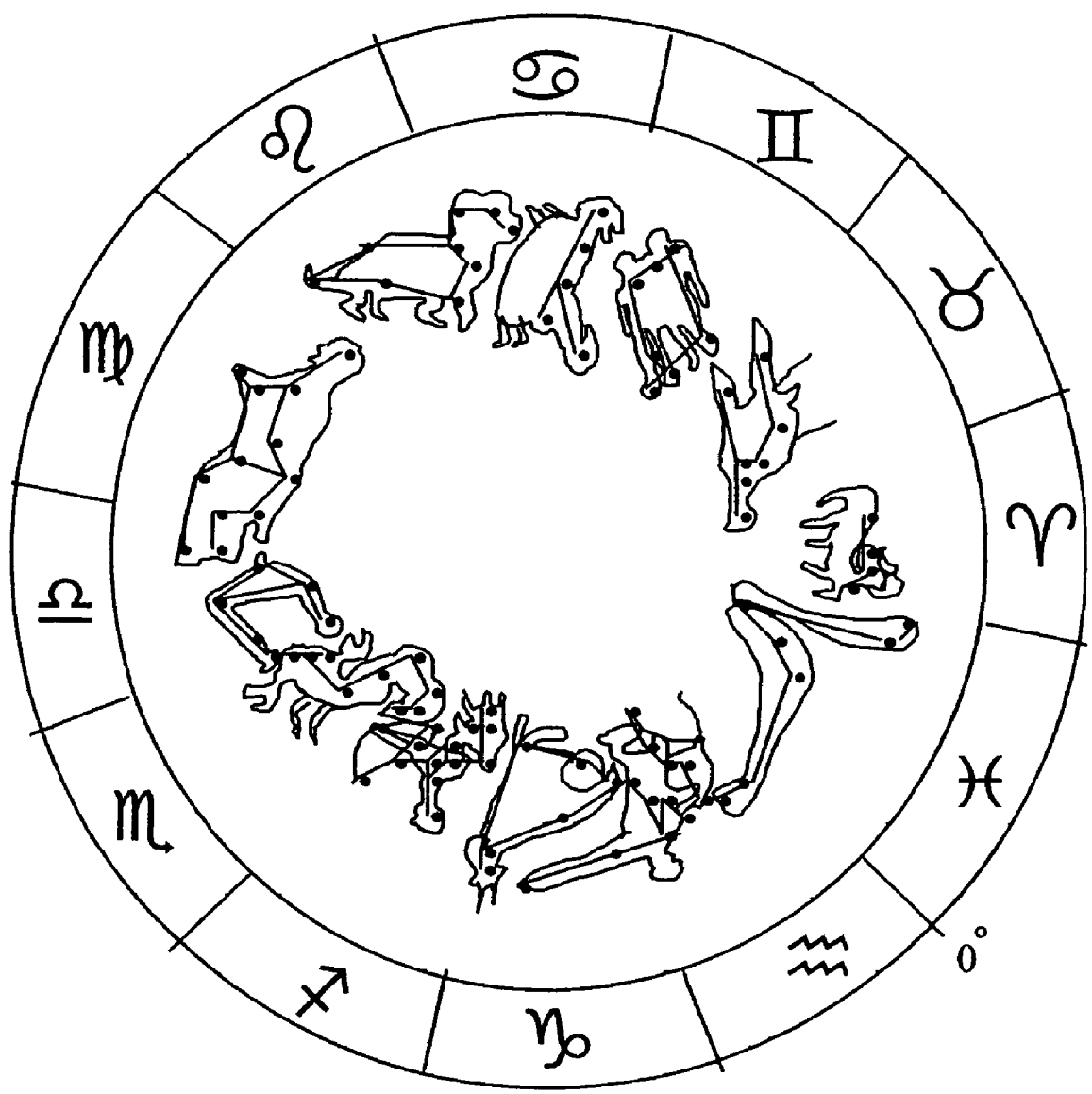
Figure 9C:
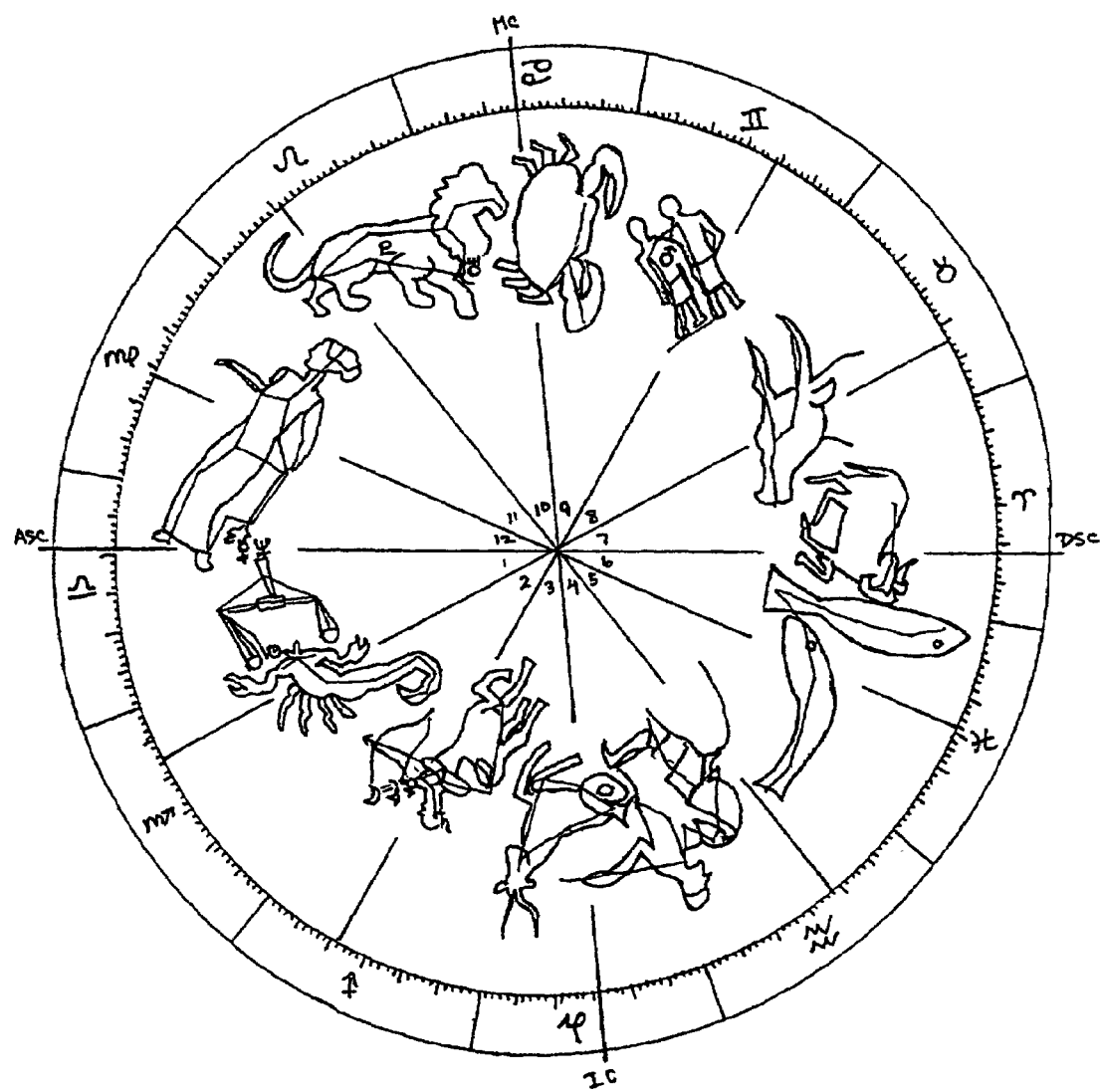
Figure 9C:
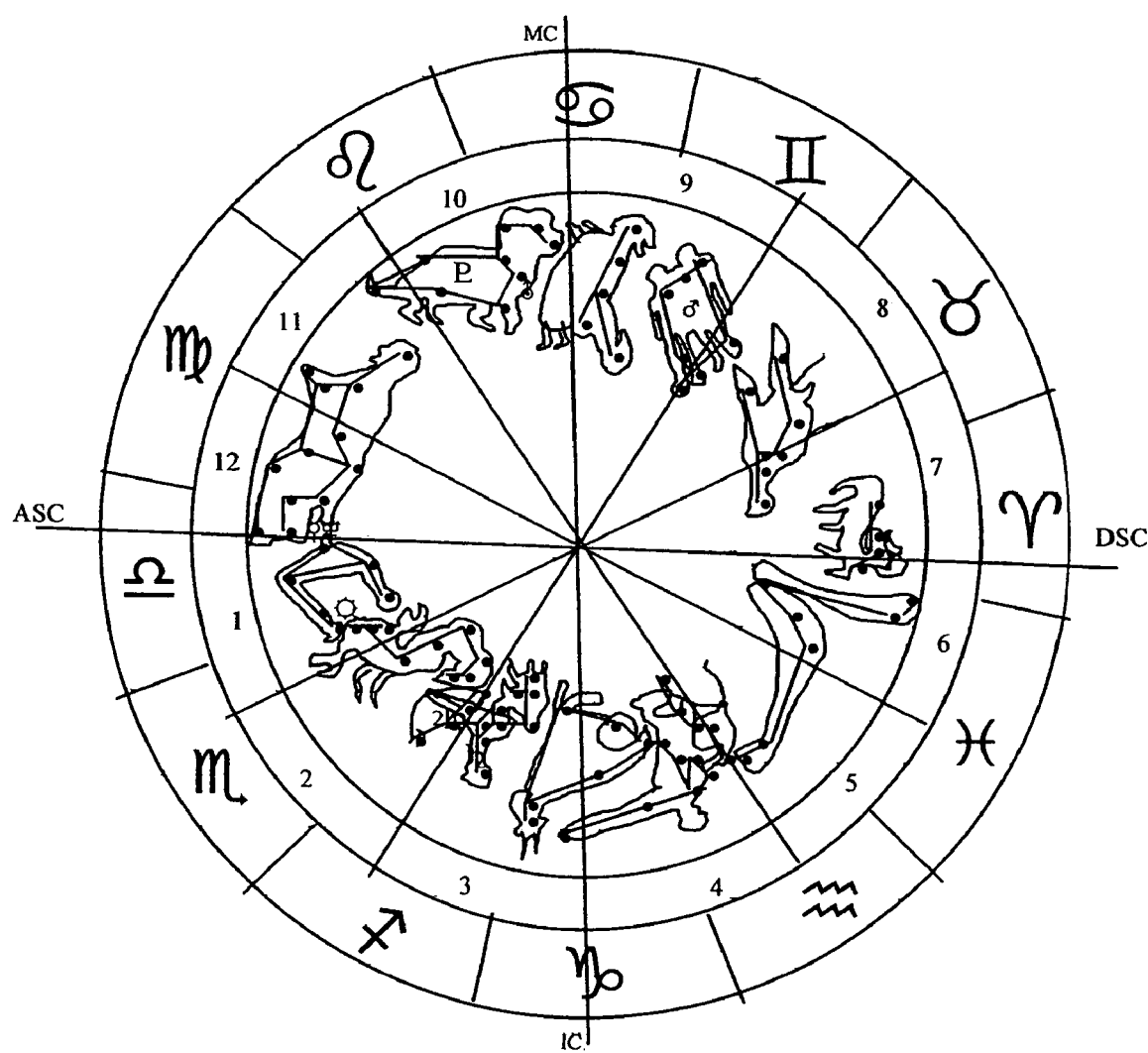
Figure 9D:
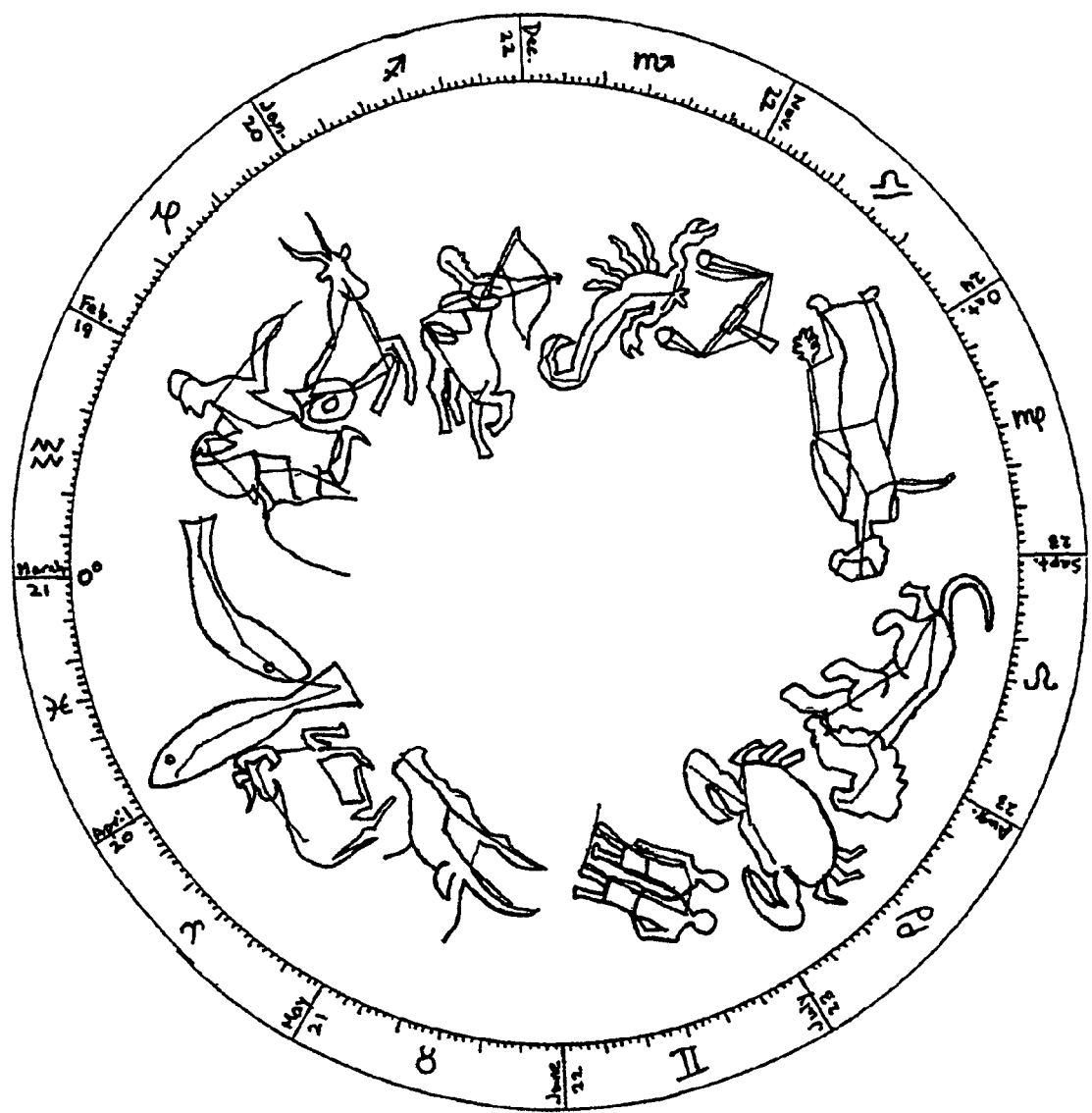
Figure 9E:
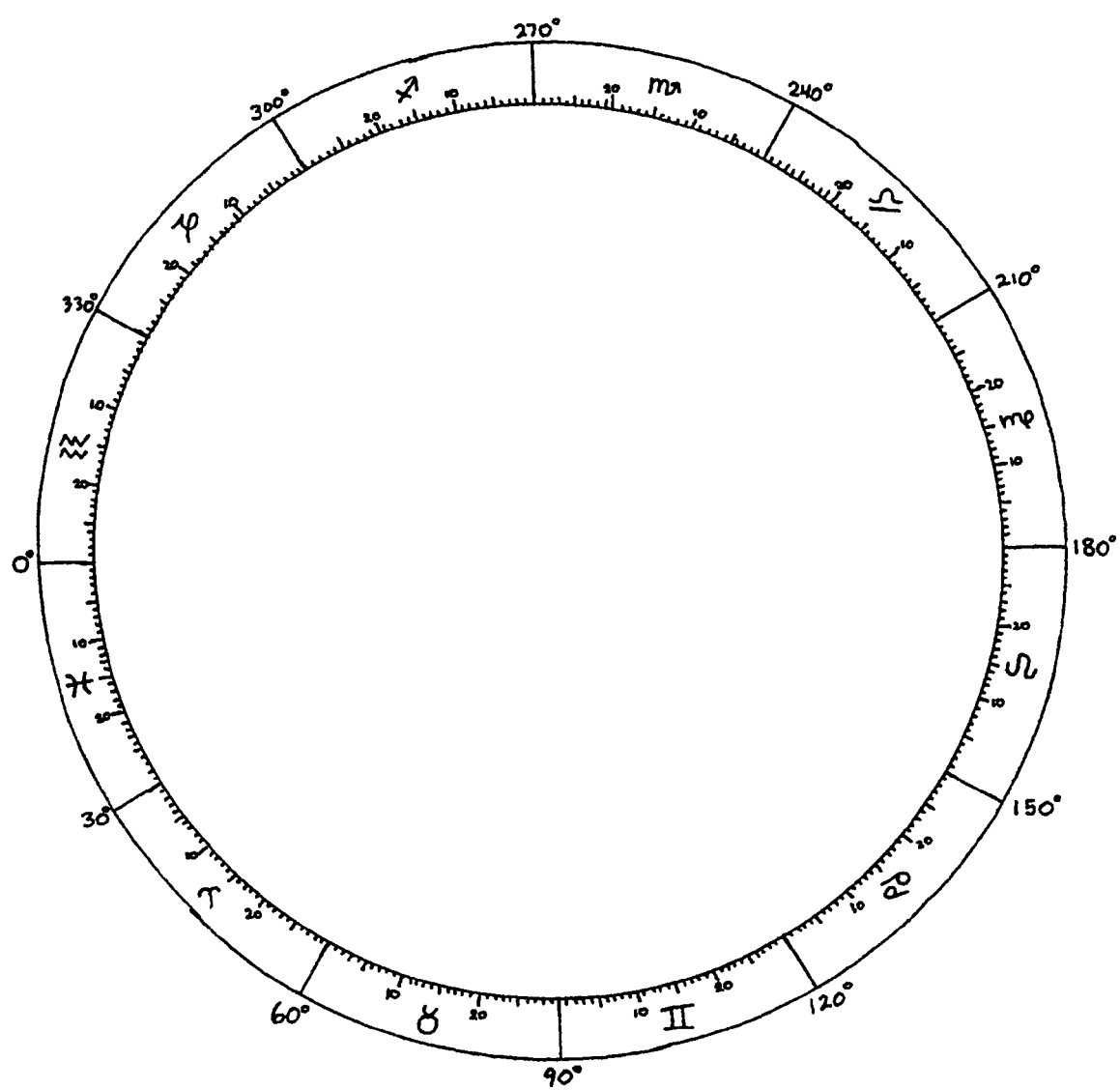

FIG. 9B is the Astrological Mapping Device with Zodiac Signs, Constellations and Symbols; FIG. 9Bc is a Computer Rendered Device of FIG. 9B; FIG. 9C is the same Example's Chart utilizing the Device of FIG. 9B; FIG. 9Cc is a Computer Rendered Chart utilizing the Device of FIG. 9Bc. FIG. 9CI shows subject's 30/360 grid-, star- and symbol-based positions. FIG. 9D is the Astrological Mapping Device with the Calendar Dates of Sun Signs. FIG. 9E is the Astrological Mapping Device with Zodiac Signs only, each of 30 degrees.

Figure 9F:
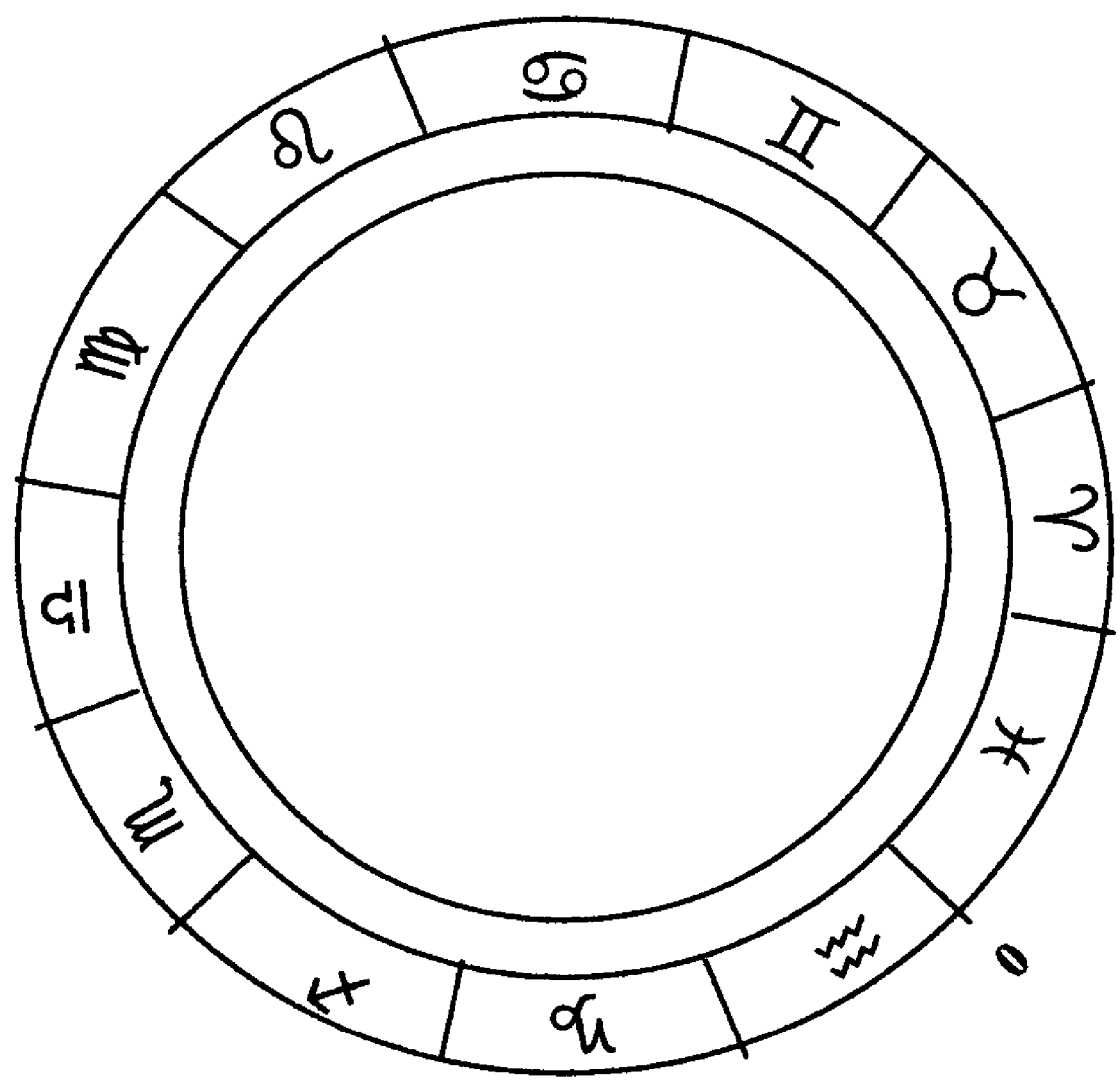
Figure 9G:
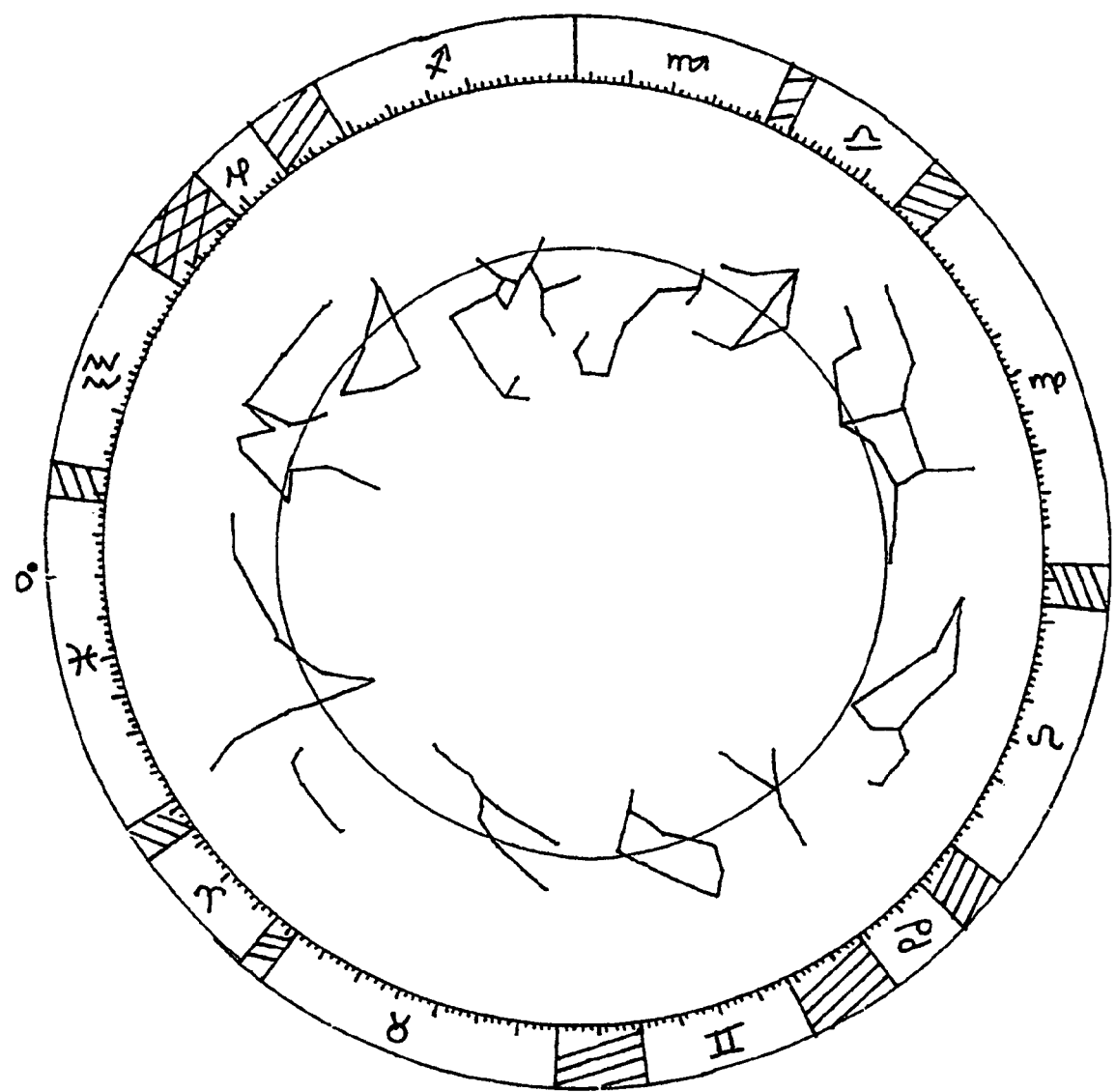
Figure 9G:
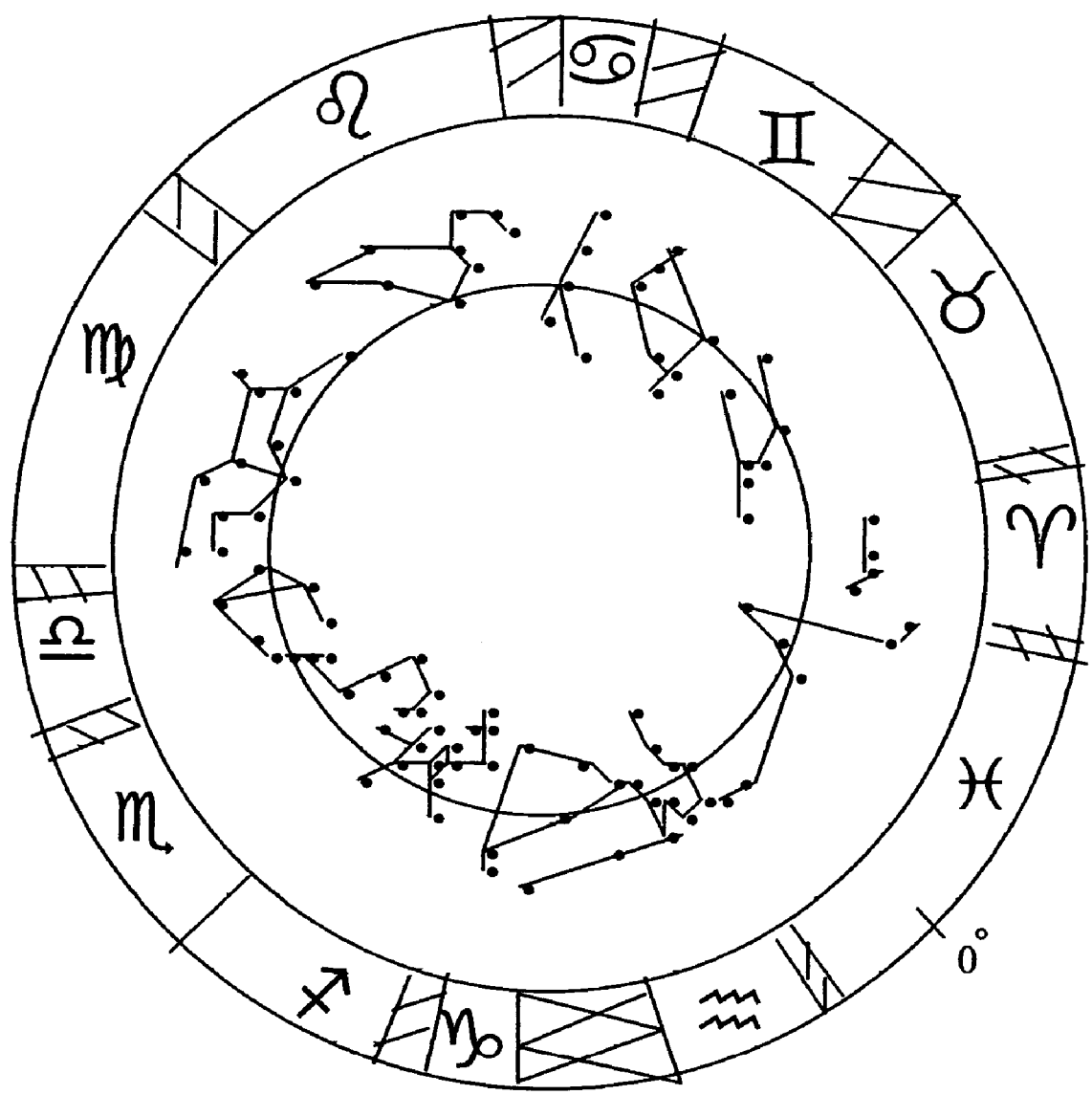
Figure 9H:
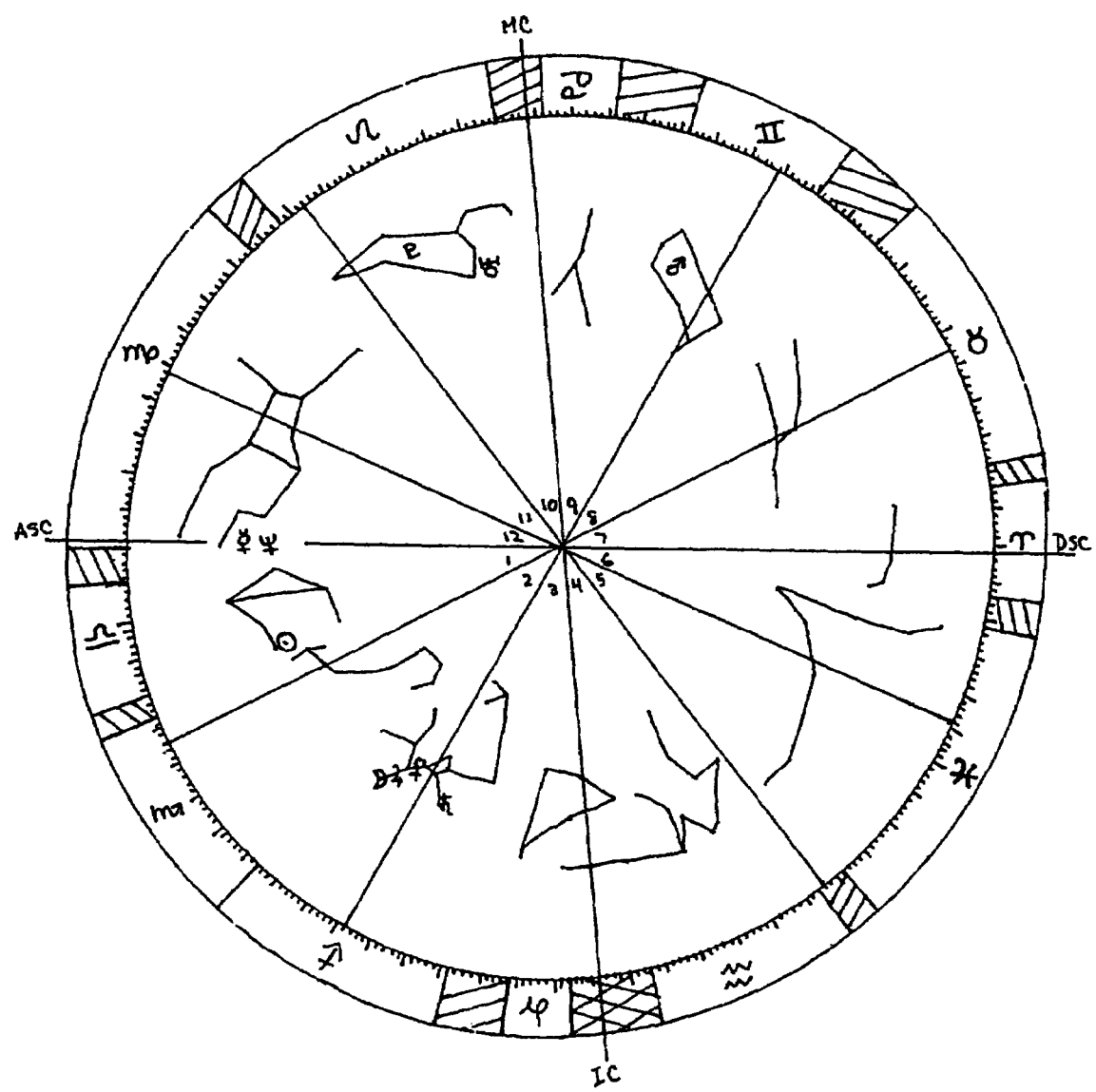
Figure 9H:
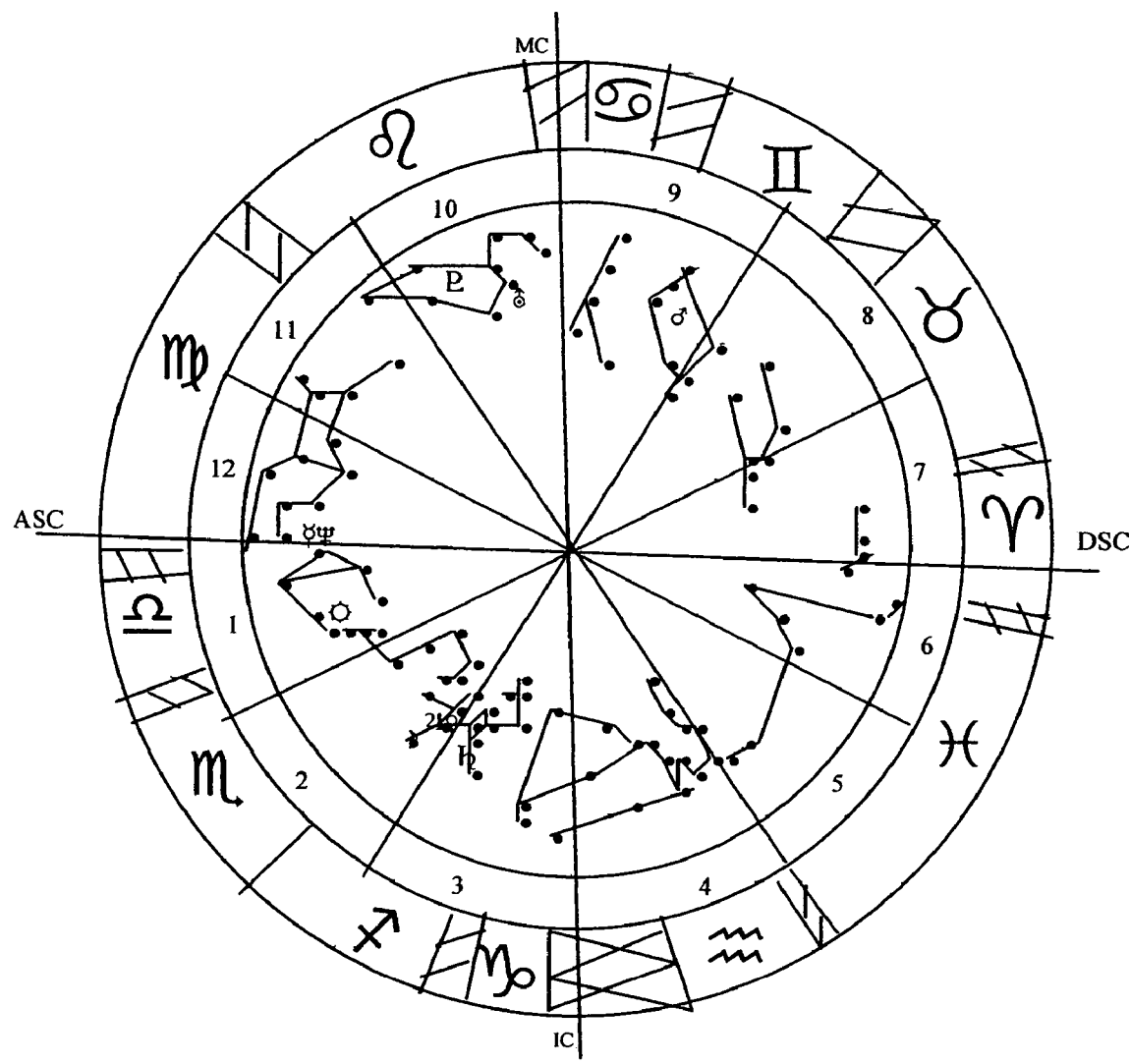

FIG. 9F re-presents the invention's 30/360 Grid-Based Astrological Mapping Device, wherein the Twelve Zodiac Constellations are each assigned 30 of 360 degrees. The FIG. 9G presents the astrological mapping device based on the Constellation Positions defined in the bottom chart of FIG. 1. The device of FIG. 9G contains the actual layout of the physical stars in the constellations. FIG. 9Gc is a Computer Rendered Device of FIG. 9G. The FIG. 9H contains an Example Chart based on the zodiac component positions determined using the zodiac mapping of FIG. 1, bottom, for same subject, and the Device of FIG. 9G. FIG. 9Hc is a Computer Rendered Chart utilizing the Device of FIG. 9Gc. The FIG. 9Ic is the Computer Rendered Device of FIG. 9c, but Western 30/360 signs.

Figure 10A:
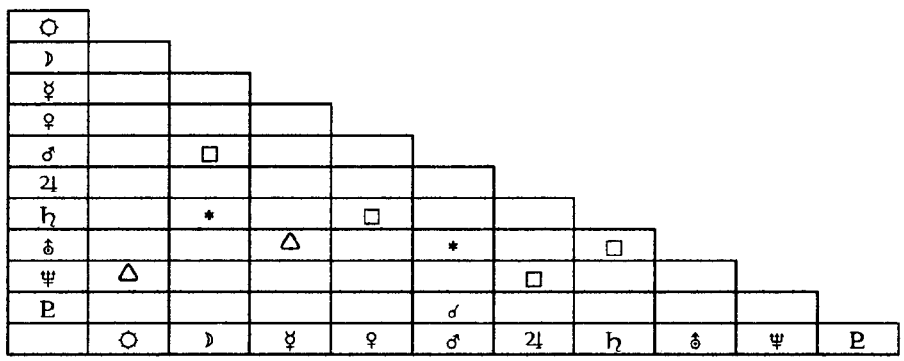
Figure 10C:
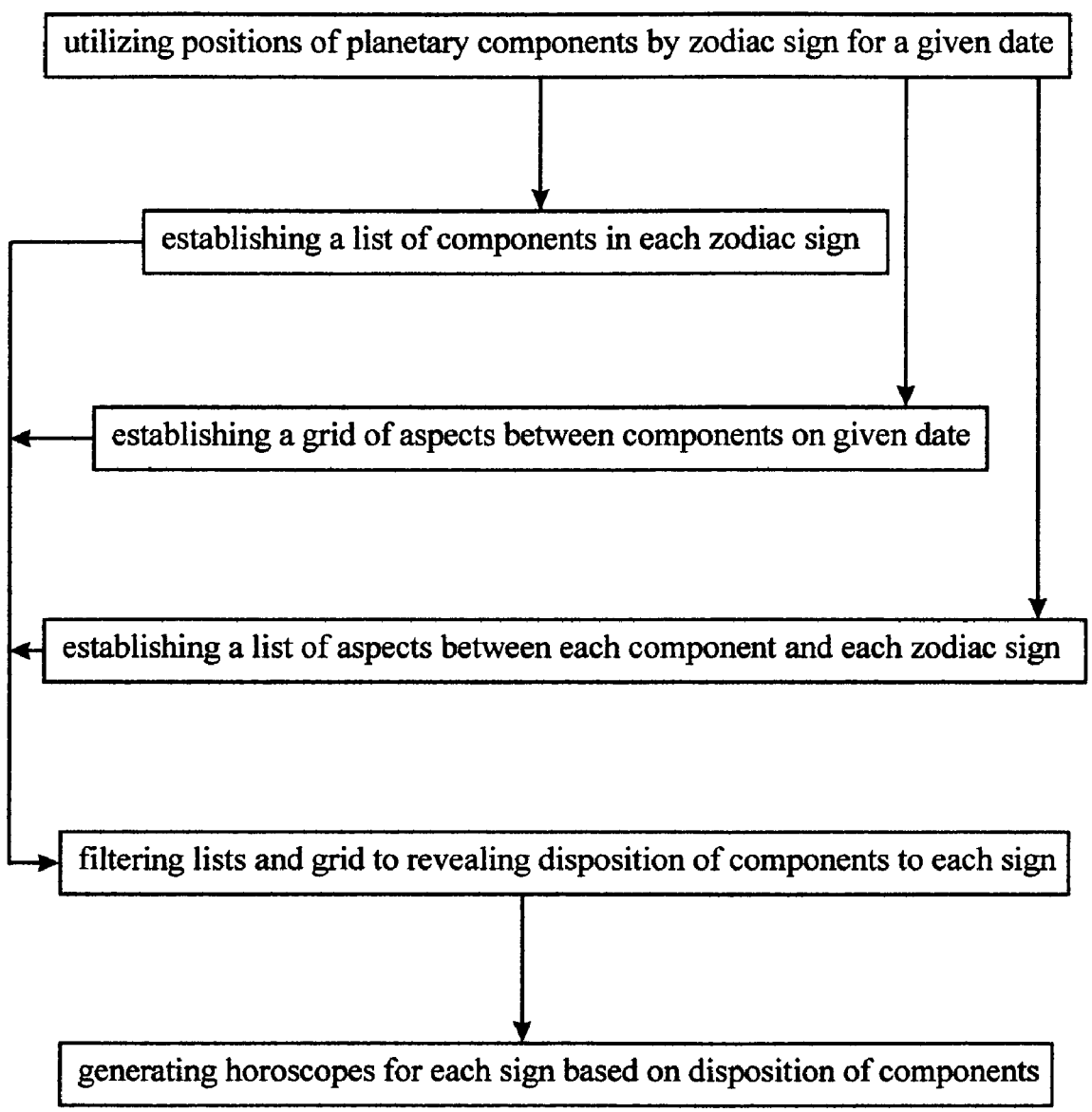

FIG. 10, Horoscopes, based on invention's Dates and Data, these being in the Style and Form of Syndicated Media Features. FIG. 10A contains: top, an ephemeris listing the planetary component positions for the day, Sep. 24, 1999; middle, a grid of the aspects between the planets for example day, and bottom, a table listing, for each zodiac sign, any planets in that sign that day and any aspects made between planets (in their particular signs) and that particular zodiac sign. FIG. 10B contains Celebrity Profiles by Invention, brief astrological sketches of eight celebrities. FIG. 10C diagrams the Process Generating Horoscopes for Zodiac Sun Signs.

Figure 11:
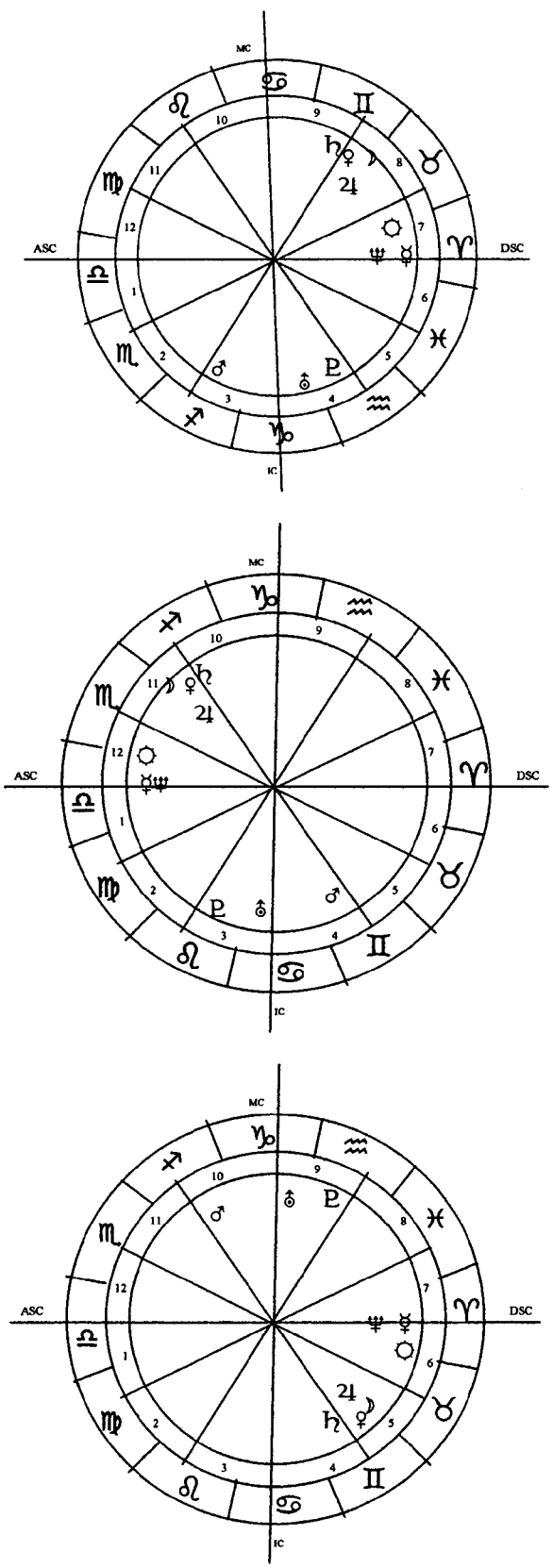
Figure 11B:
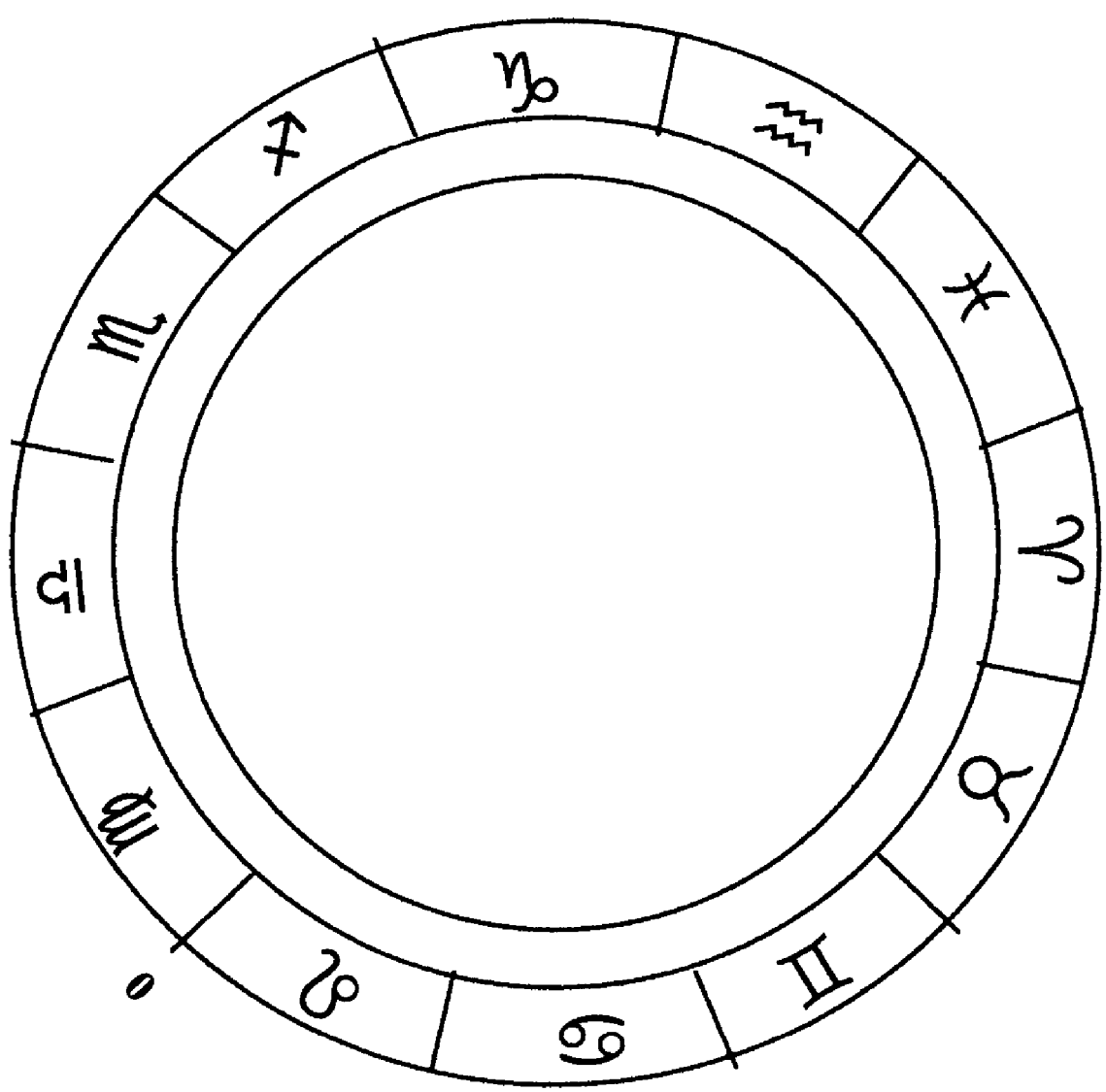
Figure 11C:
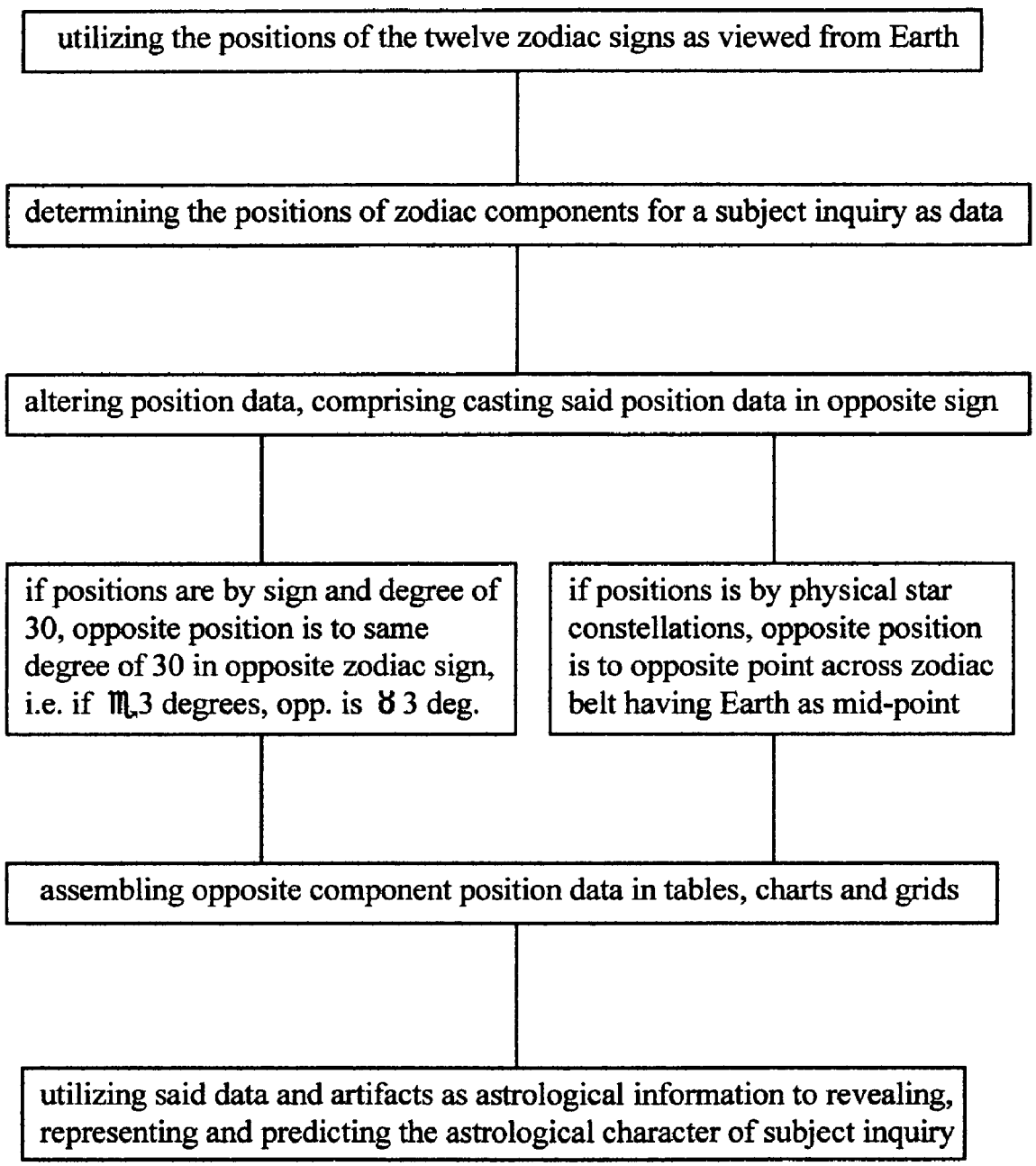

FIG. 11 shows three Astrological System Perspective Natal Charts, showing alternative vantages of the subject's position along the zodiac from the perspective of each planetary component. FIG. 11A presents the zodiac component Data and Astrological Disposition for the example subject of FIG. 11, for each of its three Astrological System Perspectives. FIG. 11B presents the Astrological Mapping Device of FIG. 9F, but with its perimeter band of zodiac constellation markings proceeding in Reversed, clockwise, order around the band from the vernal equinox origin. FIG. 11C diagrams the Method Deriving and Utilizing Opposite Zodiac Sign Data for a Subject Inquiry.

Figure 12D:
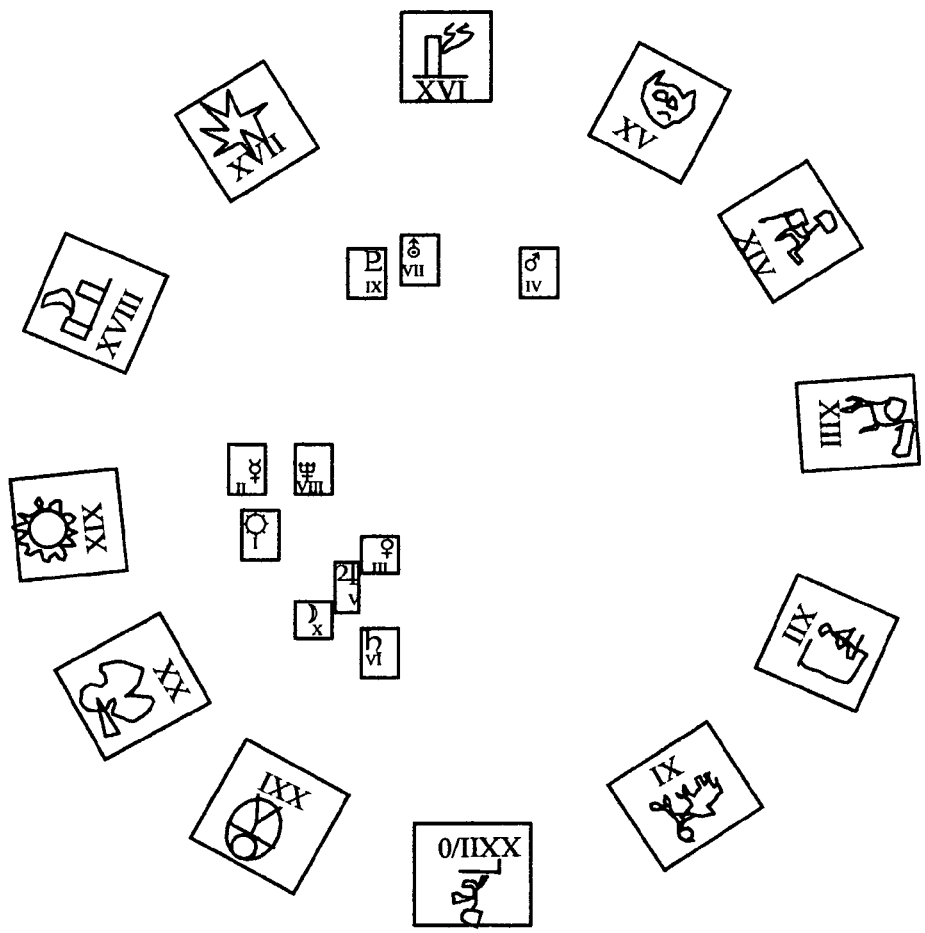

FIG. 12, the invention's System Sets of Correspondences between Astrology and Tarot Major Arcanum, Court Cards, Elements. FIG. 12AI lists the Correspondences of the Zodiac Signs to Major Arcanum XI to XXII dependent upon the "Age" or Sign marking the vernal equinox origin as card XI. FIG. 12AII shows the Arabic number for each Major Arcanum, and a traditional Image and Meaning of each Major Arcanum card. FIG. 12B shows the processed Astrological Tarot Correspondences for subject example, including subject's Astrological Tarot Disposition. FIGS. 12BI and 12 BII show Astrological Tarot Correspondences for subject example, utilizing subject's Western tropical and Eastern sidereal data. FIG. 12C shows, top, an Astrological Tarot Device for mapping a subject Astrological Tarot Chart; bottom, Chart mapped for a subject. The FIG. 12D presents drawing of an Astrological Tarot Chart Spread, top, and Grid of Astrological Tarot Aspects, bottom. FIG. 12EI presents the Correspondences between the four Court Cards and Astrological Natures, and between the four Suits and Elements, and shows Correspondences between the three Court Cards (of some decks) and Astrological Natures. The drawing shows the Composition of two unique Astrological Tarot Decks. FIG. 12EII continues from FIG. 12EI, showing the numbered Suit Cards, from 1 to 10, and the Corresponding Planet and Major Arcanum Card associated with each Number. The FIG. 12EII contains the tarot Court Cards per Deck of 78 and 74 Cards, and contains each court card by suit, with its corresponding Zodiac Sign. FIG. 12EIII further describes Astrological Tarot Decks, providing examples of Major Arcanum to Zodiac Planet and Sign Correspondences. FIG. 12EIII, 78-Card Astrological Tarot Deck and 74-Card Deck. FIG. 12EIV describes Astrological Tarot Decks. FIG. 12F shows a Multi-Purpose Deck having Astrological Tarot and Playing Card Correspondences. FIG. 12G presents Astrological Tarot Data of subject, Composition of the Hand and Composition of the Court for subject. FIG. 12H, top section, contains a Spread Method; the bottom shows Composition of the subject's Spread.

Figure 13:
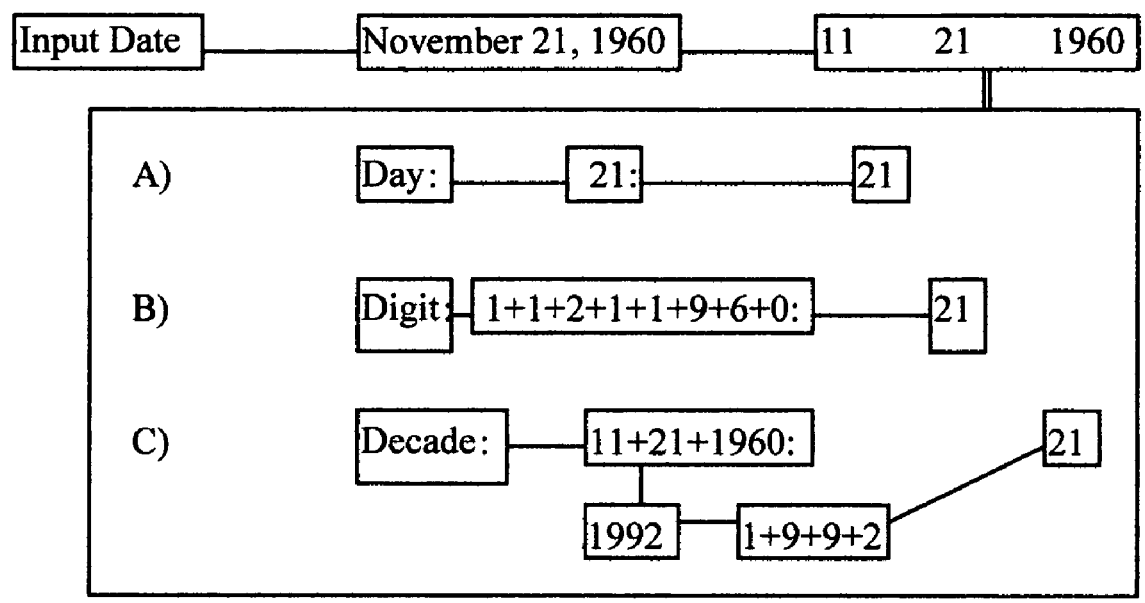

The drawing in FIG. 13 diagrams the invention's System of Correspondences for the Numerological Identifications per date.

Figure 14:
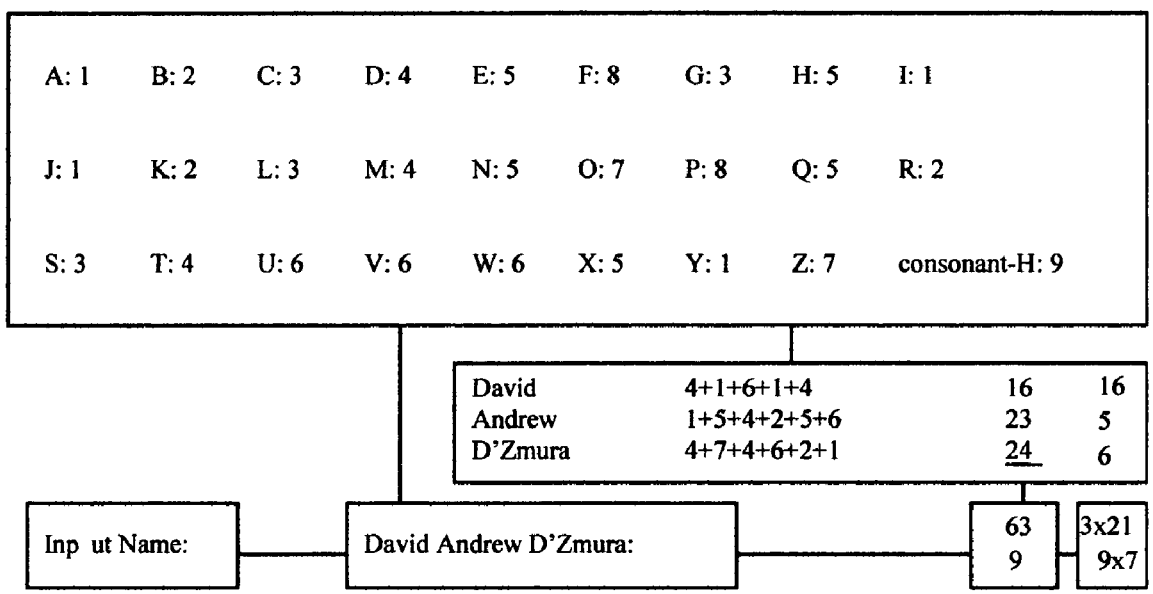

FIG. 14 provides invention's System of Correspondences between the Letters of the Alphabet and the single digit Numbers.

FIG. 15, a Merchant Server System and Member Server System, which perform internet hosting for commercial and public service of the invention's data, artifacts, information and publications. The Systems can be directly linked to Home Page and to each other.

FIGS. 15A, 15B and 15C provide examples of content and services provided by an Astrology, Tarot or Numerology Internet Web Site, or by computer programs and professionals, comprising a subject's Profile, Interpretation and Prediction, per Invention.

Figure 16:
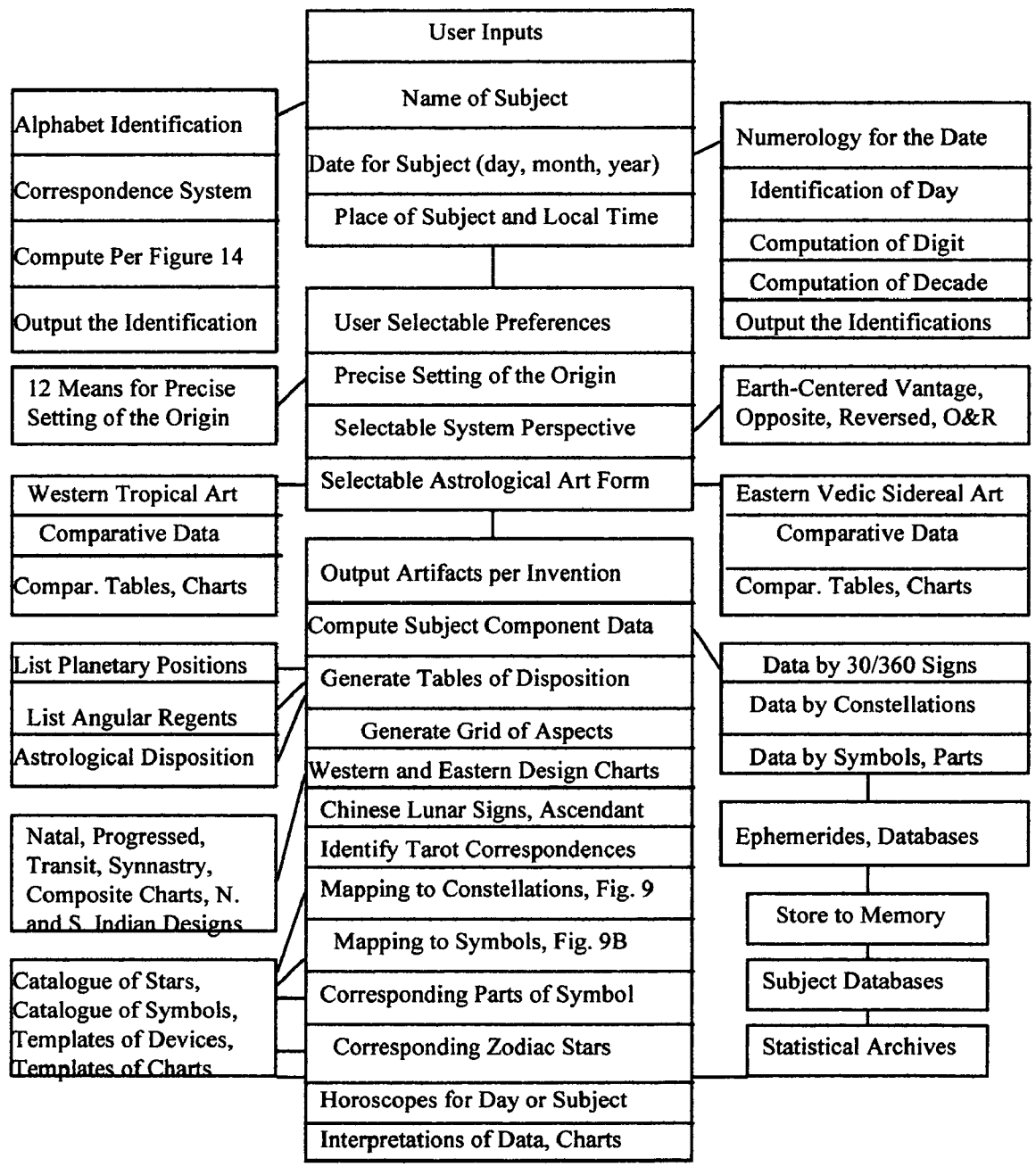

FIG. 16 is a Functional Specification in Diagram for Computer-based Devices or Programs, performing per the Invention.

Figure 17:
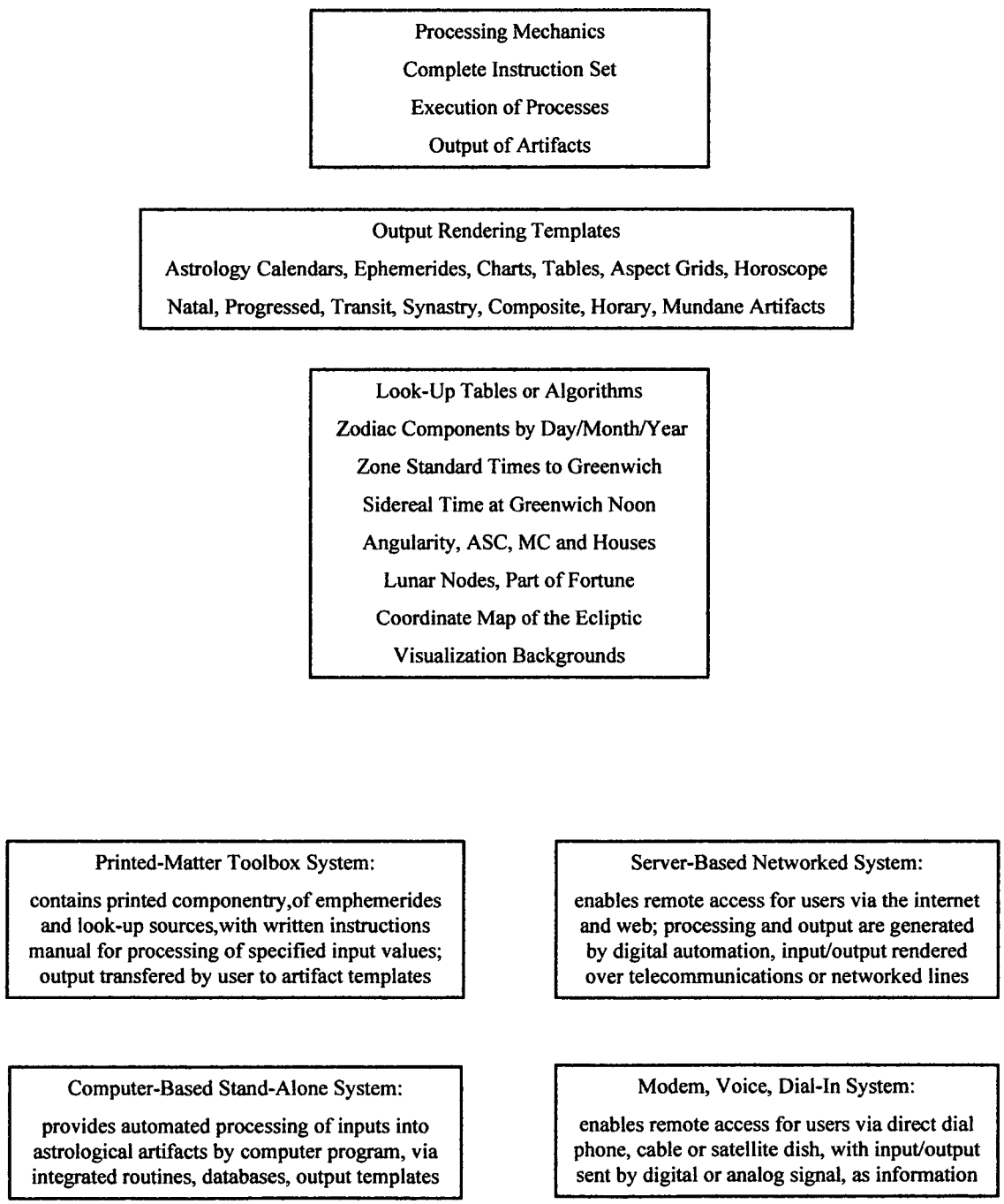

FIG. 17 specifies Integrated Componentry of Astrological Systems, comprising Processing Mechanics, Output Rendering Templates and Look-Up Tables, having Four Formats of Commercial-Product Systems.

FIG. 18 delineates Invention's Dominion in Astrology Practice and Products, its Determination of Component Positions, Processing, Manufacture of Astrological Artifacts.

FIG. 19 further describes Astrological Processing Methods, comprising Inputs, Processes and Outputs, detailing a Synopsis of Steps in processing the input parameters.

FIG. 20 describes the Basic Functionality of Invention's Processing Apparatuses by Variations in Unique Astrological System Perspective, these perspectives further detailed.

FIG. 21 specifies Means for Determining the Precise Marking of the Origin (Vernal Equinox), and contains Means for Precisely Precessing the Origin (Vernal Equinox).

Figure 22A:
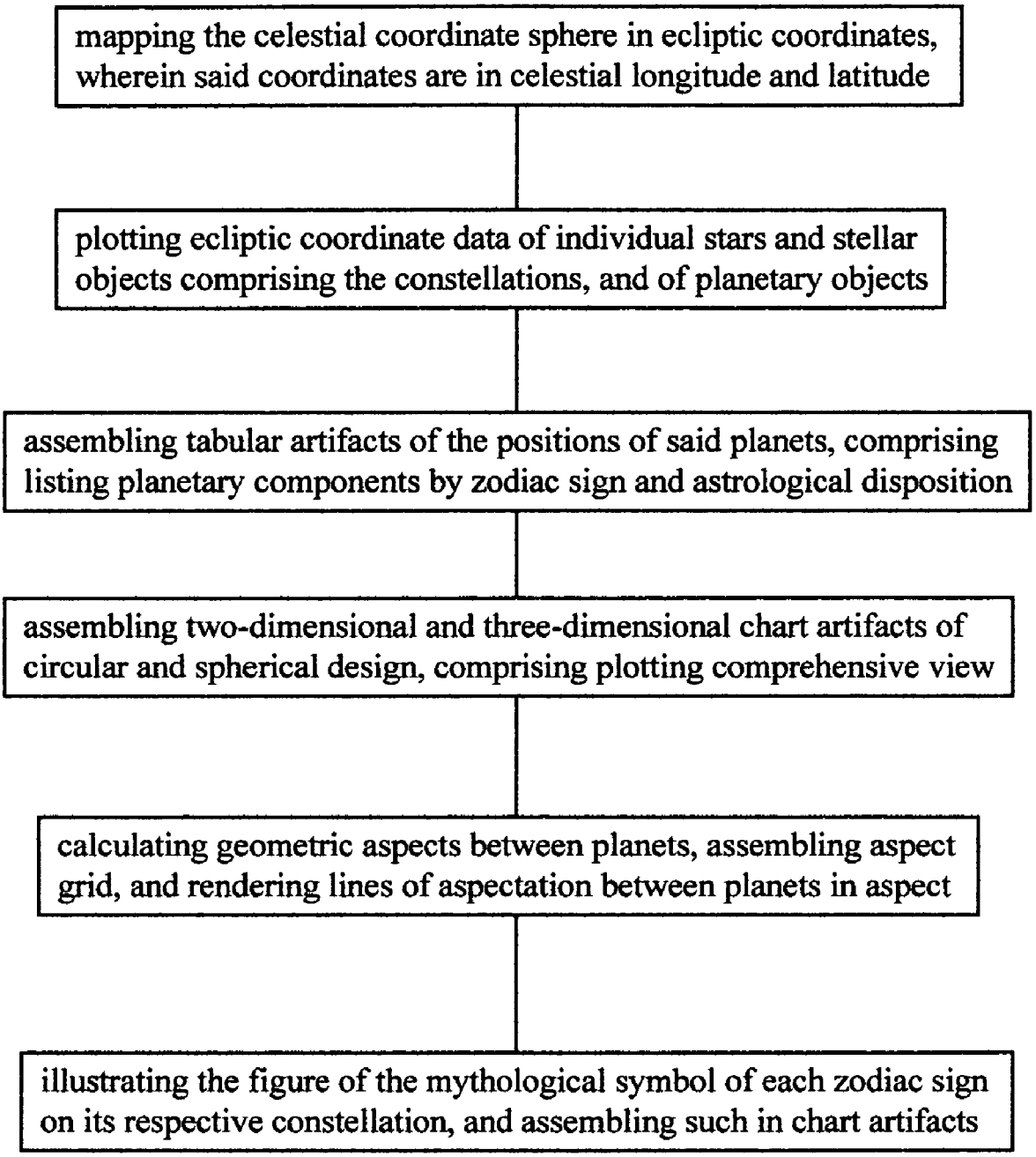

FIG. 22 contains Methods and Means for Determining Astrological Artifacts per invention, including, by Conversion and Correction of prior art data, apparatuses, systems. FIG. 22A diagrams the Method Improving Planetarium Programs of Astronomy for Astrological Purposes.

DESCRIPTION OF THE INVENTION

The present invention relates to methods, processes, systems and apparatuses for determining the signs under which a person is born, and for pluralities of subjects, by determining the zodiac positions for Sun signs and planetary and axial components within the constellations, as of a selected date and as annual sets of dates throughout time, as novel zodiac component data; processing the innovative zodiac component data into astrologers' artifacts; and utilizing such unique data and artifacts to predict, reveal, comment, interpret and entertain the astrological character of the subject(s), as based on the data of zodiac signs and components.

The invention's locating methods and celestial mapping systems determine the positions of the twelve zodiac signs, and the positions of the zodiac components based thereon, respective the zodiac constellations. The Aries, Taurus, Gemini, Cancer, Leo, Virgo, Libra, Scorpio, Sagittarius, Capricorn, Aquarius and Pisces zodiac signs are determined with regard to their respectively named Aries, Taurus, Gemini, Cancer, Leo, Virgo, Libra, Scorpio, Sagittarius, Capricorn, Aquarius and Pisces zodiac constellations.

Each zodiac sign with constellation is provided a uniform 30 degree arc of a 360° coordinate sphere, in any vernal equinox-based coordinate mapping system, such as ecliptic, equatorial or rectangular, with the conversion between these systems provided in the Technical Means section and in the FIG. 22, each degree being further divisible by sixty minutes, and each minute by sixty seconds, with precise determinations of planetary positions within a zodiac constellation being describable as such. It is astrological practice to use an ecliptic coordinate system. Alternatively, to be detailed, each zodiac sign can be determined based on actual layout of the stars in each zodiac constellation.

By traditions and conventions long known and used by astrologers and astronomers alike, the vernal equinox marks the tropical year, with its zodiac sign given by name and degree. Each sign has a uniform 30 degree arc of the 360 degree ecliptic coordinate sphere originating at the sign on the vernal equinox.

Western prior art holds this position invariably as Aries 0°, the first point of Aries. The invention's methods incorporate the accurate effects of precession, which, over time, shift the sign on the equinox. Since the time 2000 years ago, when these conventions were enacted, the sign on the vernal equinox and hence, all points on the celestial sphere, have shifted since ancient times one full zodiac sign back, west, 30 of 360 degrees, to Pisces 0°. In the New Millennium, the zodiac sign marking the vernal equinox becomes Aquarius 30°, the same point as Pisces 0° but a new sign. This origin is accurate to one degree, 1930–2070.

The precise marking of the origin, which determines the positions of the zodiac signs, each of 30 degrees, is established according to the means detailed in the Technical Means section. FIG. 21 summarizes these various means, which render slightly differing determinations of the marking of the origin, generally within one degree of the determinations of signs rendered as below. Any of these means can be used to determine the precise marking of the origin, with the data of FIG. 1, top, representing the determinations based on a 30 degree precession from the tropical zodiac sign positions. Hence, FIG. 1, top, is dependent on the means used. Further, as is demonstrated in the section, NATURE OF ERROR IN, and IMPROVEMENT BY INVENTION OF, PRIOR ART, the use of the invention's means is not limited to vernal equinox, zodiac Sun sign, based systems. That section showed that the lunar-based animal signs of Chinese astrology can be utilized, and via precession, to render the same conclusions.

The invention comprises a celestial mapping system for determining the precise longitudinal positions of zodiac signs and zodiac component objects and time as viewed from earth along the ecliptic and for deriving astrological data, artifacts and information based thereon, such system adjusts for the precession of the equinoxes, with its origin at the vernal equinox at Pisces 0°, axis continues east from Pisces 0°, through the twelve zodiac signs, ending in Aquarius, at origin, Aquarius 30°, wherein each zodiac sign comprises 30° of the 360° coordinate mapping system.

Proceeding East from the celestial mapping system's origin (0°), the longitudinal axis is divided by these twelve zodiac signs, each for thirty degrees: Pisces, from 0° to 30°; Aries, 30° to 60°; Taurus, 60° to 90°; Gemini, 90° to 120°; Cancer, 120° to 150°; Leo, 150° to 180°; Virgo, from 180° to 210°; Libra, 210° to 240°; Scorpio, 240° to 270°; Sagittarius, 270° to 300°; Capricorn, 300° to 330°; then Aquarius, from 330° to 360° (0°). See FIG. 1, top, which contains these stated Positions of the Zodiac Signs.

Thus, this mapping system, wherein each zodiac sign commands a 30 degree arc sector of the 360 degree coordinate mapping sphere, is oriented by the means utilized to determine the precise marking of the origin. Based on the marking used, the zodiac signs are then assigned in order. For determinations of zodiac sign data, each of 30 degrees, and component data, based thereon, the specification implements an origin and system based on an exact 30 degree precession from tropical sign positions.

The zodiac sign to degree on the equinox origin is precessed each year by using 50"0.2784 (+0.022 T) epoch 2000, or 0.0139696°. The sign on the origin changes to Aquarius in the New Millennium.

Each zodiac sign is provided with a uniform 30 degree arc of a 360° ecliptic coordinate sphere, as is the convention within astrology. As an alternative or additional representation of the data, each component position can be rendered precisely using the actual layout of stars in the zodiac sign constellations, overriding, supplementing or qualifying the 30/360 component data, if any component is found to be within, or is considered nearer to, the imaged outline or boundaries of another one of the zodiac signs in constellation. FIG. 1, bottom, Positions of the Zodiac Constellations, is used to make determinations of positions based on constellations. These positions and the data based thereon, can substitute for or modify positions determined, 30° per sign.

Figure 1A:
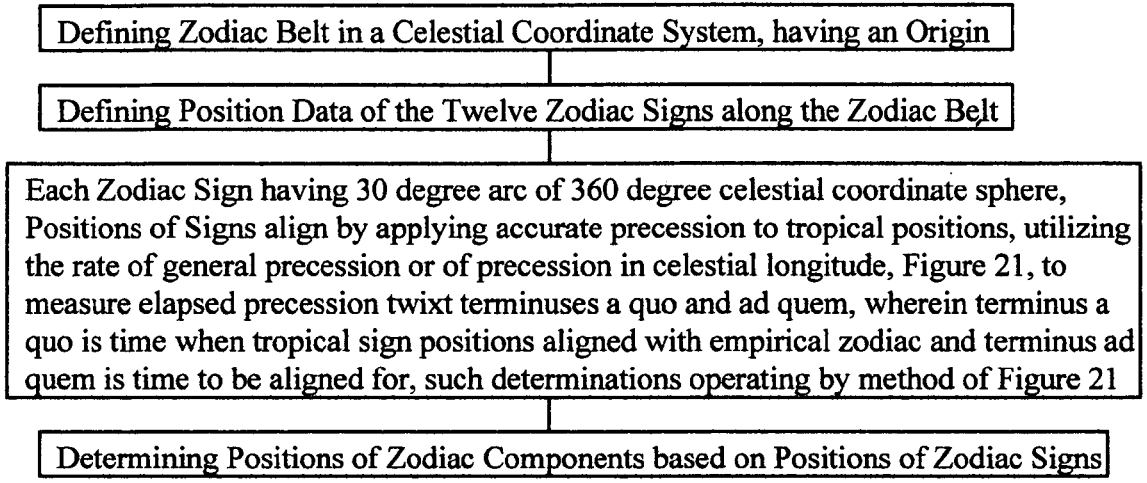
FIG. 1A diagrams the Method Determining Zodiac Signs by 30/360 Grid.
Figure 1B:
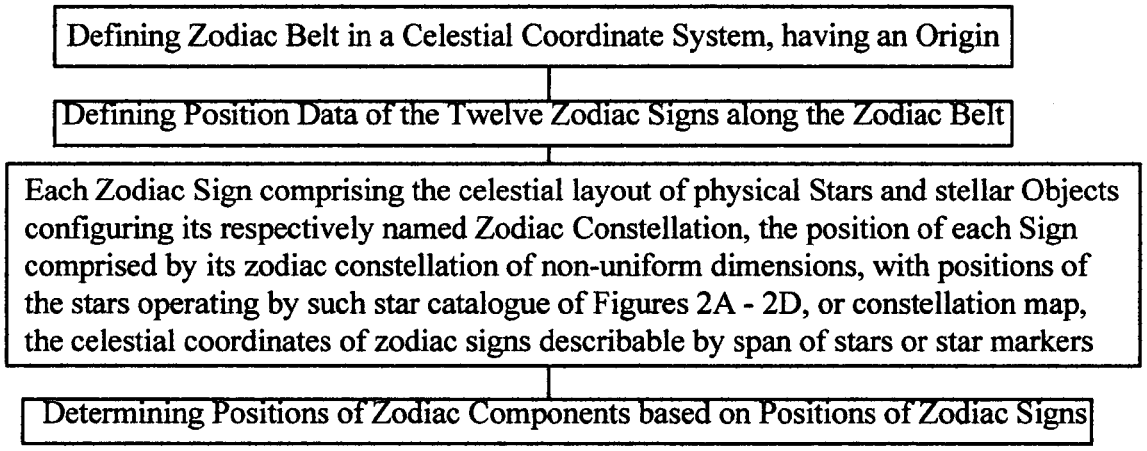
FIG. 1B diagrams the Method Determining Zodiac Signs by Physical Stars of the Zodiac Constellations.
Figure 1C:
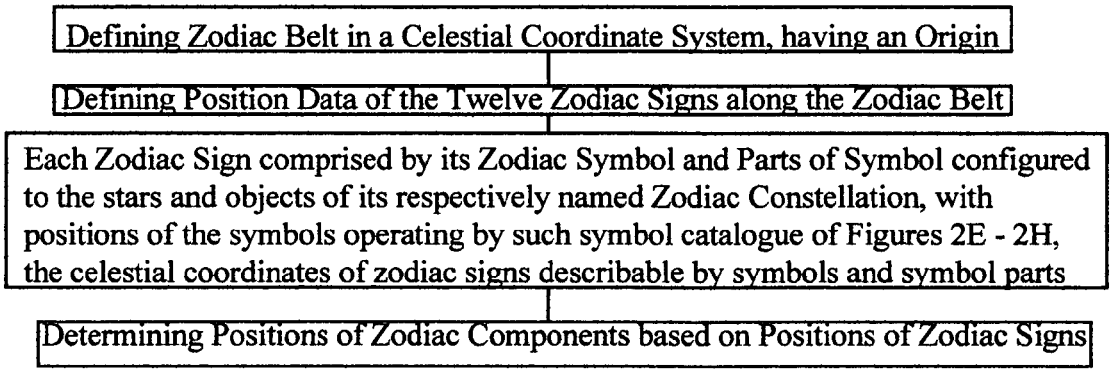
FIG. 1C diagrams the Method Determining Zodiac Signs by Zodiac Symbols.
Figure 1D:
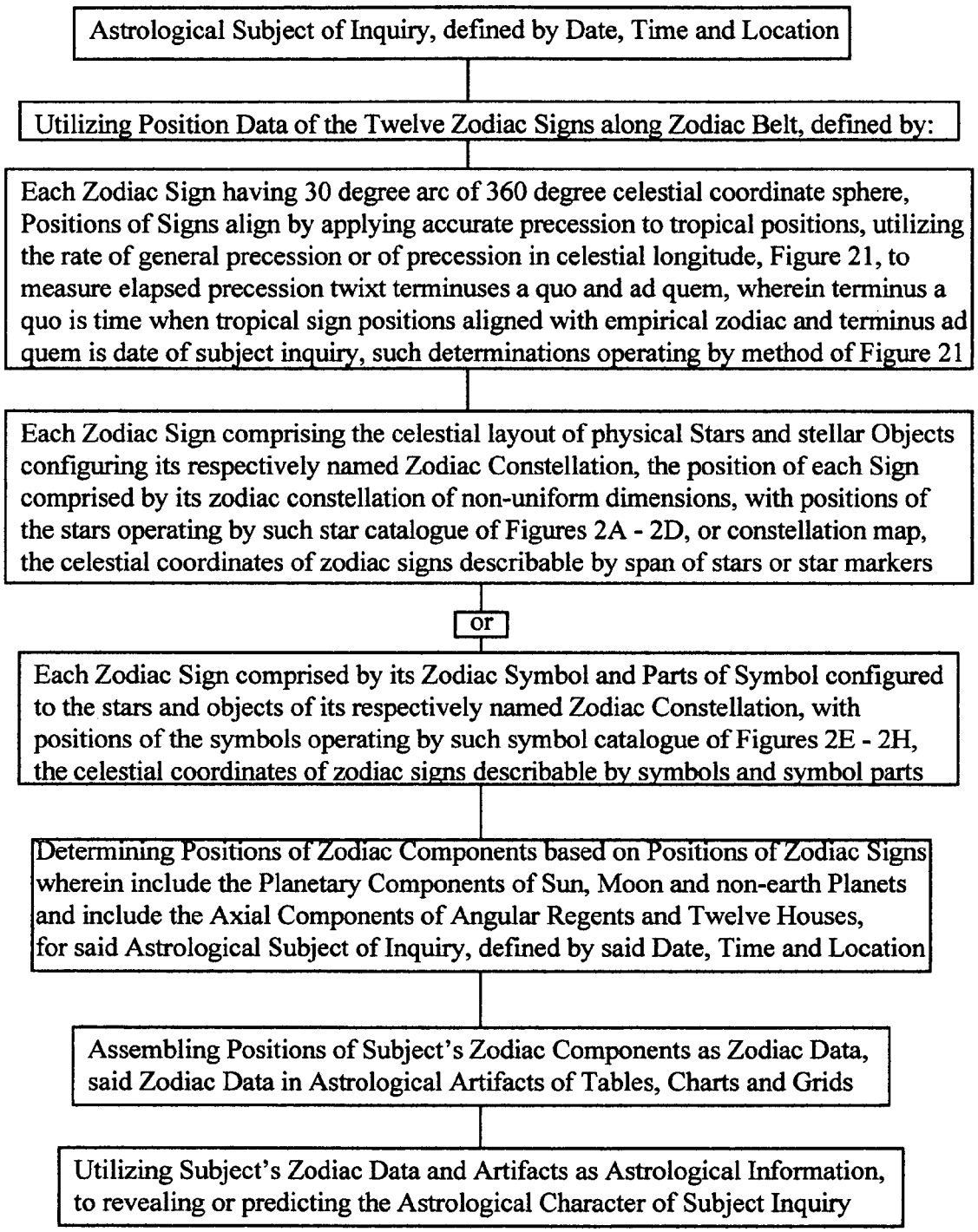
FIG. 1D diagrams the Method Deriving Data for an Astrological Subject of Inquiry, Inquiry defined by Date, Time and Location.
Figure 2:
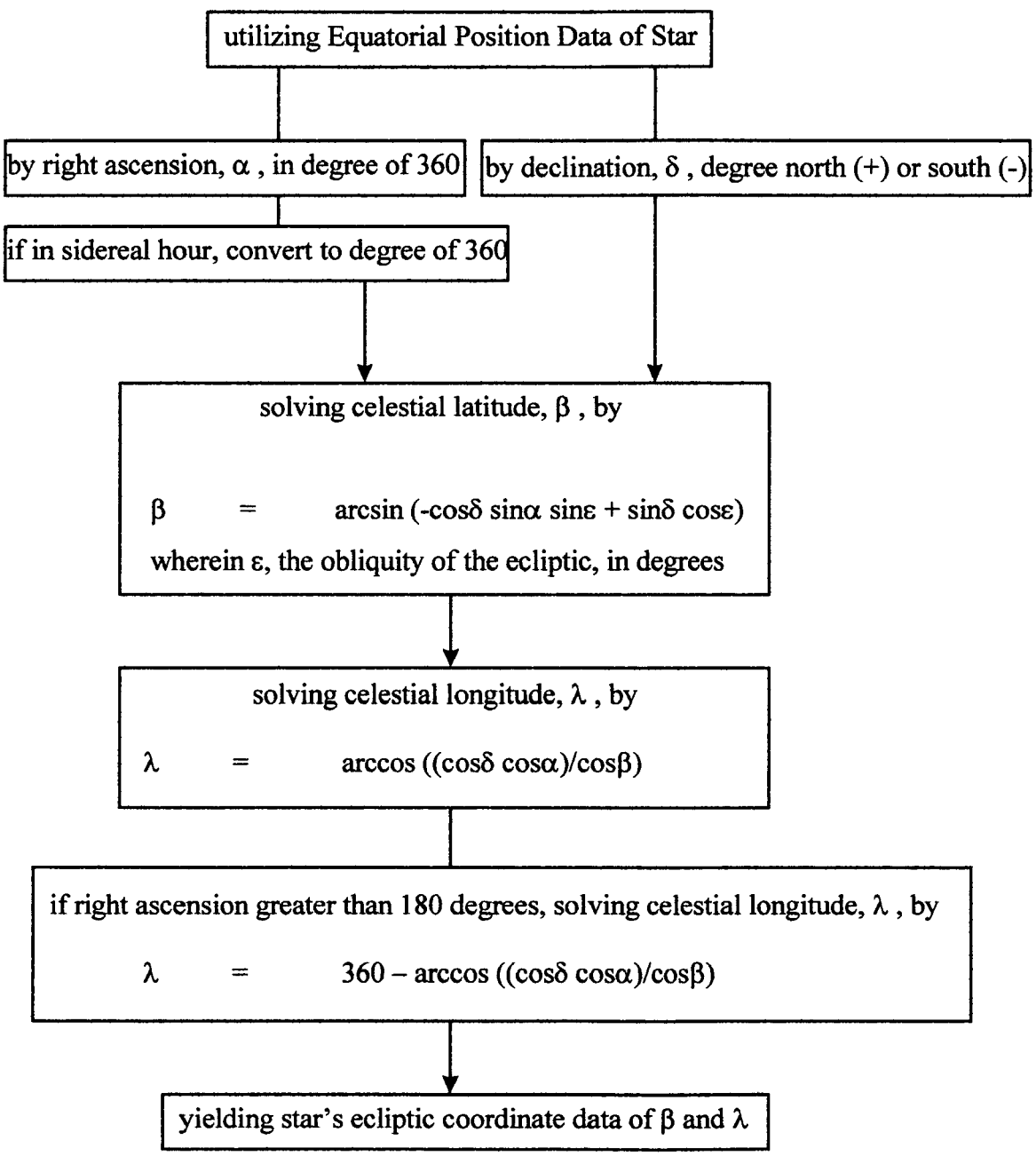
FIG. 2 diagrams the Process Converting Equatorial Coordinates of the Stars and Stellar Objects to Ecliptic Coordinates of Celestial Longitude and Celestial Latitude.

In order to map the longitudinal positions of the zodiac constellations, it was first necessary to Catalogue the Fixed Stars of the Zodiac Constellations in ecliptic coordinates, by longitude and latitude. Such position catalogue is invented in FIGS. 2A, B, C and D, longitudinal positions given in degree of 360. In the right column, star position is given by 30/360 Signs.

The invented process for measuring the ecliptic positions of the stars and stellar objects of the zodiac constellations, and of any heavenly star, object, or constellation, enabling the cataloguing of said stars, objects, and constellations, in celestial longitude and latitude, as ecliptic coordinate data, proceeds by converting position data in non-ecliptic coordinates.

Expressly, the equatorial position data of individual stars and objects is utilized, wherein said equatorial position data comprised a star's or object's celestial position by right ascension, $\alpha$, and by declination, $\delta$, which further comprises, first converting said right ascension data into degree of 360, proceeding east from equatorial system origin at vernal equinox, having said declination data in degrees north (+) or south (−);

solving for said latitude, $\beta$, from said equatorial data by:

$\beta = \text{arc sin} (-\cos \delta \sin \alpha \sin \epsilon + \sin \delta \cos \epsilon)$, wherein $\epsilon$, the obliquity of the ecliptic, in degrees;
solving for said longitude, $\lambda$, from said $\alpha$, $\delta$ and $\beta$ data by:

$\lambda = \text{arc cos}((\cos \delta \cos \alpha)/\cos \beta)$, which further comprises for said stars and said objects having right ascension data greater than 180 degrees, solving for said longitude, $\lambda$, from said $\alpha$, $\delta$ and $\beta$ data by:

$\lambda = 360 - \text{arc cos}((\cos \delta \cos \alpha)/\cos \beta)$;

yielding said data, of celestial longitude and latitude.

Therefrom, a catalogue of the ecliptic coordinate positions of the stars and stellar objects of the zodiac constellations was generated, wherein said ecliptic coordinate positions of individual stars and objects are ecliptic coordinate data: by celestial longitude, in degree of 360, and by latitude, in degrees north or south; as well as by longitudinal data of zodiac signs of uniform (by FIG. 1 Top) and non-uniform span (creating FIG. 1 Bottom); and by zodiac symbols and the symbols' parts.

The invention's locating methods and mapping system, and utilization of the effects of precession over time, provide the basis in determining the calendar dates of the zodiac signs, useful for deriving astrological data, artifacts and information.

Therefrom, the Sun's position and Sun ("Birth") Signs and calendar dates' correspondences have been derived, as were the lunar animal calendar dates and ascendants. Such lists of zodiac signs by calendar dates, provided in the media, in horoscopes, in print, production, distribution, publishing, broadcasting and disclosure, center, originate, at the sign on the vernal equinox.

FIG. 3 presents an innovative Unification of Sun ("Birth") Signs and Lunar ("Animal") Signs by Dates, made for year, 1998 AD. These month-long visits in a sign are the crux and core components of astrology's syndicated features, such as daily horoscopes. Beneath, Sun and Lunar Sign Positions at Equinoxes and Solstices. At bottom, Chinese Lunar Signs and Chinese Ascendant for Hours and Solar Zodiac Sign Correspondences by Invention and by Western Prior Art.

FIG. 3A presents the invention's Sun Sign Positions at the Equinoxes starting in the New Millennium. Next, it presents the innovative Unification of Sun ("Birth") Signs and Lunar ("Animal") Signs by Dates during the calendar year, for the New Millennium. These dates are accurate to within one day for the seventy years following the new millennium, and the dates of FIG. 3 are accurate to one day to seventy years back. In the FIG. 3A, at bottom, is a two-dimensional Reproduction of the Vernal Equinox Origin displayed among the stars on non-grid constellation basis. The FIG. 3B presents side-by-side Comparisons between the invention's methods, Western tropical methods and Eastern Vedic, Sidereal ones. The top section shows the Dates for the Sun Signs under each of these systems. The invention's method is unique to the prior art systems for the Dates of any Sun Sign, at all spherical points along the zodiac and at all times of the years. The reason for this differentiation from prior art, across all points and times, stems for the different Signs to the Degree of Solar Astrological Positions at the Equinoxes. The bottom section presents a comparison of positions among these methods.

The zodiac positions of planetary components are determined for the Sun, Moon, Mercury, Venus, Mars, Jupiter, Saturn, Uranus, Neptune, Pluto and Lunar Nodes, and with regard to the zodiac signs of Aries, Taurus, Gemini, Cancer, Leo, Virgo, Libra, Scorpio, Sagittarius, Capricorn, Aquarius, and Pisces, with the astrological axial components of ascendant, mid-heaven, descendant, imum coeli, and demarcations for the twelve houses, being similarly determined with respect to the named zodiac signs, each of thirty degrees, with position specified by sign to degree. Determination of planetary components' positions within the zodiac constellations can be accomplished using a background of the zodiacal belt and stars of the constellations as underpinning for astrology charts and would reveal distinctions from 30/360 signs, and it can be accomplished using FIG. 1 bottom and FIG. 2.

The present invention relates to methods for determining, describing and predicting the zodiac influence on any subject by establishing astrological "artifacts" for the subject based on concrete, naturally factual, position data of the zodiac signs and components existing as of selected times and dates, and utilizing the data and artifacts to predict the character of the subject(s). To "manufacture" an astrological artifact is to produce objects, images, tools and outputs meeting the needs specific to astrology. The manufacture of astrological artifacts can be executed by hand or by software programs running on a computer or internet server.

Astrological "artifacts" include, but are not limited to, the data, information and horoscopes, based on the zodiac positions of component data themselves and the annual dates of Sun and Lunar signs, but also include the myriad charts, tables and aspect grids used in astrological analysis, as well as the reference resources facilitating the manufacture of analytic artifacts by housing or returning component positions for input date, time, location. Artifacts and information are constructed using "ephemerides"—calendar sets of component position data showing the zodiac position of one or more zodiac components for any given date or time—virtual table, or by sets of sign correspondences per date.

Generally, an "ephemeris" includes positions for the components of the "planets"—Sun, Moon, Mercury, Venus, Mars, Jupiter, Saturn, Uranus, Neptune and Pluto (and lunar nodes) as they move through the twelve zodiac signs, listed by recent order from the vernal equinox—Pisces, Aries, Taurus, Gemini, Cancer, Leo, Virgo, Libra, Scorpio, Sagittarius, Capricorn and Aquarius.

Other reference resources, themselves artifacts, include "books of houses", which aid discovery of axial components over sidereal time and geographic location, and tables for lunar nodes.

For astrological charts, for instance, a "natal chart", both sets of components, the axial and the planetary (Sun, Moon and planets) components will be used in tandem and must be determined. Charts may also show the zodiac position of the north and south lunar nodes, Chiron, Part of Fortune, or other tertiary component, these found by resources/processing dedicated to their positions.

For the manufacture of certain astrological devices of charts, tables and grids, upon which much astrological analysis rests, it can be necessary to define the angularities of horizon and axis, according to the date and geographical coordinates of the input inquiry. Once processed, these inputs return the rising (ascendant) and descendant signs of the querist's subject, the rulers of the heavens (mid-heaven and imum coeli) and the houses.

Certain aspects of astrological processing can be performed upon the user-specified input of date alone. Here, the subject of inquiry might be simply the locations of the sun, moon and node, and planets across the zodiac for a given day. These planetary component data are found formatted in ephemerides, or solar system calendars, presenting their zodiac positions for each day. Ephemerides, astrological calendars and daily aspectarians are tables by date, listing position in zodiacal sign, to its degree. FIG. 4, invention's system Ephemeris, February 1998, noon GMT, gives the longitudinal position data for the planetary components. FIG. 4 bottom, are tables of Sun Sign Changes for 1998 and 2000. These latter tables show Sun Sign Changes vary a bit year to year. The FIG. 4A contains samples and portions of invention's Look-Up Tables, specifically: a Table of Lunar Nodes, for the year 1972 AD; a minimum Book of Houses for Northern Latitudes, GMT standard; and a Shortened Ephemeris, for the year 2000 AD. The FIGS. 4 and 4A show that the invention's reference resources are readily made for the full discovery of any component position data.

From solar, lunar and planetary component data, astrological analysis can proceed. The general character of the subject can be revealed for its zodiacal placements, since the signs of the sun, moon and planets have been discovered. Grids of Aspects between the novel component data can be created, revealing component interactions as established by their geometric relationships of: conjunction (aspect between planets of 0°); opposition (aspect 180°); trine (120°); square (90°); sesquiquadrate (135°); sextile (60°); quincunx (150°); semi-square (45°) and semi-sextile (30°). The aspects between components need not be exact, as astrologers allow for an orb around the exact value, these orb amounts varying by the specific type of aspect and the specific planets involved; invention computes aspects by astrology's standard degrees of orb.

Each component can also be categorized for astrological disposition: by polarity—positive or negative (i.e., masculine or feminine); by element—fire, earth, air or water; by quality—cardinal, fixed or mutable; by component in regency, exaltation, detriment and fall; for concentrations of components (i.e. stellium); for dynamics of end-depositing, mutual reception, mid-points and parallels (determined by latitude, not by declination).

When the full range of input parameters are known for the inquiry's subject—time, date and earthly location, the complete and precise astrological component mapping can be generated. Specifically, the exact time and geographic location of the inquiry afford the ability to process and return the axial components which orient the planetary components, as well as for more precise data on fast-moving astrological components, lunar activity, eclipses and changes of zodiac sign, or on changes in apparent direction (direct or retrograde) of planetary components.

To construct an astrological artifact involving axial components, such as a natal chart from an individual's birth date, time and location, the positions of these components need to be discovered by computational processing, which in part can be met by conventional astronomical or astrological procedures. The GMT standard is principally used in astrology and is the basis herein.

Certain aspects of the methodological processing required for data and artifact generation are met by conventional astronomical/astrological procedures. Here, let a location on earth specified by date and time be the input parameters. The local time input is converted to Greenwich Mean Time per standard time zone tables or algorithmic discovery.

This converted time is then adjusted for sidereal movement by a combination process: first, look-up sidereal time at Greenwich at noon for the date of inquiry; second, find the interval between the GMT time and noon; third, the interval time is added (PM) or subtracted (AM) to the sidereal time at Greenwich for noon; fourth, the acceleration on the interval is calculated as one second per six minutes of interval time, being added (PM) or subtracted (AM) to the result of step three. This resultant time is then adjusted for longitudinal equivalent to the input location and this is done by multiplying the longitude of the input location by four, with the result stated in terms of hours, minutes and seconds. This amount is then added (east of Greenwich or subtracted (west of Greenwich) to the sidereal time previously computed. This value is the local sidereal time (LST) for the input parameters.

For Southern latitudes, the local sidereal time calculated by the process is increased by 12 hours; the book of houses per invention is referred to: the discovered positions are converted to the opposite sign from that determined from the book of houses.

The process references this local sidereal time, in cross-reference to the longitudinal coordinate of the input location, against a book or table of houses, a look-up table or by database algorithm which returns the zodiac positions of the axial components per invention—minimally, ascendant and mid-heaven. Each house can be individually determined for complete charts.

In performing typical input processing, the following group of look-up tables, calendars must be available, in full or part:

1) zodiac positions of solar, lunar and planetary components;
2) sidereal times at GMT 3) book of houses, positions of axial components for northern hemisphere; and 4) table for lunar node.

FIG. 5 contains a complete Set of relevant Look-Up Tables by invention, for an example subject, born Nov. 21, 1960 at 5:50 AM in Cincinnati, Ohio (longitude West 84° 31", latitude North 39° 6"). It contains a portion of an Ephemeris, this ephemeris being further innovative in that it contains the Latitudinal Position of the Planetary Components, in addition to Longitudinal. The position in latitude is valuable for determining position within the physical stars in zodiac constellation. Beneath that, portions of look-up Tables for Sidereal Time and North Lunar Node.

For this example, the processing methods are implemented to determine the subject's Local Sidereal Time:

1) Time Zone =–5: Add 5 hours to Local Input Time=10: 50 AM;
2) Look-Up Sidereal Time at noon GMT for date=16 h 02 m;
3) Find Interval between 10:50 AM to noon=12 h–10: 50=1 h 10 m;
4) Subtract 1:10 from 16 h 02 m=14 h 52 m;
5) Acceleration: [(70 m/6 m)×1 s]: subtract from 4)=14 h 52 m;
6) Longitudinal Equivalent:(84.5×4)=338 minutes=5 h 38 m;
7) Subtract 5 hr 38 m from 14 h 52 m=Local Sidereal Time=9 h 14 m;
8) Extract Axial and Component Data from the Look-Up Tables.

The Book of Houses then follows below, for the portion relevant by LST and Northern geographical latitude. At bottom, are listings of the extracted Planetary Component Data, stated for celestial longitude and latitude, with the data for the Moon reduced from the Greenwich noon data, and of Axial Component Data.

FIG. 5A is a comparison of the Artifacts and Component Data, for both the Invention and Western Prior Art, based on the same inquiry subject and on FIG. 5. The FIG. 5A clearly shows the vast magnitude of consequence, critically, differing zodiacal signs for each component planet and angle, and a fully transfigured Astrological Disposition.

According to the Western Prior Art, the input returns the Sun and Ascendant, Mercury and Neptune in Scorpio, four planets in Capricorn, etc. The Scorpio components predict and reveal the subject as a deeply emotional individual, loyal, intuitive and passionate, these as the foundation for thought processes, decisions, endeavors and inspiration. The Capricorn components predict the subject as highly conservative, cautious and conventional, materially and practically inclined, with a strong sense of status, responsibility and duty. The Western components in Scorpio and Capricorn predict an individual who is dark and stocky, with large bones. Likely occupations are psychologist, government employee, military officer, corporate executive. The astrological disposition of this subject is determined as highly negative polarity, having nine of ten planets in "feminine" signs of earth and water element. This indicates that the subject has a predominant disposition to react rather than to act, to choose from existent situations rather than to create choices and opportunities. The quality of the planets are reported as predominantly cardinal and fixed. This reveals the subject as a very stable individual and competent leader, with a fixed sense of self and others. The key planet in the Western manufactureds is Saturn in Capricorn, being in its regent sign, and this planet functions as the end-depositor for the composition. This predicts the subject resolves as a person, ambitious for the sake of material wealth and personal status, practically pursuing goals.

However, this is fully wrong. The manufactureds by the invention reveal that, in fact, the subject has a Libran Sun and rising sign (Ascendant), Mercury and Neptune, with substantial placements in Sagittarius. Each planet and angle is in a zodiac sign different from the Western ones. The subject is predicted and revealed, by the Libran components, as an intellectual and aesthete who is concerned with societal forms of art and science. The many Sagittarian components indicate that the subject has a religious and ethical nature, and is inclined to higher thought. On the physical side, the Libran and Sagittarian components predict a person who is fair, good looking, slender and athletic. Probable occupations include writer, artist, thinker, educator. The polarity of the subject is highly positive, or "masculine", not negative, since nine out of ten planets are in fire and air signs. This indicates a strong tendency to empower oneself to personally originated purposes and to pursue these in life. The disposition and analytics further reveal qualities quite different from that produced by the Western Prior Art, as the subject's planets are predominantly in cardinal and mutable signs. This indicates a changeable, versatile nature, coupled with strong cardinal leadership qualities. Jupiter, ruler of religion, law and philosophy, not Saturn, is the primary planet for the subject disposition, with exaltations, detriments and fall changing also. This predicts the subject resolves as an enterprising person, philosophical, full of ideas to better life. Thus, the invention improves on Western prior art by correcting the demonstrable flaws of its methods, tools, resources and artifacts for usage. The results of the example represent the typical improvement for any input choice, with the invention demonstrating its innovation over the Western Prior Art and establishing its usefulness and general benefit to society.

Three comments are important. First, the astrological characterization provided by the artifacts produced per the invention's methods seemed subjectively more astute, insightful and on-target to the subject than did those by the Prior Art. As a simple proof of its efficacy, the subject clearly resembles the invention's physical prediction, not the Western's. Second, feelings that the prior art creates accurate artifacts stem from the astrological fact that the Sun of any subject, a preeminent astrological component for every inquiry, moves into the Western prior art natal position by adulthood, with progressed positions understood in astrology as indicating what the subject becomes or is influenced by, at that time in life. And third, by logic, the rational mind knows that it is the stars in the formations of the actual, naturally factual, zodiac constellations which is what, if anything, makes astrology transpire.

The interpretative and creative usages of astrological manufactureds are, to great extent, not topical to the invention. These developed specialties are independent of this invention, because they are not impacted by this invention. It is not an issue of interpretation; it is not that Taurus must now be understood differently. Taurus is Taurus. It is that the prior art assigns locations incorrectly, placing a planet, e.g. in Aries when it is actually in Pisces, and therefore misinterprets.

FIG. 5A also shows the implication of removing the 30/360 grid when finding the zodiacal positions of components, as based on the actual layout of the stars in zodiac constellations. Substitutions to the 30/360 grid-based data were made after visual assessment of positions within outlined constellations, but the change of Mercury from Libra to Virgo is astrologically important, predicting the subject is gifted in technical science.

FIG. 6 illustrates a Western-Style, Placidus Houses, Natal Astrological Chart for the example input subject, born Nov. 21, 1960 at 5:50 AM EST in Cincinnati, Ohio, based on and showing the invention's zodiac sign placement and component position data.

The Natal Chart of FIG. 6 is re-presented in FIG. 6A with Lines of Aspectation drawn and with the subject's Grid of Aspects. By invention, Example has Venus in Sagittarius trine Pluto in Leo.

Although the example focused on a natal chart, any variety of astrological process or artifact can benefit from the methods of invention. For instance, "progressed" charts (a chart made by progressing a subject's natality one day forward in time for each year of life) and "transit" charts (a format overlaying the contemporaneous positions of planetary components on a subject's natal or progressed chart) require position data per invention for zodiac components, as natal charts do.

FIGS. 6B, 6C and 6D showcase the methods of invention across the Astrology Chart artifact types of Natal, Progressed and Transits, respectively. In FIGS. 6B and 6C, the invention's Charts are displayed above Tables of Planetary Positions, Angular Regents and Astrological Disposition, and are contrasted by the Western prior art artifacts for the same subject parameters. In FIG. 6D, the Transit data, like the Progressed data or the Natal data, is determined according to its parameters of date, time and location. The transit data then is placed on the subject chart, by Overlay technique, as shown therein. The transit overlay is made for any type of astrological chart. As with the two previous Figures, FIG. 6D contrasts Western art.

Synastry, the astrology of pairing two subjects, requires each subject's data and charts to be first rendered per invention. FIG. 6E applies the invention's methods to Synastry and Composite Charts. These types of astrological chart artifacts are used to portray the interaction, influence and compatibility of two subjects. For illustrative purposes, a second example subject is introduced, chosen for its date's numerological signature per the methods and correspondence systems described herein, of Jan. 20, 1970, at 2:59 PM in Christchurch, New Zealand. That subject's natal positions of components and the natal chart for that subject are first determined and constructed. By use of the overlay technique, synnastry charts achieve their ends by linking the two natal charts, placing one subject's components by position over the chart of the other subject. In contrast thereto, the mechanism of composite charts is to make one single data set and chart from two sets of component positions, the new data set and chart revealing how that pairing operates together. The composite technique is by mid-points. Mundane astrology of events, objects, companies, utilizes the invention's data types, too.

Standard charts are made in manner of Western-, Eastern- and Chinese-Style astrology charts, except that the invention's charts are based on and reflective of the invention's zodiac positions of signs and zodiac components. FIG. 6F, containing the invention's Eastern-Style artifacts, represents the same Natal data as FIG. 6, being for the same subject, according to the traditions and designs of these astrologers. In FIG. 6F, Vedic-Style artifacts of Indian design—the List of Grahas ("Planets") and North and South Indian Charts are displayed, contrasted side-by-side with prior art Eastern methods of the Ayanamsa, herein 23.5 degrees from Western.

From the Table of Grahas, one can see clearly that for every component graha, the invention's position, to the degree, is always different from the position found by Eastern prior art. The box Charts look very similar, which is because only the sign, but not the degree, is represented therein. However, importantly the Sun signs differ.

In FIG. 6G, the Chinese Lunar Astrology of the same Natal subject of FIG. 6, 6A, 6B and 6F is listed. Given the focus in Chinese astrology upon the Lunar Signs' Elements, Seasons and Stems, the invention's methods provide vital improvement since the Western Methods err by one zodiac sign. Each zodiac sign is unique, and neighboring signs of the zodiac are always different with respect to their astrological Element, Quality and Polarity. Figures contain Data, Astrological Charts, Tables of Disposition.

FIG. 7 is a three-dimensional Reproduction showing the Example subject's Natal Astrological Sphere from Comprehensive Sky Vantage, with Components mapped within the zodiac Constellations. The reproduction gives comprehensive view from outside the zodiac. The centering line of the grid represents the ecliptic longitude and the vertical lines mark 30/360 grid zodiac sign boundaries. The twelve zones of the grid are marked by sign glyph, with their corresponding zodiac constellation found within respective region. Each Constellation can be illustrated for its mythological symbol.

FIG. 8 is a Zodiac Sign Mapping, with Constellation Stars mapped to ecliptic coordinates of longitude and latitude, zodiac Symbol figuratively illustrated on its location in space and star. FIGS. 2E, 2F, 2G and 2H provide Catalogue of the Fixed Stars with Zodiac Symbols and Corresponding Part of the Symbol listed.

FIG. 8 consummates and stands as testament to the invention's astrological methods, for the first time unifying astrology and astronomy since the time of Christ, being the first and sole set of methods which merges the zodiac sign, symbol and the zodiac constellation together as three into one, cohesive in naming and positional field, centering a zodiac's symbol on its physical identity, cataloguing the home of each zodiac sign, by its constellation of stars. The example zodiac sign in this figure, in astrological symbol and underlying physical constellation, is of Aries, whose symbolic image is of the Ram.

FIG. 9 is an Astrological Mapping Device, consisting of a circular Base Sheet, with Zodiac Signs and Constellations mapped, in an Ecliptic Coordinate System, each Sign as 30 of 360 degrees.

A circular base sheet is marked along its perimeter, being divided into twelve equal sections, each section being marked in an outer band on the perimeter by the glyph of one of the twelve zodiac signs in order along the zodiac belt, counterclockwise. Each section is further divided, marked, into 30 subsections, each of the 360 subsections representing one degree in longitude, with the point Aquarius 30°:Pisces 0° as the origin, 0° of the 360° grid.

Next, an interior circle is drawn equidistant between the base sheet's center and its perimeter. This line represents the ecliptic, with position outward from this ecliptic line being for increasingly northern latitudes, the area going inward to the center, being for increasingly southern latitudes, each direction extending or marked to contain at least 30 degrees of latitude.

Next, the actual stars in zodiac constellations are mapped and figured to the area between the center and perimeter, being mapped individually by longitude and latitude. The symbolic entity of each zodiac sign can be illustrated on its constellation space. FIG. 9c shows a computer rendered chart of the same design, without indicia for each degree.

Onto this prepared circular base, the zodiac planetary and axial component positions can be mapped and rendered. An outermost ring with calendar dates, such that March $21^{st}$ is origin, dates proceeding counterclockwise, aligning with the Invention's Sun Signs, Equinoxes and Solstices by calendar dates, can be added. On a radii from center, of axial components, latitude can be marked.

FIG. 9A is a Natal Astrological Chart based on the Device of FIG. 9, Example subject identical to FIGS. 5, 6 and 7, zodiac Constellations, Signs and Component Position Data mapped to invention's Astrological Mapping Device by longitude and latitude. FIG. 9Ac shows a computer rendered chart of the same design for same example, using the chart of FIG. 9c, and showing the houses (axial components) in a band interior to the outer perimeter band of zodiac signs, as is standard practice of astrological charting.

FIG. 9B is the Astrological Mapping Device with Zodiac Signs, Constellations and Symbols; FIG. 9Bc shows a computer rendered chart of the same design as FIG. 9B, without indicia for each degree; FIG. 9C is the same Example's Chart using the Device of FIG. 9B. FIG. 9Cc is a computer rendered chart for the same example, using the computer rendered device of FIG. 9Bc, and showing the houses (axial components) in a band interior to the outer perimeter band of zodiac signs, as is a standard practice of astrological charting. FIG. 9D is the Device with the Calendar Dates of Sun Signs, otherwise identical to FIG. 9B.

FIG. 9CI shows the invention's zodiac 30/360 grid-, star- and symbol-based positions for the subject. These three varieties of positions are unique to the invention, based on its coordinate systems. The nearby stars are also given for each component position to aid zodiac determinations. From the FIG. 9CI, the example subject has Jupiter at Sagittarius 5°, in the constellation of Sagittarius, near the star, λ Sagittarius, in the symbol, the Archer, at Archer's Drawstring. For determination of the invention's positions, the star catalogues, FIGS. 2A–2H.

FIG. 9E is the Astrological Mapping Device with Zodiac Signs only, each of 30 degrees. This particular version of the device is utilized as the mapping base of standard astrological charts, which map by longitude only, as are found in the FIGS. 6 and 6A, and in the FIGS. 6B, 6C, 6D and 6E.

FIG. 9F presents the invention's 30/360 grid-based astrological mapping device, wherein the twelve zodiac constellations, each assigned 30 of 360 degrees, are marked in order counterclockwise around the circumference of a circular base sheet, the perimeter band of the base sheet divided into twelve equal sections, with the glyph of the zodiac constellation placed therein. The dividing line separating Aquarius (30 degrees) and Pisces (0 degrees) is the origin of the mapping device, corresponding to the solar position at the vernal equinox, the degrees from the origin proceeding counterclockwise from that point of the circular base. The zodiac glyphs are inward aligned, to permit legibility when rotating the device, for instance, to place a subject's ascendant at the nine o'clock position when mapping a subject. A concentric inner circle is marked inside the circular base's perimeter band of zodiac signs, allowing that band to be divided by house axes, with the appropriate house marked therein. This astrological chart device was used for drawing the invention's example charts contained in the FIGS. 6, 6A, 6B, 6C, 6D and 6E, though in those drawings the zodiac signs' glyphs are drawn upright aligned to permit legibility when reading the completed subject chart. This device is computer drafted, in MicroSoft PowerPoint, as are FIG. 6 through FIG. 6E.

The FIG. 9G presents the astrological mapping device based on the constellation positions defined in the lower part of FIG. 1, wherein the irregular zodiac constellations are segmented along the perimeter band of signs according to their respective marking in degrees. The device of FIG. 9G contains the actual layout of the physical stars in the constellations, mapped to ecliptic coordinates of longitude and latitude inside the perimeter band; this feature can be left out, retaining an operating device per the mapping of FIG. 1, bottom. The stars of the irregular zodiac constellations result in arc sections which are without zodiac sign or where two constellations overlap, based on longitude alone. The former arc section is marked, shown herein by diagonal lines, the latter overlapping arc section by cross-hatching. The astrological mapping device, as each device of the FIG. 9, has a vernal equinox origin, which is marked hereon by zodiac glyph at the beginning of the zodiac constellation, Pisces. FIG. 9Gc is a computer rendered chart of design as FIG. 9G, without indicia for each degree.

The FIG. 9H contains an Example Chart based on the zodiac component positions determined using the zodiac mapping of FIG. 1, bottom, for same subject of Nov. 21, 1960. The example subject's Neptune is at the end of Virgo by longitude, however, because it is, by longitude and latitude, closer to a star of Libra, its star-based position is determined as Libra. By longitudinal measurement alone, subject's Ascendant is end-Virgo. Along the Ascendant axis lie the two Virgoan luminaries, 109 (218.5° longitude, 17° latitude) and μ Virgo (219.9° longitude, 9.6° latitude). Thus, the ascendant axis crosses those two Virgoan luminaries, corresponding to the two Feet of the Virgin. However, the point of ascendancy, at the ecliptic, 219° longitude, 0° latitude, is closer to the star, α Libra, than to the Virgoan stars. FIG. 1, bottom, is thus used in cross reference with invention's star catalogues, FIGS. 2A–2H. Per invention's non-grid, physical stars in constellation-based positions, position can be by point, longitude, visually, and by symbols on stars. The FIG. 5A shows the planetary and axial components per the invention's non-grid, physical stars in constellation-based positions per the point of planetary and angular components, hence, an ascendant of Libra. It also shows, when it provides the best fit, components by longitude, visual inspection and symbol. To great extent, positions along the ecliptic belt by these means return zodiac signs which are unanimous. However, examine the subject's conjunction of Ascendant, Mercury and Neptune: positions by longitude place all of them at the end of Virgo; by point, they are all closest to the Libran star, α Libra; by inspection, Mercury, having the highest latitude, lies in Virgo, this sign also indicated by symbol, hence, Mercury is in Virgo. FIG. 9Hc is a computer rendered chart for the same example, using the computer rendered device of FIG. 9Gc, and showing the houses (axial components) in a band interior to the outer perimeter band of zodiac signs, as is a standard practice of astrological charting.

Figure 9I:
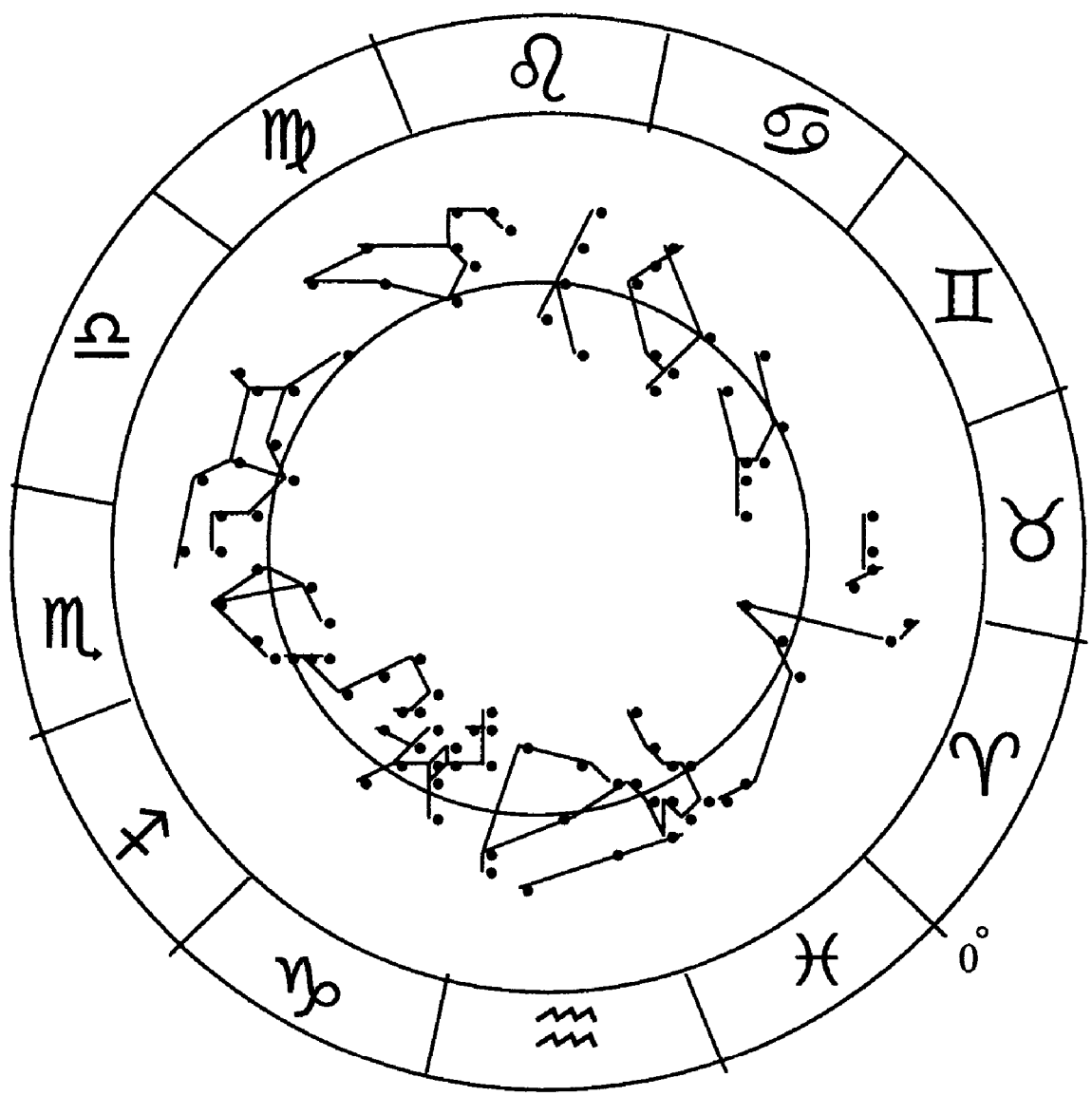

FIG. 9Ic is the device of FIG. 9c, Western 30/360 signs.

FIG. 10, Horoscopes, based on Invention's Sun Sign Dates and Data. FIG. 10 presents Horoscopes for example day, Sep. 24, 1999. A horoscope is provided for each zodiac sign, based on the planets' positions that day, respective each individual zodiac sign, these Sun signs based on the invention's 30/360 grid mapping system. The calendar dates are given for each sign, when the Sun appears in that zodiac constellation. These Sun "Birth" sign calendar dates are identical to those found in the top chart of FIG. 3.

To enable the creation of these horoscopes, three compilations of astrological data for the given day, with respect to the zodiac signs, are useful. FIG. 10A contains these chart artifacts: top, an ephemeris listing the planetary component positions for the day, Sep. 24, 1999; middle, a grid of the aspects between the planets for example day, Sep. 24, 1999; and bottom, a table listing, for each zodiac sign, any planets in that sign that day and any aspects made between planets (in their particular signs) and that particular zodiac sign.

The horoscope method identifies, for each zodiac sign, any planets found in that particular zodiac sign, and attributes importance to the characteristics of those planets for that sign. The method qualifies that information by any aspects which those domiciled planets make with other planets. Then, the method identifies planetary positions by sign for that day which make a significant aspect to the particular zodiac Sun sign, and attributes from this.

For the purposes of this invention, the horoscopes of Western prior art Sun signs are not directly useable, or rotated, as the horoscopes of the invention's art. This is because, though by invention, a Western Sun position in, for example subject, Scorpio, is in Libra, the subject cannot use the Western horoscope for Libra, as by invention, the Western positions which underlie its Libra horoscope are actually positions and aspects in relation to Virgo.

FIG. 10B serves as a second example. It contains Celebrity Profiles by Invention, providing brief astrological sketches of eight celebrities. The profiles, being printed information generated per the methods of the invention, are analytic artifacts which house the invention's component data and describe the astrological character consistent therewith. These eight selected celebrities are identical to those selected and analyzed, commercially published by the *Daily News*, "Your Stars" by Joyce Jillson, Jun. 3–5, 1997, Jun. 7, 1997 and Jun. 9–12, 1997.

The profiles by invention are generated by approximately processing the (Western) prior art component data found in the Jillson profiles. Here, all prior art component data are adjusted by an approximate, corrective, amount, being to shift prior art positions one zodiac sign back, i.e. earlier in the circuit. Thus, if the prior art established Mercury as being in Cancer, the invention's position of Mercury is in Gemini, the zodiac sign which precedes Cancer. By culling and adjusting the component data found in the prior art profiles, the correct component data can be discovered, and this data then served the purpose of analysis in line with the methods of the invention.

All of the profiles created by invention are reasonable, informative and entertaining as considered on their own. The invention does not limit or restrict the latitude for interpretative astrological comment, but rather supports it with the foundation of empirically valid zodiac positions. The invention allows the same personality traits to be discussed and pinpointed, though the analytic causality is different, since the invention identifies astrological components in zodiac positions at variance from the prior art positions.

From an astrologer's perspective, the celebrity profiles generated by the invention are arguably superior to the prior art profiles, since the analysis of celebrity personalities rests on stronger astrological causality. For instance, pronounced competitive spirit is attributed to Mars in its ruler of Aries, which Steffi Graf has by the methods of the invention. Jillson attributes this to Mars in Taurus, which is a weaker position for Mars. Similarly, Donald Trump's well-known activities and personality stem from his Sun in Taurus, this sign ruling personal property, real estate, physical beauty, love of riches and bodily pleasure. The profile by invention features this, while the prior art places his Sun in Gemini, the sign ruling the mind, communication, education and ideas. Because the Sun is a preeminent planet, if it were in Gemini, astrology indicates a fully different life focus, personality and purpose from Donald Trump than the self-made, real-estate, casino and beauty-pageant mogul.

Ancient maps of the heavens, however, were as apt to be drawn from the vantage looking in on earth, with the order of the constellations, the zodiac included, then being reversed in order and motion, from the earth-centered, outward-looking, vantage. From their system perspective, the subject is found in the opposite zodiac sign, and the zodiac sign order is reversed.

FIG. 11 shows three Astrological System Perspective Natal Charts, showing alternative vantages of the subject's position along the zodiac from the perspective of each planetary component.

The top astrological artifact of FIG. 11, a Natal Chart for Example subject, born Nov. 21, 1960, at 5:50 AM in Cincinnati, Ohio USA, shows the positions as cast from the components, into their Opposite Zodiac Signs, each component as to where the subject, on earth, appears to that component at the time of subject's birth. The Sun, which appears from the earth as located at the end of Libra, on the cusp into Scorpio, sees the subject on earth in the opposite zodiac sign along the ecliptic, that is, as across from the natal position, at the end of Aries.

This opposite vantage from each component portrays which complementary influences the subject native needs to effect Chinese balance and holistic wellness and shows what types of opinions and experiences others may well gather from having interpersonal acquaintance with the subject. It can be thought of as revealing the zodiac sign in which a component apprehends the native in its own awareness.

The middle astrological artifact of FIG. 11 shows another variety of Natal Chart, which reflects a Reversed Zodiac Order from previous chart artifacts of Tables and Figures, as well as from the opposite zodiac sign artifact depicted above it.

Reversal of constellations captures the precession of the equinoxes as a forward, not backward, shifting. This is because the order of the zodiac signs has a clockwise direction, this captured in the middle artifact, with an earthly vantage of component positions. Time does move forward, and one sees herein that the precession of the equinoxes now moves forward, too.

The bottom astrological artifact of FIG. 11 shows a further variation of Natal Chart, being the Universe's System Perspective of the natal subject at birth, actually a composite from the two artifact charts depicted above it, with planetary components by opposite zodiac signs and reversed zodiac order.

This is a variation of system perspective, as represented in FIG. 20, on its e). People often ask, "what does "God" have me to do, or be", or, "how does "God" see me, how am I really", and not, "how is it that I view myself or others view me", nor, "what or who am I in or outside". To see how "God" views you, look from God's view.

FIG. 11A presents the zodiac component data and astrological disposition for the example subject of FIG. 11, for each of its three astrological system perspective charts. As is apparent from the charts, data and dispositions of FIGS. 11 and 11A, the subject, from an opposite perspective, has a preponderance of planets in "young" signs, in Aries and Gemini, opposite the invention's 30/360 grid-based component placements in Libra and Sagittarius, respectively. The opposite and reversed chart, data and disposition reveal this "youthfulness" as domiciled in the sixth house, of work, and in the subject's fifth house, of creativity.

FIG. 11B presents the astrological mapping device of FIG. 9F with its perimeter band of zodiac constellation markings proceeding in reversed, clockwise, order around the band from the vernal equinox origin marked at the division separating Aquarius and Pisces. FIG. 11B is basis of the reversed, and opposite and reversed, charts, drawn in FIG. 11. The vernal equinox origin is marked in opposite sign, at the line separating Virgo and Leo.

FIG. 12, compiled data, System Sets of Correspondences. This invention's system of correspondences between Astrology and Tarot assign the ten Planets of astrology to the first part of the Major Arcanum of the tarot deck, numbered I to X, herein starting with I corresponding to the Sun, then II to Mercury, III to Venus, IV to Mars, V to Jupiter, VI to Saturn, VII to Uranus, VIII to Neptune, IX to Pluto and X to the Moon. The remaining twelve cards of the Major Arcanum, numbered XI to XXII (or 0), are set, being assigned the correspondences to the twelve Zodiac Signs of astrology, starting with XI corresponding to Aries, XII to Taurus, XIII to Gemini, XIV to Cancer, XV to Leo, XVI to Virgo, XVII to Libra, XVIII to Scorpio, XIX to Sagittarius, XX to Capricorn, XXI to Aquarius and, last, XXII (or 0) to Pisces.

This specific ordering of the Major Arcanum cards XI through XXII is based on the tropical, "traditional", "Age of Aries" ordering of the zodiac signs. The card XI stands as the zodiac sign marking the vernal equinox origin, with the signs assigned in order therefrom. Hence, under the invention's 30/360 grid, with Aquarius marking that origin upon the new millennium, the Age of Aquarius, Aquarius is assigned to XI. In opposite 30/360 zodiac methodology, the Age of Leo, Leo corresponds to XI. The FIG. 12AI shows examples of these orderings based on the sign marking the vernal equinox, and the use of a specific ordering is best selected based on the vernal equinox sign governing data. The FIG. 12AII re-presents Major Arcanum I through XXII, showing Arabic numbers associated with their respective Roman numeral Major Arcanum number. This drawing also lists the Image for each Major Arcanum card, as well as each card's Meaning.

Contained also in FIG. 12 are Correspondences between the four tarot Court Cards, king, queen, knight and page, and astrological Qualities: cardinal, fixed, elemental, mutable, respectively. The Correspondences between the four tarot Suits of batons, cups, swords and coins, and the four Western astrological Elements, fire, water, air and earth, respectively, are shown as well. The five Chinese elements of metal, fire, water, wood and earth, reconcile with the four elements by adding ether (akasha).

The FIG. 12B implements the process of astrological tarot correspondence for example subject born Nov. 21, 1960 at 5:50 AM, Cincinnati, Ohio. The subject's astrological 30/360 data, of FIG. 5, is herein used, and hence, the Age of Aquarius correspondences of XI to XXII are applied therein. In the top portion of the drawing, the zodiac data correspondences to Major Arcanum are listed. For instance, Major Arcanum I, "the magician", corresponds to the Sun, having Libra as sign. Corresponding to Major Arcanum XI to XXII, by way of the Age of Aquarius ordering, are the zodiac components found in each zodiac sign, correlated to specific Major Arcanum cards. Discernible therefrom, the subject has four zodiac components in Major Arcanum XIX, "the sun", the card associated with happiness and fulfillment, and four zodiac components in Major Arcanum XXI, "the world", associated with completion and perfection. At bottom is the Astrological Tarot Disposition, based on the Astrological Disposition of FIG. 5A, with the correspondences processed between the elements and suits, and the qualities and court cards. These data tables of FIG. 12B serve to identify the subject's astrological tarot character. The FIGS. 12BI and 12BII identify the subject's astrological tarot disposition based on subject's Western tropical position data using Age of Aries correspondences, and Eastern sidereal position data using Age of Pisces correspondences, respectively.

The FIG. 12C shows at top an Astrological Tarot Charting Device, based on the apparatus of FIG. 9, in particular, the FIG. 9F. The Device adds means of an outermost band encircling the apparatus of FIG. 9F, wherein each Major Arcanum card XI to XXII is placed in order counterclockwise, having 30 degrees of the 360 degree circle and its sectors. The individual cards can be shown in their respective sector space, as shown in FIG. 12C. The outermost band can rotate, and may be rotated to align with the ring of zodiac signs according to the desired or applicable ordering of correspondences based on the origin. Here, the outermost band is aligned for Age of Aquarius correspondences, as XI is aligned to the zodiac sign of Aquarius. At bottom is the Device showing the subject's zodiac components mapped to the Device. Whereas each zodiac planetary component corresponds to one of the Major Arcanum I to X, herein the planetary components are mapped as small cards bearing the planet component and corresponding Major Arcanum. This mapped Device represents the subject's Astrological Tarot Chart, and is useful for purposes of meditation and identification. For astrological tarot charts and device per FIG. 11, of opposite and reversed charting, the order of Major Arcanum XI to XXII on the outermost ring is rendered in clockwise order.

The FIG. 12D presents drawing of an astrological tarot chart spread, based on the subject's zodiac data, of any type, in conjunction with any "Age" for the Major Arcanum XI through XXII cards. To implement the method, any tarot deck of cards is usable, providing it has 22 Major Arcanum cards, corresponding to the meaning and images provided in the FIG. 12AII. First, any zodiac data type is selected, including, Western, Eastern or invention's 30/360 grid data types, here, 30/360. Next, any "Age" for the Major Arcanum XI through XXII correspondences is selected, including, "Age of Aries" ("traditional") or "Age of Aquarius", here, the latter. From that correspondence set, the card corresponding to the zodiac sign of the subject data's Ascendant is placed at the position of the ascendant of a standard astrological chart, that is, at the 9 o'clock position. The remaining Major Arcanum cards XI through XXII are placed circularly in order following the ascendant card, proceeding counterclockwise from it. Once the circle is laid, the Major Arcanum I through X are placed in their position respective signs, here using cards marked for their planetary correspondences.

This astrological tarot chart is useful for contemplation and interpretation, much like the standard astrological analysis. This means that Major Arcanum cards I through X are individually interpreted as to the Major Arcanum XI through XXII in which they are domiciled, much like one speaks of a planet in terms of its zodiac sign of domicile. Aspects between planets of the subject's data indicate aspects between the respective Major Arcanum I through X. The FIG. 12D utilizes the 30/360 grid data of the same subject, FIG. 12B, in conjunction with "Age of Aquarius" correspondences. Because, under that data type, the subject has an ascendant of Libra, located in Major Arcanum XIX, the card XIX is placed in the 9 o'clock position, the remainder proceeding counterclockwise in circle, with card XX at the 8 o'clock position, and finishing with card XVIII at 10 o'clock. Per FIG. 12B, the subject's conjunction of Ascendant, Mercury (II) and Neptune (VIII) in XIX (Libra) pertains, by FIG. 12AII, to happiness and triumph, other interpretations are acceptable. A grid of astrological tarot aspects provided, FIG. 12D, bottom.

Per *Webster's New Collegiate Dictionary*, astrology is the "divination of the supposed influences of the stars and planets on human affairs and terrestrial events by their positions and aspects". Thus, astrological tarot includes the positions of the Major Arcanum I through X cards corresponding to the planets, in terms of their zodiacal and Major Arcanum XI through XXII positions. Astrological tarot also includes the aspects made between the Major Arcanum planet cards I through X.

Astrological tarot, and the subject profiles generated thereby, includes features which derive from the nature of complete tarot decks, including both the Major Arcanum cards (divisible into the two sections, Major Arcanum I through X and Major Arcanum XI through XII) and the Minor Arcanum cards (divisible by their suits, their court cards and their associated numbered cards) and the correspondences of the Major and the Minor Arcanum cards to astrological natures and qualities.

The standard tarot deck contains the 22 Major Arcanum cards, plus 56 Minor Arcanum cards. The Minor Arcanum cards are divided into four suits, of batons ("wands"), cups, swords and coins ("pentacles"). Each suit has four court ("face") cards, the king, queen, knight and page. Each suit has 10 numbered cards, numbered from 1 to 10, each typically depicted with that number of suit objects in its card drawing (i.e. the five of batons card typically has five batons depicted in it). Each numbered card in each suit has a relation to the respectively numbered Major Arcanum card, I through X, and hence, to an astrological component planet (i.e. the ten of cups has a relation to card X and the Moon).

Contained in FIG. 12 are Correspondences between the four tarot Court Cards, king, queen, knight and page, and their astrological Quality: cardinal, fixed, elemental, mutable, respectively. The Correspondences between the four tarot Suits of batons, cups, swords and coins, and the four Western astrological Elements, fire, water, air and earth, respectively, are shown as well. The four elements reconcile with the five Chinese elements—metal, fire, water, wood and earth—by adding ether (akasha).

FIG. 12EI presents the Correspondences between the four court cards and astrological natures, and between the four suits and elements, as well as specifying the correspondences between the three court cards (of some decks) and astrological natures. The drawing shows the composition of two unique astrological tarot (or "multipurpose") decks, the first one containing 78 cards, being based on four court cards per suit, the second one containing 74 cards, being based on three court cards per suit. The three tarot court cards per suit are the king, queen and page, corresponding to the astrological natures of cardinal, fixed and mutable, respectively. The Minor Arcanum cards of these astrological tarot decks identifies the suit and its element for each card, and each numbered suit card is identified by corresponding planet and Major Arcanum card. Major Arcanum cards have image and correspondence.

FIG. 12EII continues from FIG. 12EI, showing the number suit cards, from 1 to 10, and the corresponding planet and Major Arcanum card associated with each number. Thus, all fives, regardless of suit, pertain to Jupiter and to Major Arcanum V. The FIG. 12EII also contains the tarot court cards per deck of 78 and 74 cards, and contains each court card by suit, with its corresponding zodiac sign. For example the king court cards pertain by astrological quality to cardinal signs, and the suit of batons corresponds to fire, hence, the King of Batons corresponds to the cardinal fire sign of the zodiac, Aries. In the case of the 78-card deck which contains four court cards per suit, therefore, 16 court cards, the twelve zodiac signs are assigned to king, queen or page by element and quality, with the knight court cards simply assigned the element itself, for instance, the Knight of Cups, with the element, water. In the 74-card deck, having three court cards per suit, therefore, 12 court cards, each is assigned one sign.

FIG. 12EIII continues the description of the astrological tarot decks, providing examples of the Major Arcanum to zodiac planet and sign correspondences. These two examples identify the zodiac signs for the Major Arcanum XI through XXII, using two of the twelve "Ages" for correspondence.

Any of the twelve "Ages" can be applied, drawn or indicated on either the 78-card deck or the 74-card deck. In FIG. 12EIII, the 78-card deck is shown with "Age of Aquarius" correspondences; the 74-card deck shows "Age of Virgo"—these are examples. The astrological tarot cards can contain a small, blank, box or field, in which the user defines the correspondences based on a particular "Age".

FIG. 12EIV continues the description of the astrological tarot decks, providing detail on each numbered card of the Minor Arcanum, with respect to its suit and to each numbered card's astrological disposition, based on the number and the suit. For example, the Ace (1) of Batons. Each Ace corresponds to the Sun, and by correspondence to Major Arcanum I. The Batons correspond to fire. The Ace of Batons, by astrological disposition of the Sun in fire signs, is considered with respect to the three fire signs, Aries, Leo and Sagittarius. The Sun is exalted in Aries, at regency in Leo, and neutral in Sagittarius. Therefore, the exaltation and regency are indicated for the Ace of Batons. If a particular card has a neutral disposition for all three same suit signs, for example, the Ace of Cups, where none of Cancer, Scorpio or Pisces (the water signs) are in exaltation, regency, detriment or fall, it is neutral. The invention's decks of cards include indications, drawings, zodiac glyphs and symbols to represent the astrological tarot nature of each card in the deck. Other tarot style drawings can be rendered, as well.

FIG. 12F shows the Playing Card Standard Court of King, Queen and Jack, as corresponding to cardinal, fixed and mutable astrological qualities, respectively. The Playing Card Suits of Spades, Hearts, Diamonds and Clubs correspond to the pairings of Batons and Fire, Cups and Water, Swords and Air, and Coins and Earth, respectively. A playing card deck useful for astrological tarot is made by adding the 22 Major Arcanum cards. A tarot deck useful for playing card purposes has the four suits, each suit with ten numbered cards and three court cards, King, Queen and Page, plus Major Arcanum. A multi-purpose deck, for astrological tarot and for playing card purposes, marks one of the four suits of batons/spades/fire, cups/hearts/water, swords/diamonds/air and coins/clubs/earth on each suit card.

FIG. 12G re-presents and adds astrological tarot data, of the invention's 30/360 grid type and per the "Age of Aquarius", for the same example subject. This form of consolidation and identification of the planetary positions, the angular regents and the astrological tarot disposition can be applied and determined for astrological tarot data of any type, for instance, permitting Western and Eastern data sets, as well as invention's positions based on the physical stars in constellation and on the part of the zodiac symbol, these latter data provided in FIG. 9CI. Also, the "composition of the subject's court" and the "composition of the subject's hand" is made for or from any type of zodiac position data type, and for any of the twelve correspondent "Ages", as is the entirety of the subject profile, FIG. 12G.

The "composition of the court" identifies each zodiac component planet and its domiciled sign and therefrom provides its corresponding astrological tarot court card and the disposition of the planet in that sign. The "court" is composed of the ten court cards determined from the ten planets in signs. Each court holds ten court members, corresponding to astrological planets. Each court member is uniquely determined for disposition, so that, while the example subject's court holds three Kings of Swords, the King of Swords of I resides in XIX and is disposed in fall, while the King of Swords of II resides in XIX and is neutral as is the King of Swords of VIII. Disposed court members are important.

The "composition of the subject's hand" identifies each zodiac component planet and its domiciled zodiac sign and therefrom provides its corresponding astrological Minor Arcanum numbered card by suit, the suit being expressed as any or all of its tarot suit, its astrological element and its playing card suit. Each hand therefore contains ten cards, numbered from one (Ace) to ten (10), and the total composition of the hand is summarized for the numbered cards it holds for each of the four suits.

The unique astrological tarot correspondences, processes, data and cards of this invention are applicable to any tarot spread. Before casting a spread, the type of astrological component data and the "Age" of correspondences for Major Arcanum XI through XXII is specified. Alternately, a spread is cast, and then the interpretation proceeds from that basis outwards. Thus, it is not necessary that data type nor "Age" be specified before, during or after the spread. It is a matter of preference and comfort.

FIG. 12H, top section, contains a spread method of the invention, to serve as the formal basis of the example spread. The subject, before casting the spread, specified invention's modified 30/360 data be used for the same subject, and "traditional", "Age of Aries" correspondences for Major Arcanum XI through XXII. Hence, those cards in this example show "Age of Aries" correspondences.

The spread contains ten cards, laid in order 1) to 10) as identified on the drawing, after first mixing the complete 78-card deck of astrological tarot cards. The position 1) relates to the present state of the subject or the inquired about topic. Card 2) concerns the hopes and potentiality of the subject or with regard to the inquired about topic. Card 3) indicates the fears and limitations of the subject or with regard to the inquired about topic. Card 4) shows the conditions from the past influencing the present. Card 5) shows the conditions of the future which will come to influence the subject or inquired about topic. Card 6) presents factors contributing to the subject's inner state of strength or weakness. Card 7) reveals the factors from the environment and from others which effect the subject or inquired about topic. Card 8) reveals favorable conditions and influences, untapped resources and emerging allies, and unforeseen Acts of God. Card 9) indicates the subject's or topic's future prospects or achievements. Card 10) is an integrating aspect of the spread, that influences or is influenced by the other nine cards.

The example spread has the cards illustrated for their astrological tarot features. An alternative illustration for the numbered Minor Arcanum cards contains their respective pictorial image, as found on some tarot decks, such as the A. E. Waite Rider deck and the Barbara G. Walker deck; the Minor Arcanum pictured in the example spread centrally illustrate the number of suit objects—in that aspect, similar to the Brotherhood of Light's Egyptian tarot deck and to the classical French-style tarot deck.

The bottom portion of FIG. 12H, "composition of the subject's spread" is useful for framing the interpretation of the spread. Here, this invention's 30/360 grid data for the same example subject is modified by positions as determined by this invention's positions based on the actual layout of the physical stars in zodiac constellations. On that basis, the position of Mercury is modified from Libra to being in Virgo, as at the subject' birth, Mercury was located at that zodiac symbol's leaf, based on its stars. Mercury in Virgo is a position of regency as Virgo is a co-ruler of Mercury (with Gemini), and Mercury governs science, knowledge, learning, writing and intellectual and communicative endeavors.

Beginning the interpretation of the example tarot spread cast for the same example subject, the two of coins in card position 1) is related to the subject's Mercury, as the number 2 relates to Mercury, and as the suit of coins relates to the astrological element earth, of which Virgo is an earth sign, ruler of Mercury. Hence, this regency indicates that the card 1) is a strong card for the subject, and that the subject's science, knowledge, learning, writing and intellectual endeavors are a key and present feature. Traditional meaning of the two of coins represents material instability requiring balance and skill. The card 2), representing the subject's hopes and potentiality, is Major Arcanum XIV, under the spread's preconditions, associated with the sign Cancer, that sign and Mj. Arc. Card containing the planet Uranus (VII) and the subject's midheaven. Thus, the subject has hopes for a career (midheaven) and aspirations of worldly achievement based on the subject's scientific and written brilliance (VII), as card 2) relates to card 1), these areas of brilliance being inventions, Uranus governs invention and discovery. However, the subject's midheaven in Cancer is disposed in detriment, indicating a difficult career. Because XIV, "Temperance", is card 2), the subject is advised to temper and balance his furious effort.

The card 3) in the example spread, the eight of swords, relates to the subject's Neptune as 8 relates to that planet, this confirmed by the suit of swords, or element air, and the subject's Neptune is located in the zodiac air sign of Libra. This is a neutral disposition for Neptune. Given that this card is in the card 3) position, it indicates that the subject has worries and fears related to suffered injustices, which operate to impede his progress and peace of mind. The traditional Rider deck illustration for the eight of swords has a woman bound and blindfolded, imprisoned by eight swords. The subject has Mercury and Neptune in conjunction on the Ascendant, confirming card 3) having relation to card 1). The card 4), the three of coins, indicates an influence of Venus (III) as the threes relate thereto. The suit of coins indicates a quality associated with the element earth. As the subject does not have Venus in an earth sign, it does not indicate the subject's Venus, but rather, it indicates a work, product or accomplishment (earthen states) of the subject having a Venus quality, that is, relating to art or nature. By its position at card 4), the subject has created this in the past and it has become a key factor. Indeed, the subject has created inventions and intellectual scientific written works and creative music and art over the past years. Per Kaplan, the three of coins signifies "Great skill in trade or work. Mastery. Perfection. Artistic ability."

The card 5) completes the cross formed by the cards 1), 2), 3), 4) and 5). That card position indicates the conditions of the future which will come to influence the subject, and in this example, it is the Major Arcanum XVII, "the Star", signifier of hope, faith, truth and cosmic inspiration. It is, thus, a "favorable" card, meaning in part that associated negative influences are diminished. This applies to the disposition of the subject's planets residing in XVII (Libra), being the Sun (in fall), Neptune (neutral) and Ascendant (in detriment). The future for the subject holds bright and encouraging developments. By hope and faith in the truth, justice and honor (Neptune) comes to the subject. The subject's purpose and will (Sun) and the subject's personality (Ascendant) are imbued with cosmic inspiration of XVII.

The card 6) is positioned at the bottom of an ascending line of cards, position 6), 7), 8) and 9), this line to the right of the cross formed by card positions 1), 2), 3), 4) and 5), with 1) at the cross's center and being the first card drawn after mixing the deck. The card 2), being drawn second, is placed above card 1); the card 3), the third drawn card, is placed beneath card 1); the card 4), the fourth card drawn, is placed to the right of card 1); the card 5), the fifth card drawn, is placed to the left of card 1). The invention's card mixing procedure, or method to shuffle the deck, is to shuffle the deck three times, then cut the deck and shuffle the deck three times again, then cut the deck and shuffle the deck three times again, then cut the deck, and the mixing is completed, with the topmost card always drawn.

The card 6), in this example, is the Page of Coins. The Pages relate to the mutable zodiac signs and, as the youth and scribe of the court, it is not surprising that Mercury is co-ruled by two mutable signs, Gemini and Virgo. Hence, written documents, letters and communications are assigned to Pages. The suit of coins relates to the earth signs, so the Page of Coins relates to the mutable earth sign, Virgo. The position 6) relates to factors contributing to the subject's inner state of strength or weakness; the subject's Mercury at regency in Virgo is strong, stronger by its beneficial aspects to the subject's Neptune (conjunction), Ascendant (conjunction), Jupiter (sextile), Venus (sextile) and Pluto (sextile). The card 7) reveals the factors from the environment and from others which effect the subject. In this example, card 7) is the Major Arcanum XX, "Judgment", signifier of reckoning, judgment, awakening and resurrection. These pertain to the reckoning or judgment, etc., occurring in the subject's environment, the process and outcome of which have an impact on the subject. That the "judgment" is happening to others is further implied by the fact that the subject does not have any planets in Major Arcanum XX, the zodiac sign of Capricorn, though the subject does have the Imum Coeli (IC) located there, this is its detriment disposition as Capricorn rules the IC's opposite pole, the midheaven (MC).

The card 8) reveals favorable conditions and influences, untapped resources and emerging allies, and unforeseen Acts of God. In the example, the Major Arcanum V was drawn in that position. As V, "the Pope", relates to Jupiter, the subject's Jupiter at regency in Sagittarius indicate very favorable conditions. The influences pertain to legal matters, religion, philosophy and higher learning.

The card 9) indicates the subject's future prospects or achievements. In this example, the Major Arcanum II, "the Priestess", was drawn, relating to Mercury, the planet of science, knowledge, writing, communication. The subject's Mercury, at regency in Virgo, is favorably disposed; the implication of Major Arcanum II is that the future prospects or achievements pertain to the subject's creative works.

The card 10) is an integrating aspect of the spread—it influences or is influenced by the other nine cards. In this example, the Major Arcanum I was drawn, "the Magician", relating to the Sun, and to the subject's will, purpose and ability. Because the Sun is in Libra, corresponding to Major Arcanum XVII under the "Age of Aries" correspondences selected before mixing the deck and spreading cards, it is domiciled in the card of hope, faith, truth and cosmic inspiration, which is a beneficial influence to impart, but one which has to be protected from long-term negative external influences. The external influences presented in this example's cards position 1) through 9) are of generally positive influence, however, the worries and oppression implied through card 3), the eight of swords, is one area to cause concern. That factor may ameliorate in the future, as card 5), Major Arcanum XVII, of hope, implies. The appearance of Major Arcanum I as card 1) indicates that the subject's course is determined and executed by the subject's purpose, will and ability, and that the subject's capacity in those regards underpin the factors, developments and situations developed in the cards positioned 1) through 9). It is also mentioned, that the Sun is in Libra ("Balance"), a disposition of fall, and requires peace and quiet.

That is the spread method of invention. No other card positions are to be added to or taken away from this spread, if best results are to be obtained. There is one exception to that rule, and that is, an optional eleventh card is drawn, blindly from the top, middle or bottom, which addresses the question, "what must be known about the subject or topic which is not already known from the spread of ten?". In the subject's experience with proper use of this tarot spread method, this does not frequently arise. As mentioned before, the tarot spread is useful for any variety of zodiac data type and any variety of the "Age" correspondences. The astrological tarot methods, correspondences and profile artifacts described and depicted herein are used and made with and from any variety of zodiac and tarot component data, in conjunction with any "Age" correspondence set, per user preferences and practices. The astrological tarot methods, correspondences and profile artifacts are useful for any tarot spread. The astrological tarot methods, correspondences and profile artifacts are extensible to any tarot deck.

Thus, the astrological tarot methods, correspondence systems, devices, decks and profile artifacts of this invention are universally applicable to the astrological tarot needs of any user practices and preferences, to any type of zodiac and tarot data and to any type of astrological tarot spread. The invention specifies the astrological correspondences and natures of the tarot cards, and in doing so, reveals how any deck of tarot cards is enhanced, modified and signified for astrological tarot.

The drawing in FIG. 13 diagrams the invention's System of Correspondences for the Numerological Identifications per date, whether a birth date or any and all calendar dates, these being conducted in three means. The first means, termed "Day", identifies the specific day of the month under an input inquiry. By example input subject, date Nov. $21^{st}$, 1960, the Day is 21. The second means is termed "Digit" and identifies the number discovered by adding together each digit of the date. Each calendar month is assigned a number from 1 to 12, beginning with January as 1 and December as 12, thus, November is 11. The Digit for same example input is the sum of each digit (1+1+2+1+1+9+6+0), this sum is 21. The third means, termed "Decade", first totals the number discovered by summing the numbers of the date's month, day and year; for same example, (11+21+1960), totaling 1992. That number is then computed to Decade by adding together its digits, (1+9+9+2), is 21. Thus, for this example subject, each of the three numerological identifications returned the number, 21. Input example date has been identified hereby as a "triple" 21.

Using the FIG. 12, its set of astrological and tarot major arcanum correspondences, the number 21 is XXI in roman numerals, and hence corresponds to major arcanum card XXI, "the world", and Aquarius. However, using the Age of Aquarius ordering, FIG. 12A, for Major Arcanum XI to XXII, the card XXI, "the world", corresponds to Sagittarius, in which the subject has a stellium of the Moon (exalted in the second house), Jupiter (in its sign of regency and end-depositor), Venus (in its home regency of the second house) and Saturn. By Age of Aquarius ordering, the triple 21 is revealed for significance. Under tarot correspondences, if any number is identified by these three modes as larger than 22, it is first reduced by summing its digits.

The invention's third System of Correspondences, between the Letters of the Alphabet and the single digit Numbers, are found listed and diagrammed in FIG. 14, with illustrative example input name, David Andrew D'Zmura, determined for its alpha-numeric signature, this identified, 63, the sum of each number per letter in the subject name. It is remarked that 63 equals 3×21, and that three 21's were identified for subject's birth date.

The number 3 corresponds to Venus, this in home regency in the subject's second house, and to III, "the empress". The complete subject name, if larger than 22, can be reduced by summing its digits. Here, the digits 6 plus 3 equal 9. The number 9, associated as the roman numeral IX, the major arcanum known as "the hermit", is identified by FIG. 12 as corresponding to Pluto. The subject has Pluto exalted in Leo. Subject's Pluto, moreover, makes seven beneficial aspects to other components—trines to the Moon, Jupiter, Venus and Saturn, and sextiles to Ascendant, Mercury and Neptune. The other non-identity divisors of 63 are 9 and 7. Each unique name comprising any subject's complete name can also be processed and identified individually.

The letters corresponding to the number one are A, I, J and Y. The letters associated with the number two are B, K and R. The letters corresponding to the number three are C, G, L and S; for the number four, D, M and T. The letters associated with the number five are E, H, N, Q and X. The letters corresponding to the number six are U, V and W; for the number seven, O and Z. The number eight corresponds to the letters, F and P. The number nine corresponds to the variety of consonant-H's: TH, CH, SH, SCH, PH.

Two, integrating, sample server-based systems are schematized in FIG. 15, a Merchant Server System and a Member Server System. The merchant server system provides the functions of transaction processing, catalogue management, payment handling and inventory management, with user input accessing the home page which links product information and catalogue with products in catalogue by a staging server and live server. From the home page, and from the product information/catalogue windows, the transaction processing is accessed, with transactions updating inventory database on server via transactions processing, by which an order database and payment handling are accomplished.

The home page provides access to the Merchant Server System and to the Member Server System. The member server system routs internet traffic through internet security into a non-member anonymous FTP server with open access FTP content and general membership information or through a member ID proxy server firewall, from which the member ID server provides pay-for-services content, data, artifacts and information, using a caching proxy server to store member databases and archives. Payment is membership fee or per service.

In the example of FIG. 15, the open access FTP content and pay-for-services content pertains to the invention's content, data, artifacts and information, as well as to prior art's. These include, horoscopes, natal, progressed, transit and synnastry data, charts, dispositions and profiles, plus Eastern Style and Chinese lunar sign data, artifacts and information. Included are the computations and identifications of alpha-numerology, astrology and tarot.

The FIGS. 15A, 15B and 15C provide examples of content and services provided by an astrology, tarot or numerology internet web site, or by computer programs and professionals, per Invention, being a subject's profile, interpretation and prediction, for same subject, David Andrew D'Zmura, born Nov. 21, 1960 at 5:50 AM in Cincinnati, Ohio, United States of America.

FIG. 16 is a Functional Specification in Diagram for computer-based devices or programs, performing per the Invention. The computer program of FIG. 16 commences from user inputs of subject name, a date for the subject, and a place and time for the subject date. From the name of subject, the alpha-numerical identifications proceed, utilizing the correspondence system of FIG. 14, with the identifications output. From the date for the subject, typically a birth date, the numerology for the date proceeds, utilizing the correspondence system of FIG. 13, the three identifications are computed, of Day, Digit and Decade, with the identifications output. From the date of subject and the place and local time for that date, the astrological artifacts proceeds. At user selection, the mapping system's origin is precisely set, drawing on the invention's twelve setting means, of FIG. 21. Also set, or preset, is the unique system perspective, of earth-, solar- and luminary-centered vantages, of FIG. 1 through FIG. 10 and the FIG. 11, see also the FIG. 20. Further set, or preset for comparison purposes are the astrological prior art form data and artifacts created. Utilizing the processing methods, apparatuses and references resources of this invention, astrological artifacts per invention are generated and output. The subject's zodiac component data is computed by the invention's three coordinate mapping systems: 30/360 grid-based ("sign"); physical stars in constellation; and zodiac symbol-based. For each of these data sets, tables are generated, listing subject's planetary positions, angular regents and astrological disposition. From the data, the grid of aspects between the components is created and output, and the Western ("standard") and Eastern Design Charts are created from device templates. The data and charts of natal, progressed, transit and synnastry astrology are created for the subject date, time and location, and in conjunction with the progressed date, the current date or another input date, time and location. The Chinese lunar signs and Chinese ascendant for the subject are determined and output. The astrological tarot correspondences of FIG. 12 are determined per invention for the subject zodiac data. In conjunction with the invention's catalogues of stars and symbols, and its templates of devices and charts, the subject's zodiac component data is mapped to the constellations and to the symbols illustrated over the stars. The corresponding parts of the zodiac symbol and of the corresponding ("nearby") stars are noted in profile output. From the determined data and created charts, interpretation proceeds. Also, horoscopes for the day by Sun signs, FIG. 10, and profiles for a subject, FIG. 10B. The subject data set(s) are stored to memory, as subject databases and statistical archives.

FIG. 17 shows Integrated Componentry of Astrological Systems and showcases common ingredients of integrated and complete astrological systems which are created, based on the constellation-correlated positions of signs and components. The astrological systems contain integrated components, which include the processing mechanics of inputs, output rendering templates and look-up tables and algorithms, each of these further detailed therein. The Four Formats of Invention's Commercial-Product Systems describe printed-matter toolbox system, computer-based stand-alone system, server-based networked system, and modem, voice, dial-in system, these further detailed in drawing.

The Processing Mechanics consist of a complete instruction set, enabling and providing for the execution of processes and the output of artifacts. The Output Rendering Templates include those of astrology calendars and ephemerides, horoscopes, and the charts, tables, aspect grids, disposition and profiles for natal, progressed, transit and synnastry astrology. The Template Charts are of this invention's devices, and two- and three-dimensional displays. The Look-Up Tables or Algorithms consist of: zodiac planet components by day/month/year; zone standard time at Greenwich noon, zodiac axial components for local sidereal time; lunar nodes; part of fortune; plus, coordinate map of the ecliptic and visualization backgrounds.

The Printed-Matter Toolbox System contains printed componentry, of an ephemeris and look-up tables containing, or to calculate, invention's zodiac component positions. Written instructions are included in this system. A manual is provided for the processing of subject input values; these found data are transferred by user to invention's artifact templates.

The Computer-Based Stand-Alone System consists of a computer program in memory or on disk, CD or other digital medium, providing automated processing of subject inputs into astrological data, artifacts and information per this invention. The computer program operates in a stand-alone hardware environment, generating output and content via integrated routines, automated databases and coded output templates, to accomplish input processing and output rendering.

The Server-Based Networked System enables remote access for users via the internet and web, where the processing and output per invention are generated by digital automation. User input and the output of the server-based system containing the automation are rendered over telecommunications, of phone, cable, cellular or broadcast, or over networked wire lines.

The Modem, Voice, Dial-In System enables remote access for users via direct dial phone, cable or satellite dish, with input/output sent by digital or analog signal as information.

The FIG. 18, summarizing the Invention's Dominion in Astrology Practice and Products, lists its process steps to determine positions of requisite zodiac components as data and spans planetary, axial, reference resource and advanced components, determined as data. It covers component data processing, tools and artifacts. From these data and with the tools and apparatuses of the invention, astrological artifacts are manufactured, comprising data, reference resources containing data, star catalogues, astrological charts, grids of aspects, tables of disposition, horoscopes and profiles. It underlies and determines astrological apparatuses, systems and reference resources. These areas are further detailed in application.

Determine Positions of Requisite Zodiac Components as Data entails: taking values for input parameters of date, plus time and geographic position on earth; calculating any intermediate data for zodiacal discovery, involving adjustment to local sidereal time; referencing invention's resources, ephemerides, look-up tables and algorithms, or adjusting prior art resources, ephemerides, charts, look-up tables and algorithms per invention's corrective methods; returning invention's zodiacal positions of astrological component data.

Requisite Zodiac Component Data includes any or all of: the planetary components—Sun, Moon, Mercury, Venus, Mars, Jupiter, Saturn, Uranus, Neptune, Pluto and Lunar Nodes; the axial components—Ascendant, Descendant, Mid-Heaven, Imum Coeli, Twelve Houses; the reference resource components—source component data in ephemerides and calendar, plus astrologers' and astronomers' tables and algorithms; the advanced components—progressed transit, synnestry and composite data, and Eastern- and Chinese-Style artifacts.

The Component Data Processing into analytic tools and artifacts includes: processing of component data for astrological charts, tables, aspect grids, dispositions, profiles and horoscopes; formatting, rendering, imaging and manufacturing astrological data and artifacts; publishing, disclosing, distributing or providing astrological artifacts processed by invention.

The Manufacture of Astrological Artifacts covers invention's articles of manufacture: astrological information and zodiac component data; reference resources of ephemeris, books of houses, lunar tables, calendars, aspectarians and dates of Sun and Lunar Signs; astrological charts of natal, progressed, transit, mundane, synnestry, composite, conception and horary; grids of aspects between zodiac components of conjunction, opposition, trine, square, sesquiquadrate, sextile, quincunx, semi-square and semi-sextile, by astrologer's standard orb; tables of disposition having zodiac components by sign, element, polarity, house, components in rulership, exaltation, detriment and fall, plus mutual reception, end-depositing, archetype; horoscopes and profiles, based on invention's astrological information and component data.

The Astrological Apparatuses, Systems, Reference Resources and Commerce of this Invention include devices housing, storing, processing, manufacturing and communicating per the Invention.

FIG. 19 presents Astrological Processing Methods, comprising: inputs of date, time and geographical location, at a minimum a date, with optional input selections for the value precisely marking the vernal equinox origin and for the astrological system perspectives; processes of local sidereal time computation, ephemeris look-up, data call-back per user input and assembly of artifacts based on the determined data; and outputs of astrology data, charts, tables, grids, resources, horoscopes, profiles and information—the artifacts of this invention. Side-by-side comparisons with prior art output are further provided by this invention.

The invention produces articles for the distinct categories of natal astrologicals, progressed and transited astrologicals, plus synnergistic typus, from the user-specified inputs of date, time of day and geographic origination. The invention established the locations of core astrological component, i.e. planets, houses, angles, ascendant and lunar nodes, mapping true zodiacals to output formats. FIG. 19 also presents a Synopsis of Steps in Processing.

The Step 1 discovers the Local Sidereal Time from the subject input parameters. The Step 2 references the zodiac position of the components for the rendered LST, linked with the input geographical location. The Step 3 returns the subject component position data, zodiacal values, sorting and filtering this data into invention's assorted astrological artifacts.

FIG. 20 presents the invention's Unique Astrological System Perspectives. The full variety of astrological perspectives are delineated by functionality, ranging from standard natal astrology, progressed and transit astrology, to non-earth-centered system perspectives. These variations are part of this invention, addressed in FIG. 20, Basic Functionality of Invention's Processing Apparatuses by Variations in Unique Astrological System Perspective. These systems are delineated by the perspective of astrological views in determining data. FIG. 20 cites twelve varieties of astrological data, tools and articles of manufacture, these artifacts specified by the invention's unique system perspectives, these implemented herein:

a) standard natal astrology, earth-centered system perspective: see the FIGS. 1, 2, 3, 4, 5, 6, 7, 8, 9 and 10;
b) standard progressed astrology, per a), earth-centered view: progress one day forward for each year per number of years, 30 years=one sign forward, solar progression to Western: see the FIG. 6C;
c) solar-centered standard astrology: per a), but with positions per solar-centered perspective, FIG. 11 has Sun's view of subject's earth-bound location;
d) solar-centered progressed astrology: per b), but with positions per solar-centered perspective, Sun's view of the earth in zodiac is derived from FIG. 6C;
e) luminary-centered astrology: per a) from perspective of each of sun, planets, and moon, see the FIGS. 11, 11A and 11B;
f) luminary-centered progressed astrology: per b), from perspective of each of sun, planets, and moon, luminaries' view of progressed input per FIGS. 6C and 11;
g) transiting conditions astrology: overlaying the positions at present or for a targeted date, a) through g), for another time/place, in the FIG. 6D;
h) extra-system earth-centered standard astrology: per a), including luminaries outside of solar system, these of stars and symbols, in FIGS. 8, 9, 9A, 9B, 9C, 9D;
i) extra-system luminary-centered standard astrology: per e), including luminaries outside of solar system, FIG. 7, view of earth is from luminary/star perspective;
j) extra-system, multi-valence, selectable multi-perspective: per h) and i), both earth-centered and luminary-centered;
k) progressed and transited astrology of h) through j);
l) synnestry and composite astrology: any a)–k) with other a)–l), by combining or overlaying, as in the FIG. 6E.

Beginning in the application's section, entitled, "Nature of Error . . . " and elaborately presented in its section, "Invention's Technical Means . . . ", the invention has detailed innovative means for determining the zodiac sign to degree on a mapping system's origin. These twelve-fold means are found cited in FIG. 21, Means for Determining the Precise Marking of the Origin (Vernal Equinox). Means 1) is determined, specified and implemented herein, with the alternative precision markings being a selectable input, as contained in FIG. 19. The FIG. 21 also contains Means for Precisely Precessing the Origin (Vernal Equinox), to precess the origin forward or backward in time, from any origin under the invention.

Comparison with, and Correction of, Prior Art

The invention's astrological information, data, reference resources and artifacts can be used to determine the zodiac positions and dates of Western "tropical" astrology prior art data and artifacts, by adjusting the former thirty degrees forward (one full sign, each sign 30°) East, along the zodiac belt, i.e. if by invention's art, Jupiter is in Gemini, then Jupiter is in Cancer under Western art. Eastern "sidereal" prior art data and artifacts can be created by adjusting the invention's signs and position data 6.5 degrees forward, East, for purposes of making comparison.

In reverse manner, the corrective methods are provided for rendering prior art astrology data, artifacts and information per invention. Western "tropical" astrology prior art signs, data, artifacts and programs are adjusted thirty degrees back, West along the zodiac belt; Eastern "sidereal", "vedic" and "Hindu" prior art data, artifacts and programs must be adjusted 6.5 degrees back, East. In the Tables, Western, Eastern and Chinese Style Artifacts per invention's methods and data are provided, many in comparison to the Western, Eastern and Chinese Prior Art.

To "manufacture" an astrological artifact is to produce, by engineered process, objects, images, tools and outputs meeting the needs which are specific to astrology. Astrological artifacts of data, analysis and reference specifically tailored to astrological inquiry are not directly produced by astronomers' apparatus systems. Instead, astronomers' tools and artifact processing systems can enable the user to input parameters of time and location, and on command, render an image of the viewable sky per those inputs.

One such tool is "Swift's Guide to the Galaxy", produced by Cosmi. These astronomy tools render the sky for any day and place, but depict only the viewable sky in one direction, eg., that part above the horizon, for instance, facing due East. In the astrologers' view, most of the necessary data is missing, since all directions and points of the zodiac must be rendered comprehensively and simultaneously. Cosmi's computer program also does not align or render the sky and component positions per the astrologers' convention for longitude and latitude of ecliptic coordinate systems, but rather, uses an equatorial coordinate system, with locations and mapping grids in right ascension and declination. It does not tabulate or export the zodiac positions of requisite astrological components, nor does it produce the astrological artifacts described herein.

The astrologers' artifacts depart from astronomers' designs in several key respects:

1) the inclusion of lunar nodes;
2) all requisite component positional data per astrologers' practice;
3) charts and tabular information relating the disposition and features of the subject;
4) angular aspects between the planets along astrologers' proximity (degrees of orb);
5) the comprehensive vantage rendered in an astrology chart rather than "visible sky";
6) demarcation and delineation of the coordinate sphere by longitude and latitude.

The FIG. 22 contains Methods and Means for Determining Astrological Artifacts per invention, including, by Conversion and Correction of prior art data, apparatuses and systems. The goal is to create invention's component data and artifacts in 30/360° coordinate system of astrological convention. Conventions are: positions are given in ecliptic coordinates of celestial longitude (and latitude), positions by sign (and to degree); and, twelve zodiac signs on the ecliptic belt, each sign uniform 30 degrees of 360. Convention: vernal equinox origin is first point.

The means and methods for determining position, further elaborated with remarks and relations in the drawing, include:

1) adjust astronomers' data in ephemerides, charts of positions, calendars, catalogues, sky maps, computer planetarium programs;

1a) adjust planetary astronomy's prior art ecliptic data, stated for zodiac sign, west one zodiac sign (each sign 30/360), celestial longitude data is adjusted for elapsed general precession since time when first point of Aries marked origin;

1b) adjust astronomy's prior art non-ecliptic coordinate system data, of equatorial, rectangular, equatorial rectangular, ecliptic coordinate data is converted from other coordinate systems by standard conversions, origin Aquarius 30°/Pisces 0°;

1c) adjust astronomy's prior art data stated for position types to useful data, being of apparent position to observer, trivial differences from apparent position are corrected;

1d) adjust for any of astronomy's prior art time conventions by conversion, of ST, LST, GMST, GMT, UT, UT1, UTC, ET, TDT, TT, relations between conventional time systems afford conversion, with an exception of ephemeris time (ET=UT+ΔT);

2) adjust Western astrological data, artifacts, ephemerides and reference resources, computer programs, horoscopes and Sun Signs, Western data, artifacts and information, apparatuses, charts and systems, zodiac signs are adjusted westward one sign (30°);

3) adjust Eastern astrological data, artifacts, calendars and reference resources, computer programs, horoscopes and Sun Signs, Eastern data, artifacts and information, apparatuses, charts and systems, zodiac signs are adjusted west, one sign—ayanamsa;

4) adjust Chinese astrological data, artifacts, calendars and reference resources, computer programs, horoscopes and Sun Signs, where Western solar zodiac signs are used, such as calendar dates of signs and ascendant, adjust to invention's dates, hours;

5) adjust data, artifacts and information of computer programs, and in apparatuses and systems of astronomy and astrology, for astronomy's planetarium programs, convert zodiac mapping of stars and components, from equatorial to ecliptic system, for astrology's data, devices and systems, use appropriate form 2), 3) or 4) to adjust origin, output, data and artifacts;

6) determine zodiac component positions by direct observation, with or without aids or equipment, of the local viewable sky, determine positions of the components and zodiac belt by single party visual observation(s) on a local, partial, basis;

7) determine zodiac component positions by planetary radar astronomy, echo or photo imaging device, on earth or in space, determine positions of the components by precision radar, echo, image, device, mapping the positions to invention's origin;
8) determine zodiac component positions from known data set across fullness of time, the data set by invention or prior art,
determine positions of components via formulas of planetary motion over time, or by extrapolation between multiple data sets;
9) determine positions by multiple, coordinated, observations, images or data sets, for comprehensive (full) ecliptic belt view,
determine complete zodiac components along entire ecliptic belt by coordinated means of multi-party, multi-image, multi-set;
10) determine positions from positions not mapped to twelve uniform zodiac signs in constellations along the ecliptic belt,
convert positions from maps and data of IAU 1930 delineation dividing the ecliptic belt into thirteen irregular zodiac signs.

" . . . Therefore watch yourselves very carefully, so that you do not become corrupt and make for yourselves an idol . . . . And when you look up to the sky and see the sun, moon and the stars—all the heavenly array—do not be enticed into bowing down to them and worshipping things the Lord your God has apportioned to all the nations under heaven." From Deuteronomy 4:15, The Holy Bible.

What I claim is:

1. A process for converting equatorial coordinate data of individual stars and objects of the heavens, and for any heavenly body in the skies, wherein said heavens include the group of twelve traditional zodiac constellations, to ecliptic coordinate data, in celestial longitude and celestial latitude, comprising:
utilizing equatorial coordinate data of individual stars and objects, wherein said equatorial coordinate data comprises celestial position in right ascension, α, and declination, δ, which further comprises, utilizing said right ascension data in degree of 360 proceeding east from equatorial system origin at vernal equinox, if in sidereal hours converting to degree of 360, utilizing said declination data in degree north (+) or south (−);
calculating said latitude, β, from said equatorial data by:

β=arc sin (−cos δ sin α sin ε+sin δ cos ε), wherein ε, the obliquity of the ecliptic, in degrees;
calculating said longitude, λ, from said α, δ and β data by:

λ=arc cos((cos δ cos α)/cos β), which further comprises if said stars and said objects utilizing right ascension data of between 180 and 360 degrees, calculating said longitude, λ, from said α, δ and β data by:

λ=360−arc cos((cos δ cos α)/cos β);

generating said ecliptic coordinate data, in said β and λ;
utilizing a computer or calculator having an iterative equation solver function, coding said conversion formulae into said computational device, and operating said conversions, wherein first solving for latitude, then solving for longitude;
cataloguing the ecliptic coordinate positions of the group of the individual stars and objects configuring a heavenly constellation in celestial longitude and celestial latitude.

2. In the invention of claim 1, which further comprises cataloguing each heavenly constellation, wherein a set of data for said stars and objects of each constellation is generated, and compiling a star catalogue containing all constellations.

3. In the invention of claim 1, which further comprises cataloguing the ecliptic coordinate positions of the group of the individual stars and objects configuring a zodiac constellation in the zodiac signs, wherein said zodiac constellations consist of the twelve traditional constellations domiciled on the ecliptic belt, and wherein said zodiac signs consist of the twelve traditional signs, wherein each zodiac sign spans 30 degrees celestial longitude or spans its constellation of stars.

4. In the invention of claim 1, which further comprises cataloguing the ecliptic coordinate positions of the group of the individual stars and objects configuring a zodiac constellation in the zodiac symbols, wherein each said symbol is isomorphic to a respectively named constellation, wherein each symbol contains parts configuring said symbol, wherein each said star and object comprising a constellation is isomorphic to a part of symbol.

5. In the invention of claim 1, which further comprises mapping the ecliptic coordinate positions of the group of said stars and objects comprising each said heavenly constellation, in a two-dimensional rendering of celestial longitude and latitude.

6. A celestial map of the stars and stellar objects, mapped from a perspective vantage from earth for a date or epoch, or at a given date, time and location, in an ecliptic coordinate system of celestial longitude and celestial latitude, comprising:
means for rendering said system in a map structure, wherein x-axis of said map is said longitude and y-axis is said latitude;
means for demarcating and dividing the ecliptic by longitudinal sections corresponding to 30 degree sections or by zodiac signs, wherein each said zodiac sign contains 30 degrees;
means for plotting said stars and stellar objects by their ecliptic coordinate positions in said longitude and said latitude;
means for connecting stars and objects comprising each constellation, wherein each constellation is rendered in outline;
means for illustrating the constellation symbol on its respectively named constellation, isomorphic to constellation.

7. In the invention of claim 6, which further comprises means for plotting the Sun, the earth's Moon, and the eight non-Earth solar system planets, wherein said planets comprise Mercury, Venus, Mars, Jupiter, Saturn, Uranus, Neptune and Pluto.

8. A system locating and cataloguing the stars and objects of the heavens, and for any heavenly body, in ecliptic coordinates of celestial longitude and celestial latitude, comprising:
a processing generator determining the ecliptic coordinates of individual stars and stellar objects, said generator having coded computational processes residing on computer or calculator, which further comprises:
a catalogue of the individual stars and stellar objects in equatorial coordinates of right ascension and declination;
a set of coded processing algorithms, wherein said equatorial coordinates of an individual star are utilized to convert said star's position to ecliptic coordinates of celestial longitude and celestial latitude by use of an equation solver;

a catalogue of said ecliptic coordinates of the group of the individual stars and stellar objects configuring a constellation, said catalogue generated by said coordinate processing generator, wherein said catalogue comprises a database or tabular array;

a map of the heavenly stars in ecliptic coordinate format.

9. In the invention of claim 8, which further comprises a catalogue of the ecliptic coordinate positions of said stars and objects of the zodiac constellations, wherein the coordinate data is provided respective the twelve zodiac symbols, said zodiac symbols comprising the group of twelve traditional zodiac symbols, wherein each symbol is isomorphic to its respective constellation, wherein each symbol consists of parts configuring said symbol, wherein each said individual star and stellar object configuring each constellation is isomorphic to a part of symbol.

10. In the invention of claim 8, which further comprises a catalogue of the ecliptic coordinate positions of said stars and objects of the zodiac constellations, wherein the coordinate data is provided respective the twelve zodiac signs, said zodiac signs comprising the group of twelve traditional zodiac signs, wherein each said sign spans thirty degrees in celestial longitude, and wherein each coordinate data is provided respective zodiac sign and by the degree of thirty within said respective zodiac sign.

* * * * *